United States Patent [19]

Fletcher et al.

[11] Patent Number: 5,537,558
[45] Date of Patent: Jul. 16, 1996

[54] APPARATUS AND METHOD FOR COMMUNICATING MULTIPLE DEVICES THROUGH ONE PCMCIA INTERFACE

[75] Inventors: J. Douglas Fletcher, Duncan, Okla.;
Robert D. Kehn, Ft. Wayne, Ind.;
Mark L. Slagle, Duncan, Okla.

[73] Assignee: Halliburton Company, Duncan, Okla.

[21] Appl. No.: 321,057

[22] Filed: Oct. 5, 1994

[51] Int. Cl.⁶ .................................................. G06F 13/00
[52] U.S. Cl. ........................... 395/309; 395/280; 395/310; 395/822
[58] Field of Search ................................. 395/325, 309, 395/280, 309, 310, 822

[56] References Cited

U.S. PATENT DOCUMENTS

| | | | |
|---|---|---|---|
| 4,637,012 | 1/1987 | Crabbe, Jr. | 370/24 |
| 5,183,404 | 2/1993 | Aldous et al. | |
| 5,336,099 | 8/1994 | Aldous et al. | |
| 5,338,210 | 8/1994 | Beckham et al. | |
| 5,359,570 | 10/1994 | Hsu et al. | 365/230.01 |
| 5,423,086 | 6/1995 | Cannon et al. | 455/186.1 |

OTHER PUBLICATIONS

"Run Up to Seven Devices Off One PCMCIA Slot", *Windows Sources*, p. 48, Oct. 1993.

*Primary Examiner*—Jack B. Harvey
*Assistant Examiner*—John Travis
*Attorney, Agent, or Firm*—Craig W. Roddy; Stephen R. Christian; E. Harrison Gilbert, III

[57] ABSTRACT

An apparatus that connects to a standard PCMCIA interface of a microprocessor-based computer which typically communicates with only a single external device through the interface enables the computer to communicate with multiple external devices through the one PCMCIA interface. The apparatus operates to implement a method which transfers data from multiple devices to a personal computer through a single PCMCIA interface.

18 Claims, 5 Drawing Sheets

APPARATUS AND METHOD FOR COMMUNICATING MULTIPLE DEVICES THROUGH ONE PCMCIA INTERFACE

BACKGROUND OF THE INVENTION

This invention relates generally to computer communications through an interface defined by the standards of the Personal Computer Memory Card International Association (PCMCIA), which interface is hereinafter referred to as a PCMCIA interface. The invention more specifically relates to an apparatus and a method for communicating multiple devices, whether of the same or different operating features (i.e., protocols), with a personal computer through a single PCMCIA interface of the computer (i.e., the computer may have more than one PCMCIA interface, but the present invention connects to and communicates with only one of them in a given installation).

Physically small, microprocessor-based computers referred to as personal computers, workstations, laptop computers, notebook computers, pocket computers, etc. have physical limits defined by their respective housings or packaging. To communicate outside these physical limits, these computers have interfaces to which external devices can be connected. For example, personal computers typically have at least one serial port to which a serial interface device such as a modem, a mouse or a scanner can be connected. Personal computers also typically have at least one parallel port to which a parallel interface device such as a printer can be connected.

Such interfaces require circuitry that connects both with the external device and with the internal microprocessor circuitry. As with the various types of microprocessor-based computers, different interface circuits may be embodied in different physical sizes. Some of these interface circuits are too big for the smaller physical sizes of some of these computers. To accommodate these smaller-sized computers, the PCMCIA promulgated standards for an interface known as the PCMCIA input/output and memory card interface (the aforementioned "PCMCIA interface"). This 68-pin interface has only one interrupt request line, which is the communication path over which an external device can send an electrical signal to get the computer's attention.

Because of its single interrupt request line, each PCMCIA interface of a computer has been used with only one external device. To accommodate additional external devices, additional interfaces would be needed; however, this sometimes cannot be done because the computer housing is not large enough to receive additional PCMCIA interface circuits despite their relatively small size. Even if there were room for more PCMCIA interfaces to be installed, adding more interfaces would increase the cost. Thus, there is the need for an apparatus and method by which more than one external device can communicate through a single PCMCIA interface.

SUMMARY OF THE INVENTION

The present invention overcomes the above-noted and other shortcomings of the prior art by providing a novel and improved apparatus, and a novel and improved method, for communicating multiple devices, whether of the same or different operating features (i.e., protocols), with a personal computer through a single PCMCIA interface of the computer. Such multiple communications occur substantially-simultaneously despite having only one interrupt line in the interface between the present invention and the personal computer. [Although broader than its conventional definition, but for simplifying the terminology used hereinbelow, "personal computer" as used immediately above and subsequently in this specification and the claims encompasses the various types of microprocessor-based computers that use one or more PCMCIA interfaces.]

In addition to the advantage of communicating multiple devices through a single PCMCIA interface, the apparatus of the present invention can be implemented on a single circuit carrier referred to herein as a "PC card" (a printed circuit board approximately the size of a conventional credit card).

The apparatus for communicating multiple devices with a personal computer through only one PCMCIA interface of the computer comprises: computer connector means for connecting to a PCMCIA connector of one PCMCIA interface of a personal computer; first device connector means for connecting to a first device; and second device connector means for connecting to a second device. The apparatus further comprises first communication channel means, connected to the first device connector means, for communicating first device data within the apparatus. The apparatus also includes second communication channel means, connected to the second device connector means, for communicating second device data within the apparatus. The apparatus still further includes adapter means, connected to the first and second communication channel means and the computer connector means, for transferring first device data between the first communication channel means and the computer connector means and for transferring second device data between the second communication channel means and the computer connector means.

In a particular implementation, the present invention provides an apparatus for communicating a local area network and an RS-232 device with a personal computer through one PCMCIA interface of the computer. This apparatus comprises a PC card, and it further comprises the following which are mounted on the PC card: a PCMCIA connector having a plurality of pins designated in conformance with a PCMCIA input/output and memory card interface standard, which PCMCIA connector defines means for connecting at any one time to only one PCMCIA interface of a personal computer; a PCMCIA adapter circuit connected to the PCMCIA connector; first program storage memory, connected to the PCMCIA adapter circuit; dual port random access memory connected to the PCMCIA connector and the PCMCIA adapter circuit; an intelligent peripheral device connected to the PCMCIA adapter circuit, which intelligent peripheral device includes a microprocessor, a serial communications controller and a universal asynchronous receiver transmitter; second program storage memory; a microprocessor bus connected to the dual port random access memory, the intelligent peripheral device and the second program storage memory; means for connecting the serial communications controller to a local area network; and means for connecting the universal asynchronous receiver transmitter to an RS-232 device.

The present invention also provides a method of transferring data from multiple devices to a personal computer through a single interface of the personal computer. The method comprises the steps of: receiving an interrupt from a first device; communicating the received interrupt through a single interrupt line of a PCMCIA interface of a personal computer; transferring data from the first device through data lines of the PCMCIA interface to the personal computer in response to the personal computer processing the communicated interrupt; receiving data from a second device;

storing the received data in a memory; and transferring stored data from the memory through the data lines of the PCMCIA interface to the personal computer.

Therefore, from the foregoing, it is a general object of the present invention to provide a novel and improved apparatus, and a novel and improved method, for communicating multiple devices, whether of the same or different operating features (i.e., protocols), with a personal computer through a single PCMCIA interface of the computer even though the computer may have more than one such interface. Other and further objects, features and advantages of the present invention will be readily apparent to those skilled in the art when the following description of the preferred embodiments is read in conjunction with the accompanying drawings.

DETAILED DESCRIPTION OF PREFERRED EMBODIMENTS

Figure 1:
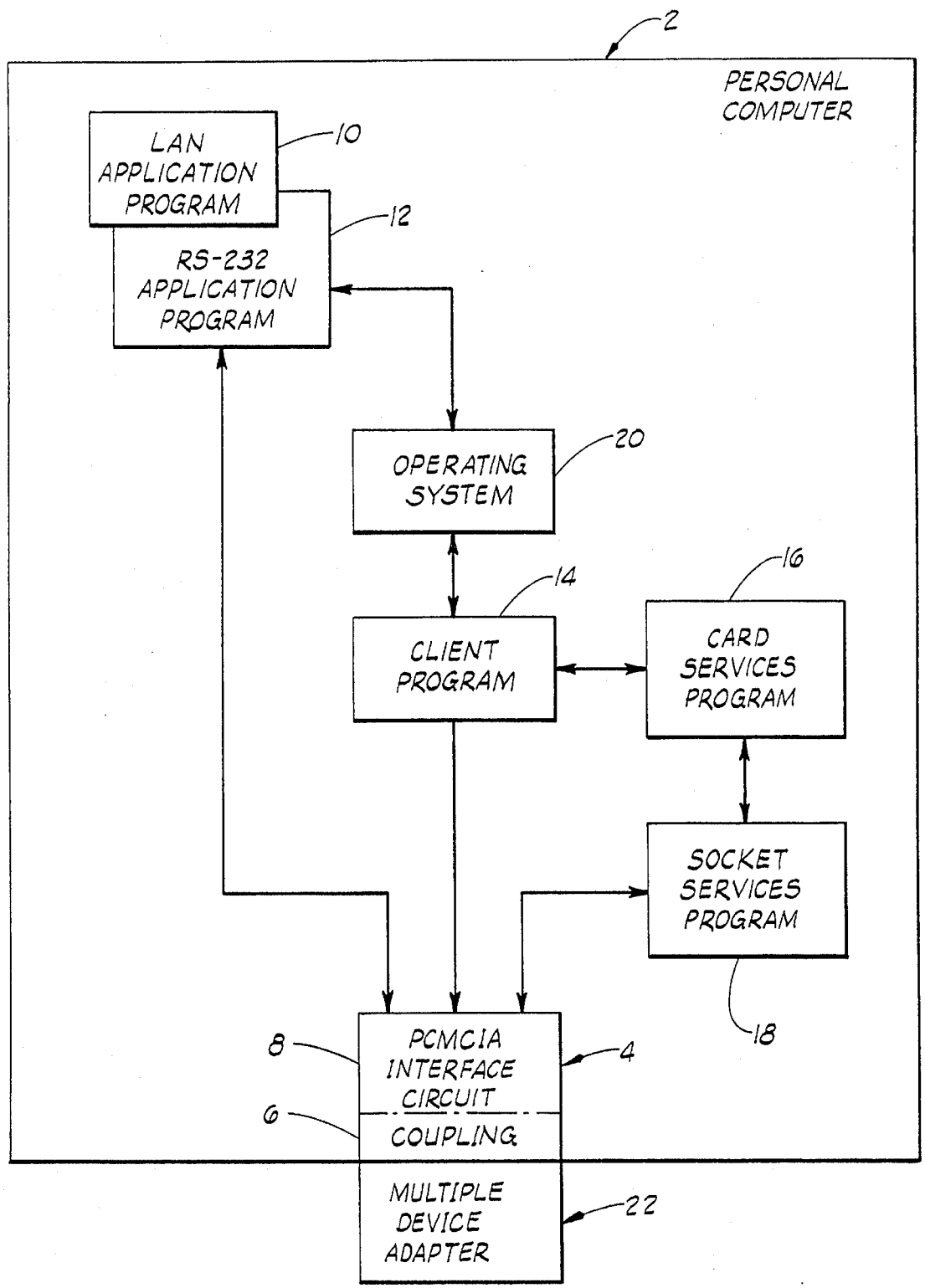
FIG. 1 is a block diagram of a personal computer to which an apparatus of the present invention is connected through one PCMCIA interface of the computer.

Relevant features of a personal computer 2 (as defined above) will be described with reference to FIG. 1. The personal computer 2 has a microprocessor (not shown) which communicates with external devices through one or more ports. One of these ports is defined by a PCMCIA interface 4 (specifically the PCMCIA Type II input/output and memory card interface in the preferred embodiment). The interface 4 has a mechanical coupling 6 and a PCMCIA interface circuit 8.

The coupling 6 is a known 68-pin receptacle to which external connections are made in a known manner. In the preferred embodiment, the coupling 6 is a connector to which a Type II PC card can be connected. By way of example, an HRS IC6 Series two-slot connector can be used in a particular implementation.

The PCMCIA interface circuit 8 performs signal conversion and other handling for transferring signals between the internal microprocessor bus of the personal computer 2 and external devices outside of the personal computer. The circuit 8 of the preferred embodiment is a conventional one, such as implemented in a single PCMCIA integrated circuit chip. This chip and the coupling 6 of the preferred embodiment are defined and operate in conformance with the pin assignments of the PCMCIA PC card standard release 2.00 for the aforementioned interface.

FIG. 1 also illustrates three ways that internal communications with the PCMCIA interface circuit 8 occur inside the personal computer 2. One of these is via protocol-specific applications resident in program memory within the personal computer 2. Examples of these are shown in FIG. 1 as a local area network (LAN) application program 10 and an RS-232 application program 12. These can be implemented by known programs for communicating with a local area network or an RS-232 serial communication device. These are written to communicate with the predetermined protocol of the external device. Prior to the present invention, only one of such programs would communicate with a given PCMCIA interface 4 because such interface would be connected to only a single external device. With the present invention, however, multiple devices, utilizing either the same or different protocols, can communicate with the personal computer 2 through the single PCMCIA interface 4.

A second way of internally working with the PCMCIA interface 4 is through a customized "client" program 14. This is a custom program specific to a known external device which is to be connected to the interface 4.

A third way, and the way used in conjunction with the preferred embodiment of the present invention, is through a card services program 16 and a socket services program 18. Computer vendors implement programs 16, 18 to work with their specific hardware systems. The socket services program is a known type of program which is in effect a software layer on top of the hardware of the PCMCIA interface 4. The card services program 16 is in effect a software layer on top of the software of the socket services program 18. These are known programs with which communications can be conducted upon compliance with their standards. Such compliance only needs to be with regard to the card services program 16 because it is itself written to handle communications with one or more respective socket services program 18. A card services program standard relevant to the present disclosure is the PCMCIA card services specification release 2.0. As shown in FIG. 1, communications with the card services program 16 is via customized programming in the client program 14. Using this way of working with the PCMCIA interface 4 allows the present invention to be used with different computer platforms without additional software for each platform.

All of the aforementioned ways of communicating with the PCMCIA interface 4 operate within an operating system 20 of the personal computer 2 or an adaptive shell overlying the operating system.

The aforementioned programs are described above to exemplify the environment of the personal computer 2 with which the PCMCIA interface 4 functions. They are, however, otherwise not part of the present invention except to the extent they are used within any of the following explanations of the apparatus and method of the present invention. Such apparatus of the present invention is illustrated in FIG. 1 as the multiple device adapter 22. This apparatus will be more fully described with reference to FIGS. 2–4.

The apparatus 22 to be described is specifically adapted for communicating a local area network and an RS-232 device with the personal computer 2 through the single PCMCIA interface 4. In a specific implementation, the local area network is one which uses the ILAN protocol from Halliburton Energy Services (this protocol is based on the known SDLC and HDLC standards) and the RS-232 device is one which uses the EIA RS-232-C protocol (e.g., a modem, another computer, etc.). It is to be noted, however, that the invention is not limited to these two particular types of external devices or to these protocols. In general, the present invention can be adapted for use with multiple devices of the same or different protocols.

For connecting to the coupling 6 of the PCMCIA interface 4, the apparatus 22 includes a connector 24 (FIGS. 2 and 3A) that has a single interrupt line (pin 16 of connector 24 in FIG. 3A) which connects to a corresponding single interrupt request line of the PCMCIA coupling 6 when these two mating couplings are connected. This "computer-side" connector means 24 of the preferred embodiment includes the 68-pin connector shown in FIG. 3A, which connector has a plurality of pins designated in conformance with the aforementioned PCMCIA input/output and memory card interface standard (it is to be noted, however, that not all the pins of the connector 24 need be used). This computer connector means 24 of the preferred embodiment is a known type of connector used with PCMCIA devices known as "PC cards."

The apparatus 22 includes a device connector means 26 (FIGS. 2 and 3A) for connecting to a respective one of the external devices. In the preferred embodiment, this is a part of one consolidated connector assembly to which a connector from the RS232 device attaches. This connector is also a conventional piece of hardware for use with a PC card.

The apparatus 22 includes a device connector 28 (FIGS. 2 and 3A) for connecting to another respective external device. In the preferred embodiment, this is another part of the one consolidated connector assembly to which the local area network connects.

Line drivers and receivers are typically needed to maintain proper signal integrity or levels when communicating with external devices of the type with which the present invention can be used, as would be readily understood in the art. To facilitate the reduced size of the preferred embodiment apparatus 22, such line drivers and receivers are molded into a cable that connects at one end to the single connector assembly embodying the connector means 26, 28 and connects at its other end (or split ends) to the respective cables for the respective external devices.

Figure 2:
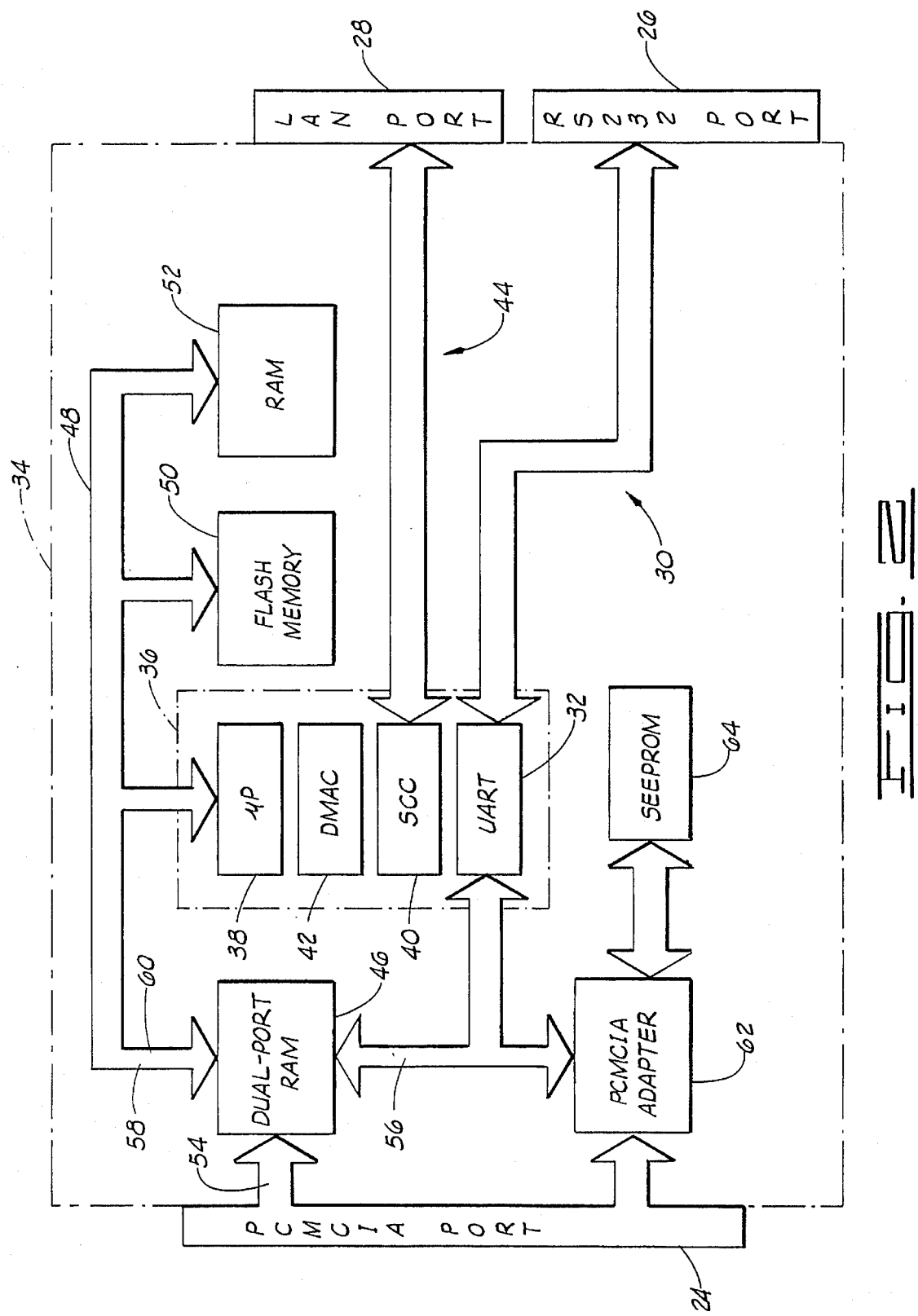
FIG. 2 is a block diagram of the preferred embodiment of the apparatus of the present invention.

Connected to the connector 26 is a communication channel means 30 (FIG. 2) for communicating data within the apparatus 22; this data is communicated over this channel to or from the external device connected to the connector 26. This particular channel in the preferred embodiment includes means for generating an interrupt in response to a communication received from the respective external device (in this case, the connected RS-232 device). This is particularly implemented by a universal asynchronous receiver transmitter (UART) 32 (FIG. 2) which is connected to the connector 26 and mounted on a PC card 34 (FIG. 2) which forms another part of the apparatus 22. In a specific implementation, the UART 32 is part of an intelligent peripheral device 36 (FIG. 3B). The intelligent peripheral device 36 further includes a microprocessor 38 (FIG. 2), a serial communications controller 40 (FIG. 2) and a direct memory access controller 42 (FIG. 2). In the particular implementation of FIGS. 3A and 3B, the device 36 is a model Z80182 Zilog Intelligent Peripheral (ZIP). In this embodiment, the UART 32 is set-up initially and can be modified by the microprocessor 38 and it informs the microprocessor 38 of its status; otherwise, the UART 32 operates independently from the microprocessor 38.

Connected to the device connector 28 is a communication channel means 44 (FIG. 2) for communicating data within the apparatus 22; this data is communicated over this channel to or from the external device connected to the connector 28. This communication channel means 44 includes the intelligent peripheral device 36 (specifically the microprocessor 38, the serial communications controller 40 and the direct memory access controller 42 thereof) and a dual port random access memory 46 (FIGS. 2 and 3B). A microprocessor bus 48 (FIG. 2) connects the microprocessor 38 and the dual port random access memory 46. The bus 48 also connects to a program storage memory 50 (FIGS. 2 and 3A) and a static random access memory 52 (FIGS. 2 and 3B), which static random access memory is also used in the communication channel 44 as an intervening or intermediate storage location. The intelligent peripheral device 36 is also connected to the device connector 28 as indicated by the common labeling in FIGS. 3A and 3B.

The dual port random access memory 46 includes port address lines 54 (FIGS. 2 and 3B) connected to the computer connector 24. It also includes port data lines 56 (FIGS. 2 and 3B) connected to an adapter means subsequently described. The memory 46 further includes port address lines 58 (FIGS. 2 and 3B) connected to address lines of the microprocessor 38 and port data lines 60 (FIGS. 2 and 3B) connected to data lines of the microprocessor 38 via the microprocessor bus 48.

The apparatus 22 still further includes the aforementioned adapter means for transferring data between the communication channel means 30 and the computer connector 24 and for transferring data between the communication channel means 44 and the computer connector 24. The adapter means includes means for sending an interrupt over the single interrupt line of the connector 24 in response to the interrupt from the communication channel means 30 (specifically, from the UART 32). The adapter means still further includes means for retrieving data from the communication channel 44 at an address provided directly to the communication channel 44 from the personal computer 2 through the PCMCIA connector 6 and the computer connector 24.

The foregoing are defined in the preferred embodiment apparatus 22 by a PCMCIA adapter integrated circuit chip 62 (FIGS. 2 and 3A) connected to each of the universal asynchronous receiver transmitter 32 of the communication channel 30, the dual port random access memory 46 of the communication channel 44, and the 68-pin computer connector 24. This also includes a program storage memory 64 (FIGS. 2 and 3A) connected to the PCMCIA-adapter circuit 62.

In accordance with the foregoing, the intelligent peripheral device 36 is connected to the PCMCIA adapter circuit 62 so that data communications with a connected RS-232 device pass through the universal asynchronous receiver transmitter 32 and the PCMCIA adapter circuit 62. The intelligent peripheral device 36, the dual port random access memory 46 and the PCMCIA adapter circuit 62 are connected so that data communications with a connected local area network pass through the serial communications controller 40, the static random access memory 52, the dual port random access memory 46 and the PCMCIA adapter circuit 62.

The apparatus 22 also comprises the PC card 34 (FIG. 2) containing printed circuits making appropriate electrical connections and providing a support member for the other aforementioned elements of the preferred embodiment apparatus 22.

To control the operation of the apparatus 22, there are programs stored in the memory 50 and the memory 64. Programs of a particular implementation of the apparatus 22 are set forth at the end of this specification. The operations implemented by these programs include the following.

Upon reset or start-up, the intelligent peripheral device 36 reads from the memory 50 (a flash EEPROM in a particular implementation) which in turn sends device 36 information to set up its internal peripherals (DMAC 42, SCC 40, UART 32), initialize microprocessor 38 (memory locations, wait states, etc.), place LAN initialization code into the dual port RAM 46, and enter a loop that checks dual port RAM 46 for a LAN response. The information inside the flash EEPROM 50 is the flash EEPROM program set forth at the end of this specification. See FIG. 4, "Initialization."

Also upon reset or start-up, the PCMCIA adapter 62 reads information from the memory 64 (a serial EEPROM in a particular implementation). This information is used to set up the PCMCIA adapter 62 for its particular mode of operation and inform the PCMCIA adapter 62 of the apparatus 22 power requirements, the input/output space and interrupt usage, and the vendor information (vendor name, product version, etc.). This information is known as the Tuple Code and is in the serial EEPROM program for the particular implementation set forth at the end of this specification.

Both of the above processes occur simultaneously within the PCMCIA apparatus 22. Both programs (flash EEPROM and serial EEPROM) can be modified through the PCMCIA interface 24 from a program inside the personal computer 2.

Both PCMCIA processes, RS-232 and LAN in the depicted embodiment, operate concurrently within the PCMCIA apparatus 22. That is, even though the microprocessor 38 is a single tasking device (i.e.,—only one instruction can be executed in a given time period), the speed of instruction execution on the microprocessor 38 allows several events to be processed in rapid succession giving the appearance of simultaneous process execution. The speed of operation is such that many processes can be executed without any delay in process performance and without any loss of data.

RS-232 Communications Process Operation

The RS-232 process is initiated when a reset or power-on occurs. Information is read from the flash EEPROM 50 by the microprocessor 38. The microprocessor 38 interprets the information and sets up the UART 32 to the appropriate settings for communication. Once the UART has been set-up, it operates independently from the microprocessor 38 and behaves like an industry standard 16550 UART. Once a program on the personal computer 2 sets up the appropriate configuration for communicating with the serial port through Card and Socket Services (FIG. 1), Card and Socket Services handles the details of transferring the data between the personal computer 2 and the PCMCIA device 22. In the particular implementation of FIGS. 3A and 3B, RS-232 communications, both control and data, are handled through the PCMCIA adapter 62 as apparent from the signal labeling in those drawings.

RS-232 Transmission Process

Data flows from the personal computer 2 through the PCMCIA interface port 24 to the transmit holding register of the UART 32 via the PCMCIA adapter 62. The PCMCIA adapter 62 routes the data to the appropriate device (in this case, the UART 32) depending upon its configuration. For example, if the PCMCIA adapter 62 is configured to use serial communications port number two, then when the personal computer 2 sends data to serial communications port number one, no data is sent to the UART 32 on the PCMCIA device 22. Only when the serial communications port request matches the configuration of the PCMCIA adapter 62 is the data sent to the UART 32. The PCMCIA adapter 62 can be configured to handle multiple devices and route data accordingly. Once the data (a single byte) is in the transmit holding register of the UART 32, it is copied to the transmit shift register of the UART 32 where it is shifted out serially through the serial bus of the communication channel 30 to the RS-232 port connector 26. After the data has been shifted out of the transmit shift register, the UART 32 signals the personal computer 2 through the PCMCIA adapter 62 that the transmit holding register is empty. The personal computer 2 then sends the next byte of data and the process is repeated until the personal computer 2 has no more data to transmit. One having knowledge of an 16550 UART can readily operate the UART 32 in accordance with the foregoing.

RS-232 Reception Process

Data flows in serially from the RS-232 port 26 through the serial bus of the communication channel 30 into the receive shift register of the UART 32. Once the complete data (a single byte) has been shifted into the receive shift register, it is transferred to the receive holding register of the UART 32. After the data has entered the receive holding register, the UART transmits an interrupt signal. This interrupt signal is captured by the PCMCIA adapter 62 and is re-transmitted to the personal computer 2 through the PCMCIA port 24. The PCMCIA adapter 62 transmits the interrupt signal according to its configuration. For example, if the PCMCIA apparatus 22 serial port has been configured to use interrupt request line 3 (IRQ3), then a receive interrupt from the UART 32 would cause the PCMCIA adapter 62 to send IRQ3 to the personal computer 2. Once the personal computer 2 has detected the interrupt, it obtains the data from the UART 32 receive holding register through the PCMCIA port 24 via the PCMCIA adapter 62. This process occurs each time data is received by the UART 32. Note that the personal computer 2 must retrieve the data from the receive holding register of the UART 32 before the next byte of data has been shifted into the receive shift register because the receive shift register automatically overwrites the receive holding register once it becomes full. One having knowledge of the 16550 UART can readily operate the UART 32 in accordance with the foregoing.

LAN Communications Process Operation

The LAN process is initiated when a reset or power-on occurs. Information is read from the flash EEPROM 50 by the microprocessor 38. The microprocessor 38 interprets the information and sets up the SCC 40 and the DMAC 42 to the appropriate settings for communication. The PCMCIA adapter 62 is configured by information in the serial EEPROM 64 upon reset or power-on to retrieve information sent to a particular set of memory addresses. This set of memory addresses corresponds to the memory of the dual port RAM 46 which is "mapped" into the personal computer 2 memory area at the location specified in the PCMCIA adapter 62 configuration. When data is written by the personal computer 2 to the "mapped" area of the dual port RAM 46 via the PCMCIA adapter 62, it can be read by the PCMCIA microprocessor 38 from the dual port RAM 46. Also, when data is written to the dual port RAM 46 by the microprocessor 38, it can be read by the personal computer 2 through the PCMCIA adapter 62 and the PCMCIA port 24. The "mapped" memory area can be changed by modifying the PCMCIA interface circuit 8 configuration in the personal computer 2 through the card services program 16.

The microprocessor 38 continuously checks to see if a frame (block) of data has been received from the LAN port connector means 28 or if a frame of data has been entered into the dual port RAM 46 for transmission. If either event is true, the microprocessor 38 performs the appropriate transmit or receive operation for the data frame.

Figure 3A:
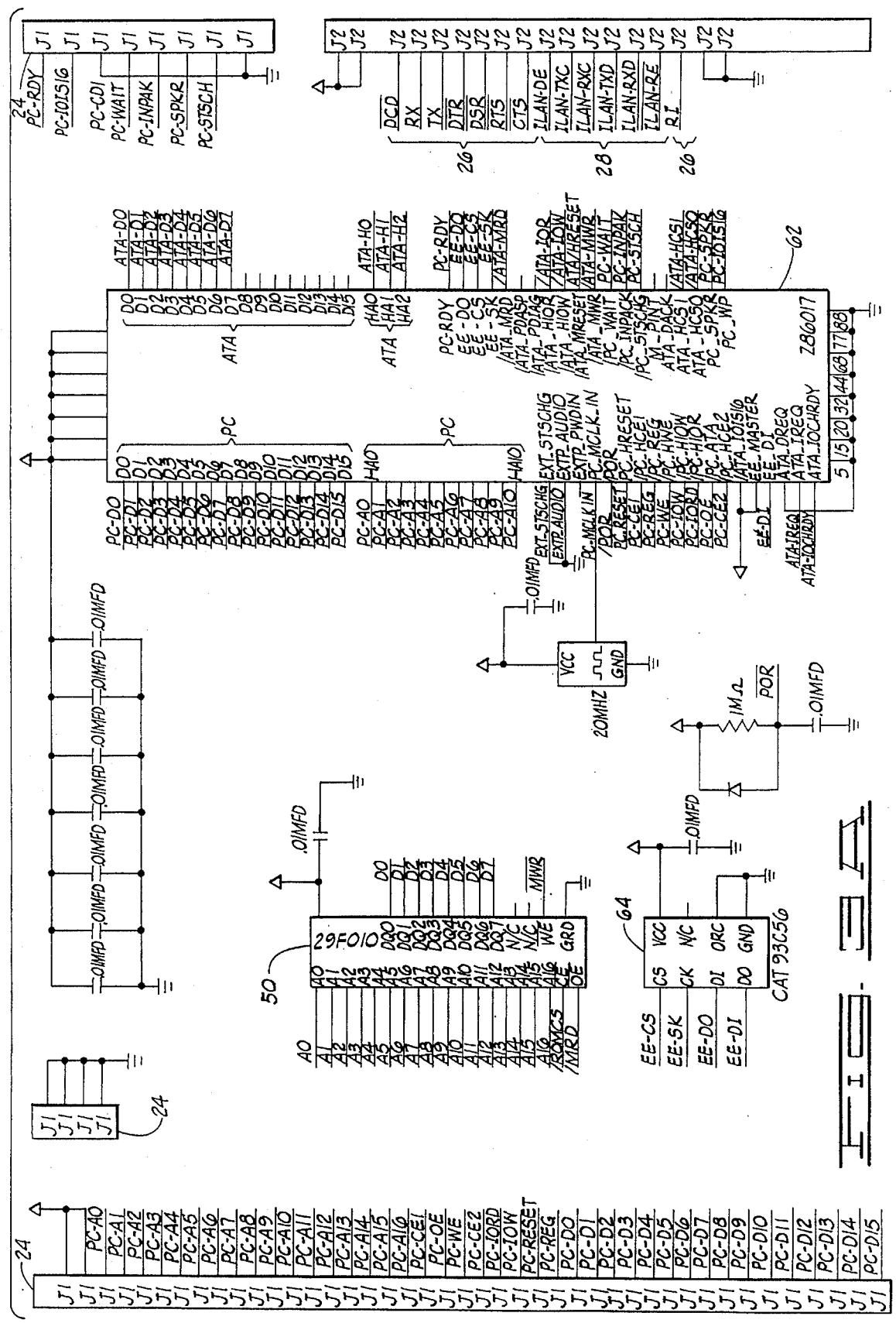
FIGS. 3A and 3B are schematic circuit diagrams of a particular implementation of the preferred embodiment of the apparatus of the present invention.
Figure 3B:
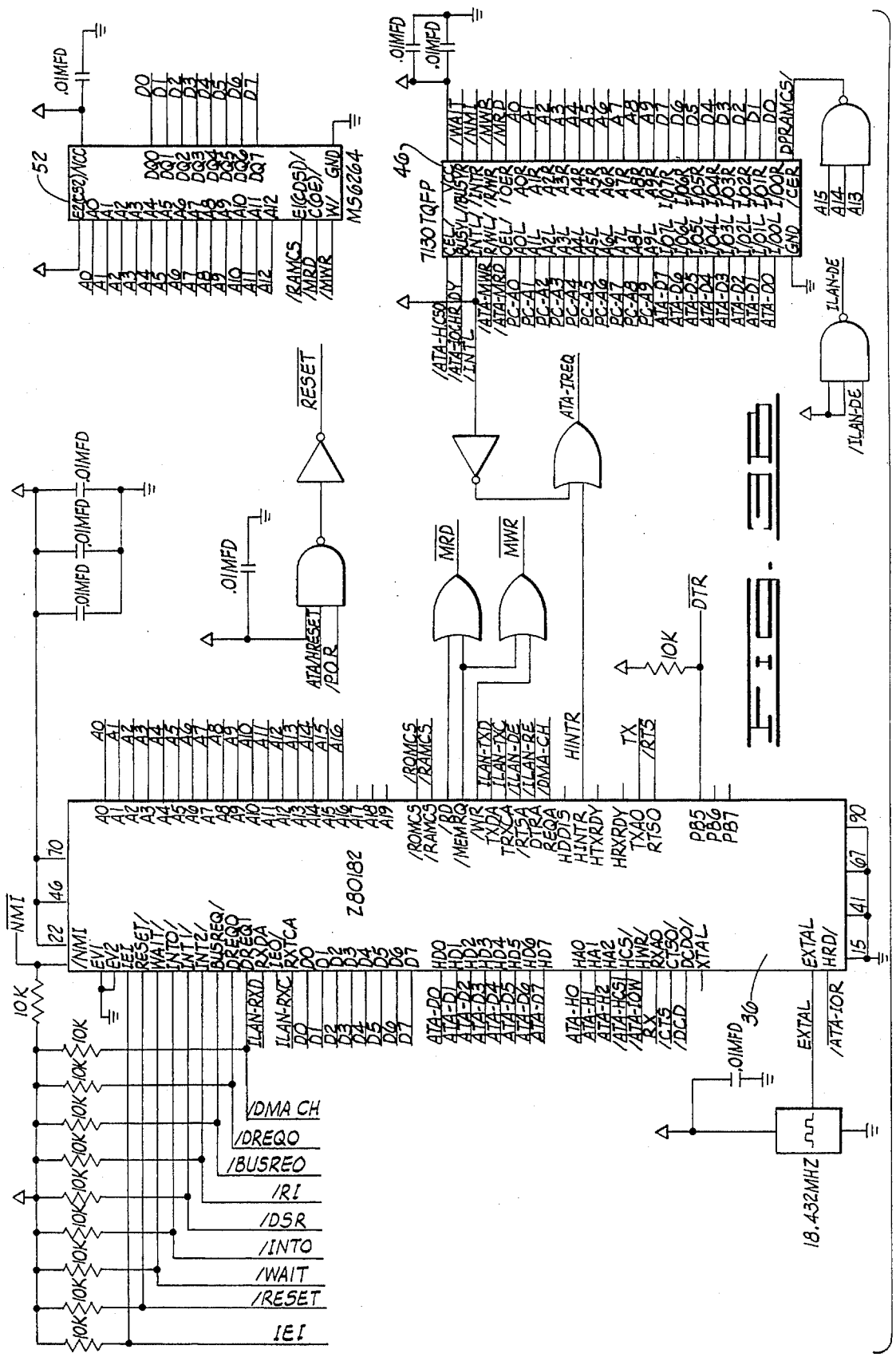
Figure 4:
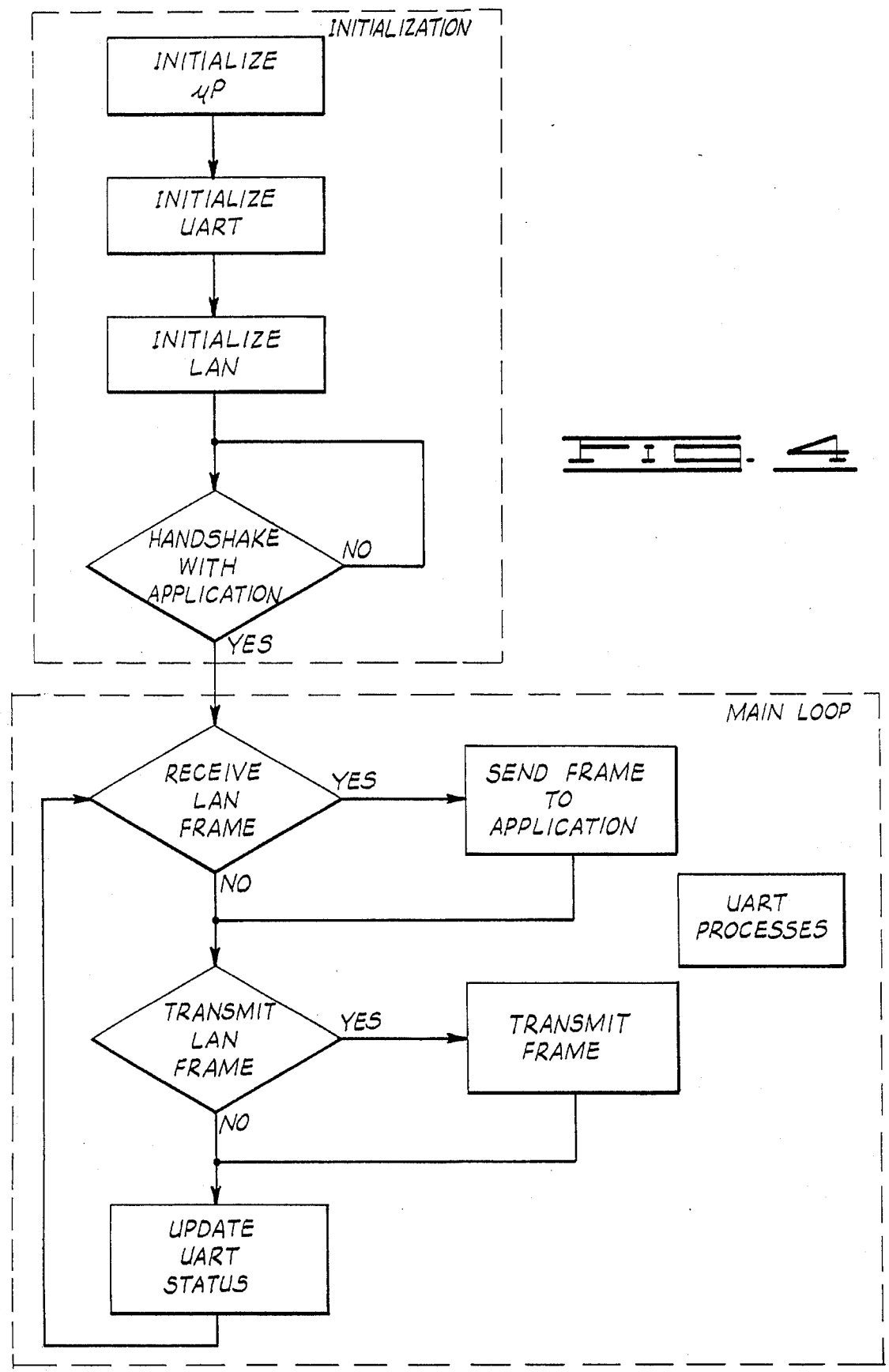
FIG. 4 is a flow diagram of a program for a microprocessor-based controller of the preferred embodiment apparatus.

For the LAN process, data to or from the personal computer 2 is transferred through the PCMCIA adapter 62; however, the personal computer 2 can directly address the memory 46 as indicated by the address signal labeling in FIGS. 3A and 3B.

LAN Transmission Process

A data frame to be transmitted is placed into the "mapped" memory area by the personal computer 2 via the PCMCIA adapter 62. This "mapped" memory area corresponds to the dual port RAM memory 46 on the PCMCIA device 22. When the microprocessor 38 detects, via a control bit in the memory 46, that data has been placed in the dual port RAM 46, it transfers the data frame to the static RAM 52. The microprocessor 38 then activates the DMAC 42, which then transfers the data frame from the static RAM 52 to the SCC 40. The SCC 40 transmits the data frame serially through the bus of the communication channel 44 to the LAN port 28 where it is sent out on the network. The SCC 40 appends the data frame with a CRC checksum for data validation.

LAN Reception Process

A data frame is received serially from the port 28 through the bus of the communication channel 44 to the SCC 40 thereof. The microprocessor 38 detects that data is being received and activates the DMAC 42, which transfers the data frame into the static RAM 52. Once the data has been received, the SCC 40 checks the CRC checksum that was appended to the data frame. If the data frame is valid, the microprocessor 38 receives a valid signal from the SCC. If the data is not valid, no valid signal is received by the microprocessor 38 and the data is discarded. Once the data is validated, the microprocessor 38 transfers the data from the static RAM 52 to the dual port RAM 46 where it is then read by the personal computer 2 at the "mapped" memory area. In the particular implementation, reading by the personal computer 2 occurs via a polling process rather than by an interrupt process as used in the aforementioned RS-232 process. Polling occurs by the personal computer causing appropriate addresses to be output through the PCMCIA interface 4 to the address lines of the computer connector 24 to which the memory 46 is connected.

The apparatus 22 is used in the preferred embodiment in accordance with, and to perform, the foregoing method whereby data is transferred from multiple external devices to the personal computer 2, and vice versa, through the single PCMCIA interface 4. In the preferred embodiment, the method is performed on the single PC device 22 which is connected to the PCMCIA interface 4 of the personal computer 2 and to the external devices.

Although the apparatus 22 of the preferred embodiment is described with reference to only two external devices, the present invention contemplates accommodating even more external devices through a single PCMCIA interface 4. The number is limited by the bus speed of the personal computer 2 and the space restrictions of the PCMCIA apparatus 22.

To accommodate more than the two devices referred to above and shown in the drawings, either of the following changes, for example, could be made to the illustrated embodiment:

(1) An area of the dual port memory 46 could be used by the apparatus 22 to store information about the device that needs to be serviced. The apparatus 22 could then throw the interrupt line, signaling the personal computer 2 that a device needs to be serviced. The personal computer 2 could then read the dual port memory 46 to obtain information about the device needing to be serviced. This could also work with a polling method in place of an interrupt method.

(2) A prioritization interrupt controller could be used on the apparatus 22 to send a vector (program pointer) to the personal computer 2 when the apparatus 22 throws an interrupt. This vector would tell the computer 2 which device needs servicing and what its needs are.

Returning to the illustrated embodiment, there is no need for the apparatus 22 to itself arbitrate between the two external devices to determine which one needs to be handled. This is so because only one of the two internal communication channels (specifically, communication channel 30) uses the PCMCIA interrupt request line. The other communication channel (i.e., communication channel 44) simply leaves retrieved data in the dual port memory 46 where the data awaits retrieval by polling from the personal computer 2. It is, however, contemplated that the apparatus 22 can be programmed to arbitrate among two or more external devices and to send appropriate sequential interrupts over the single PCMCIA interrupt request line.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

Programs for Flash EEPROM Memory 50

© 1994 Halliburton Company

```
;***************************************************************
***********;
; Module Name:    _mimic.src
                ;
; Creation Date: 11/30/93
                ;
; Assembler:     2500AD Software Inc.  v4.05
                ;
;               ;
; Functions:
                ;
;               ;
; Global Variable Description(s):
                ;
;***************************************************************
***********;

;****************************
; Assembler/Linker directives
;****************************
    .linklist
    .symbols
    .options    dnh program:        .section
uninit_data:    .section .include z182.inc
    .include z182mac.inc
    .include z85230.inc
    .include pcmcia.inc ;**********************
; External declarations
;**********************

;********************
; Global declarations
;********************
    .global MIMIC_NoINT_IH
    .global MIMIC_FCR_IH
    .global MIMIC_DLL_DLM_IH
    .global MIMIC_LCR_IH
    .global MIMIC_MCR_IH
    .global MIMIC_RBR_IH
    .global MIMIC_TTO_IH
```

```
        .global MIMIC_THR_IH

.program

;***************************************************************
***********;
; Function:   MIMIC_NoINT_IH
            ;
; Prototype:  interrupt MIMIC_NoINT_IH(void)
            ;
; Programmer: Doug Kehn
            ;
;
            ;
; Purpose:
            ;
;      This function is the MIMIC No Interrupt ISR.  This ISR simply resets ;
;      the IUS bit of the MIMIC IP register.
            ;
;
            ;
; References:
            ;
;       Zilog Inc., "Z80182 Zilog Intelligent Peripheral (ZIP)", Preliminary  ;
;           Product Specification, Q2/92.
            ;
;
            ;
; Special Notes:
            ;
;
            ;
; Variable Description(s):
            ;
;   Input:
            ;
;   Return:
            ;
;   Local:
            ;
;
            ;
; Revision History:
            ;
;    Date      Programmer   Revision
            ;
; --------    ----------   --------
            ;
```

```
; 02/11/94   dk            v1.00    Initial release
             ;
;***************************************************************
**********;

MIMIC_NoINT_IH:    .equal $
    ex    af,af'
    ld    a,080h
    OUT0  Z182_MIMIC_IUS_IP,A
    ex    af,af'
    ei
    ret ;***************************************************************
**********;
; Function:   MIMIC_FCR_IH
            ;
; Prototype:  interrupt MIMIC_FCR_IH(void)
            ;
; Programmer: Doug Kehn
            ;
;
            ;
; Purpose:
            ;
;       This function is the MIMIC FIFO Control Register Write ISR.
This ISR ;
;       simply resets the IUS bit of the MIMIC IP register.
            ;
;
            ;
; References:
            ;
;       Zilog Inc., "Z80182 Zilog Intelligent Peripheral (ZIP)",
Preliminary ;
;            Product Specification, Q2/92.
            ;
;
            ;
; Special Notes:
            ;
;
            ;
; Variable Description(s):
            ;
;   Input:
            ;
;   Return:
            ;
;   Local:
            ;
```

```
;             ;
; Revision History:
;             ;
;   Date      Programmer   Revision
;             ;
; --------    ----------   --------
;             ;
; 02/11/94    dk           v1.00    Initial release
;             ;
;***************************************************************
***********;

MIMIC_FCR_IH:      .equal $
    ex      af,af'
    ld      a,080h
    OUT0    Z182_MIMIC_IUS_IP,A
    ex      af,af'
    ei
    ret ;***************************************************************
***********;
; Function:   MIMIC_DLL_DLM_IH
            ;
; Prototype:  interrupt MIMIC_DLL_DLM_IH(void)
            ;
; Programmer: Doug Kehn
            ;
;
            ;
; Purpose:
            ;
;        This   function   is   the   MIMIC   Divisor   Latch   Least
Significant/Most    ;
;     Significant Byte ISR.  This ISR reads DLL &/or DLM registers
and     ;
;     determines the appropriate bit sequence to program ASCI baud
rate    ;
;     generator.
            ;
;
            ;
; References:
            ;
;       Zilog Inc., "Z80182 Zilog Intelligent Peripheral (ZIP)",
Preliminary   ;
;         Product Specification, Q2/92.
            ;
;
            ;
```

```
;       Any 16550 UART databook
;
;
; Special Notes:
;
;       This routine will only decode certain baud rates.  Thus, it is not
;       truely 16550 compatible.  The baud rates our: 150, 300, 600, 1200,
;       2400, 4800, 9600, 19200, 38400, 56800, 115200.  If any other baud
;       rate divisor is used, one of the above rates will be selected. The
;       baud rates are based on a 12.288MHz clock.
;
;
; Variable Description(s):
;
;   Input:
;
;   Return:
;
;   Local:
;
;
; Revision History:
;
;   Date      Programmer  Revision
;
; --------   ----------   --------
;
; 03/16/94   dk           v1.00    Initial release
;
;*****************************************************************************;

MIMIC_DLL_DLM_IH: .equal $
    ex      af,af'
    exx

;Bit 7 of LCR will be set to 1 when the PC is updating the divisor latches.
;When the PC resets (set to 0) bit 7 it is finished updating. Consequently,
;DLL and DLM are valid.
$Clear_Interrupt:
    IN0     A,Z182_MIMIC_LCR
    bit     7,a
    jr      nz,$Clear_Interrupt
```

```
;Get updated Baud Rate.
    IN0    L,Z182_MIMIC_DLL
    IN0    H,Z182_MIMIC_DLM ;Determine bit sequence for ASCI baud rate generator.  If h is
non-zero
;then the requested baud rate is below 600bps.
    ld     a,h
    cp     0
    jr     nz,$Low_Baud_Rate ;Baud rate is >= 600bps.
    ld     a,1
;Check for 600bps
    cp     192
    jp     c,$Next_0
    ld     a,BR_600
    ld     de,TTO_600
    jp     $Found $Next_0:
;Check for 1200bps
    cp     96
    jp     c,$Next_1
    ld     a,BR_1200
    ld     de,TTO_1200
    jp     $Found $Next_1:
;Check for 2400bps
    cp     48
    jp     c,$Next_2
    ld     a,BR_2400
    ld     de,TTO_2400
    jp     $Found $Next_2:
;Check for 4800bps
    cp     24
    jp     c,$Next_3
    ld     a,BR_4800
    ld     de,TTO_4800
    jp     $Found $Next_3:
;Check for 9600bps
    cp     12
    jp     c,$Next_4
    ld     a,BR_9600
    ld     de,TTO_9600
    jp     $Found
```

```
$Next_4:
;Check for 19200bps
    cp    6
    jp    c,$Next_5
    ld    a,BR_19200
    ld    de,TTO_19200
    jp    $Found $Next_5:
;Check for 38400bps
    cp    3
.IFDEF CPU_CLOCK
    jp    c,$Default
.ENDIF
.IFNDEF CPU_CLOCK
    jp    c,$Next_6:
.ENDIF
    ld    a,BR_38400
    ld    de,TTO_38400
    jp    $Found .IFNDEF CPU_CLOCK
  $Next_6:
  ;Check for 57600bps
    cp    2
    jp    c,$Next_7
    ld    a,BR_57600
    ld    de,TTO_57600
    jp    $Found $Next_7:
    ;Check for 115200bps
    cp    1
    jp    c,$Default
    ld    a,BR_115200
    ld    de,TTO_115200
    jp    $Found
.ENDIF $Low_Baud_Rate:
.IFNDEF CPU_CLOCK
  ;Check for 150bps
    ld    a,h
    cp    03h
    jp    c,$Next_7:
    ld    a,l
    cp    0
    jp    nz,$Next_7:
    ld    a,BR_150
    ld    de,TTO_150
    jp    $Found
```

```
        .ENDIF
;Check for 300bps
        ld      a,h
        cp      01h
        jp      c,$Default
        ld      a,l
        cp      80h
        jp      nz,$Default
        ld      a,BR_300
        ld      de,TTO_300
        jp      $Found $Default:
;9600bps is the default
        ld      a,BR_9600
        ld      de,TTO_9600
        jp      $Found $Found:
;Initialize ASCI baud rate generator and store in RAM.
        ld      c,a
        IN0     A,Z182_CNTLB0
        and     0D0h
        or      c
        OUT0    Z182_CNTLB0,A
        ld      (Baud_Rate),a ;Initialize MIMIC timeout timer.
        ld      a,Z85230_R12
        OUT0    Z85230_CHB_CR,A
        OUT0    Z85230_CHB_CR,E
        ld      a,Z85230_R13
        OUT0    Z85230_CHB_CR,A
        OUT0    Z85230_CHB_CR,D Exit_MIMIC_DLL_DLM_IH:
;Reset MIMIC interrupt status and exit ISR.
        ld      a,080h
        OUT0    Z182_MIMIC_IUS_IP,A
        ex      af,af'
        exx
        ei
        ret ;***************************************************************
***********;
; Function:     MIMIC_LCR_IH
                ;
; Prototype:    interrupt MIMIC_LCR_IH(void)
                ;
```

```
; Programmer: Doug Kehn
;
;
; Purpose:
;
;      This function is the MIMIC Line Control Register ISR.  This ISR reads ;
;      the Line Control Register and decodes the bits necessary to setup the ;
;      ASCI.
;
;
;
; References:
;
;        Zilog Inc., "Z80182 Zilog Intelligent Peripheral (ZIP)", Preliminary ;
;          Product Specification, Q2/92.
;
;
;
;      Any 16550 UART databook.
;
;
;
; Special Notes:
;
;      Only 7 or 8 data bits are supported.  The default is N81.  There is   ;
;      no support for the "break" function.
;
;
;
; Variable Description(s):
;
;   Input:
;
;   Return:
;
;   Local:
;
;
;
; Revision History:
;
;   Date     Programmer  Revision
;
; --------  ----------  --------
;
; 03/16/94  dk          v1.00     Initial release
;
```

```
;*****************************************************************
**********;

MIMIC_LCR_IH:      .equal $
    ex    af,af'
    exx
;Read Line Control Register & save a copy.
    IN0   A,Z182_MIMIC_LCR
    ld    b,a ;Parse Word Length Select, # of stop bits, & parity.
    and   0Fh ;Start + 8 bit data + 1 stop.
    cp    03h
    jr    nz,$Next_0
    ld    a,04h                         ;ASCI code
    ld    e,10                          ;# of bits per character
    ld    d,40                          ;# of bits per character *
4
    jp    Done $Next_0:
;Start + 8 bit data + 2 stop.
    cp    07h
    jr    nz,$Next_1
    ld    a,05h
    ld    e,11
    ld    d,44
    jp    Done $Next_1:
;Start + 8 bit data + parity + 1 stop.
    cp    0Bh
    jr    nz,$Next_2
    ld    a,06h
    ld    e,11
    ld    d,44
    jp    Done $Next_2:
;Start + 8 bit data + parity + 2 stop.
    cp    0Fh
    jr    nz,$Next_3
    ld    a,07h
    ld    e,12
    ld    d,48
    jp    Done $Next_3:
;Start + 7 bit data + 1 stop.
    cp    02h
```

```
        jr      nz,$Next_4
        ld      a,0
        ld      e,9
        ld      d,36
        jp      Done $Next_4:
;Start + 7 bit data + 2 stop.
        cp      06h
        jr      nz,$Next_5
        ld      a,01h
        ld      e,10
        ld      d,40
        jp      Done $Next_5:
;Start + 7 bit data + parity + 1 stop.
        cp      0Ah
        jr      nz,$Next_6
        ld      a,02h
        ld      e,10
        ld      d,40
        jp      Done $Next_6:
;Start + 7 bit data + parity + 2 stop.
        cp      0Eh
        jr      nz,$Default
        ld      a,03h
        ld      e,11
        ld      d,44
        jp      Done $Default:
;Start + 8 bit data + 1 stop.
        ld      a,04h
        ld      e,10
        ld      d,40

Done:
;Program ASCI mode.
        ld      c,a
        IN0     A,Z182_CNTLA0
        and     0F8h
        or      c
        OUT0    Z182_CNTLA0,A ;Set even or odd parity.
        ld      a,b
        and     10h
        jr      z,$Odd_Parity
```

```
        res     4,a
        jp      $Set_Parity $Odd_Parity:
        set     4,a $Set_Parity:
        ld      b,a
        IN0     A,Z182_CNTLB0
        and     0C0h
        or      b
        ld      hl,Baud_Rate
        or      (hl)
        OUT0    Z182_CNTLB0,A ;Initialize the Time Constant Registers.
        OUT0    Z182_MIMIC_RTCR,E
        OUT0    Z182_MIMIC_TTCR,E ;Initialize the Timeout Timer Constants
        OUT0    Z182_MIMIC_RTTC,D
        OUT0    Z182_MIMIC_TTTC,D Exit_MIMIC_LCR_IH:
;Reset MIMIC interrupt status and exit ISR.
        ld      a,080h
        OUT0    Z182_MIMIC_IUS_IP,A
        ex      af,af'
        exx
        ei
        ret ;***************************************************************
***********;
; Function:    MIMIC_MCR_IH
             ;
; Prototype:   interrupt MIMIC_MCR_IH(void)
             ;
; Programmer: Doug Kehn
             ;
;
             ;
; Purpose:
             ;
;      This function is the MIMIC Modem Control Register ISR.  This
ISR          ;
;          reads the Modem Control Register and decodes the bits
necessary to    ;
;      setup the ASCI
             ;
```

```
;                       ;
; References:
;                       ;
;       Zilog Inc., "Z80182 Zilog Intelligent Peripheral (ZIP)",
Preliminary ;
;           Product Specification, Q2/92.
;                       ;
;
;                       ;
;       Any 16550 UART databook.
;                       ;
;
;                       ;
; Special Notes:
;                       ;
;       The loop back feature of the 16550 is not supported.
;                       ;
;
;                       ;
; Variable Description(s):
;                       ;
;   Input:
;                       ;
;   Return:
;                       ;
;   Local:
;                       ;
;
;                       ;
; Revision History:
;                       ;
;   Date      Programmer   Revision
;                       ;
; --------   ----------   --------
;                       ;
; 03/16/94   dk           v1.00    Initial release
;                       ;
;**************************************************************
**********;

MIMIC_MCR_IH:       .equal $
    ex     af,af'
    exx
;Read Modem Control Register & save a copy.
    IN0    A,Z182_MIMIC_MCR
    ld     c,a ;Set DTR to the requested level.  Remember opposite polarity.
    bit    0,a
    jr     nz,$Set_DTR_Low
```

```
        ld      a,20h
        OUT0    Z182_PORT_B_DR,A
        jp      $Set_RTS $Set_DTR_Low:
        ld      a,00h
        OUT0    Z182_PORT_B_DR,A $Set_RTS:
;Set RTS to the requested level.  Remember opposite polarity.
        ld      a,c
        bit     1,a
        jr      nz,$Set_RTS_Low IN0     A,Z182_CNTLA0
        or      10h
        jp      Finished $Set_RTS_Low:
        IN0     A,Z182_CNTLA0
        and     EFh Finished:
        OUT0    Z182_CNTLA0,A ;Reset MIMIC interrupt status and exit ISR.
        ld      a,080h
        OUT0    Z182_MIMIC_IUS_IP,A
        ex      af,af'
        exx
        ei
        ret ;***************************************************************************;
; Function:     MIMIC_RBR_IH
                ;
; Prototype:    interrupt MIMIC_RBR_IH(void)
                ;
; Programmer: Doug Kehn
                ;
;
                ;
; Purpose:
                ;
;       This function is the MIMIC Receive Buffer Read ISR.  This ISR simply  ;
;       resets the IUS bit of the MIMIC IP register.
                ;
;
                ;
```

```
; References:
;
;       Zilog Inc., "Z80182 Zilog Intelligent Peripheral (ZIP)",
Preliminary ;
;         Product Specification, Q2/92.
;
;
;
; Special Notes:
;
;
;
; Variable Description(s):
;
;   Input:
;
;   Return:
;
;   Local:
;
;
;
; Revision History:
;
;   Date    Programmer  Revision
;
; --------  ----------  --------
;
; 02/14/94  dk          v1.00   Initial release
;
;***************************************************************
***********;

MIMIC_RBR_IH:     .equal $
    ex    af,af'
    ld    a,080h
    OUT0  Z182_MIMIC_IUS_IP,A
    ex    af,af'
    ei
    ret ;***************************************************************
***********;
; Function:   MIMIC_TTO_IH
;
; Prototype:  interrupt MIMIC_TTO_IH(void)
;
; Programmer: Doug Kehn
;
;
;
```

```
; Purpose:
    ;
;       This function is the MIMIC Transmitter Timeout with Data in
FIFO ISR. ;
;       This ISR simply resets the IUS bit of the MIMIC IP register.
        ;
;
    ;
; References:
    ;
;       Zilog Inc., "Z80182 Zilog Intelligent Peripheral (ZIP)",
Preliminary ;
;          Product Specification, Q2/92.
        ;
;
    ;
; Special Notes:
        ;
;
    ;
; Variable Description(s):
        ;
;   Input:
        ;
;   Return:
        ;
;   Local:
        ;
;
    ;
; Revision History:
        ;
;    Date     Programmer   Revision
        ;
; --------   ----------   --------
        ;
; 02/14/94   dk           v1.00    Initial release
        ;
;*****************************************************************
**********;

MIMIC_TTO_IH:     .equal $
    ex    af,af'
    ld    a,080h
    OUT0  Z182_MIMIC_IUS_IP,A
    ex    af,af'
    ei
    ret ;*****************************************************************
**********;
```

```
; Function:   MIMIC_THR_IH
            ;
; Prototype:  interrupt MIMIC_THR_IH(void)
            ;
; Programmer: Doug Kehn
            ;
;
            ;
; Purpose:
            ;
;     This function is the MIMIC Transmit Holding Register Written ISR.    ;
;     This ISR takes the data byte written to this register and sends it to ;
;     ASCI transmitter.
            ;
;
            ;
; References:
            ;
;       Zilog Inc., "Z80182 Zilog Intelligent Peripheral (ZIP)", Preliminary ;
;          Product Specification, Q2/92.
            ;
;
            ;
; Special Notes:
            ;
;
            ;
; Variable Description(s):
            ;
;  Input:
            ;
;  Return:
            ;
;  Local:
            ;
;
            ;
; Revision History:
            ;
;   Date      Programmer   Revision
            ;
; --------   ----------   --------
            ;
; 02/16/94   dk           v1.00    Initial release
            ;
;***************************************************************************;

MIMIC_THR_IH:      .equal $
```

```
        ex      af,af'
        exx $Wait_For_TDRE:
;Ensure ASCI transmitter data register is empty.
        IN0     A,Z182_STAT0
        bit     1,a
        jr      nz,$Send_Data ;Transmit data register is not empty.  If CTS is active, then wait for
;transmit data register to empty.
        IN0     A,Z182_CNTLB0
        and     20h
        jr      z,$Wait_For_TDRE ;CTS is not active but MIMIC says to send data.  So delay a little bit and
;then send the data.
        ld      b,0FFh
$Loop:
        djnz    $Loop $Send_Data:
;Move byte from MIMIC THR to ASCI TDR.
        IN0     A,Z182_MIMIC_THR
        OUT0    Z182_TDR0,A Exit_MIMIC_THR_IH:
;Reset MIMIC interrupt status and exit ISR.
        ld      a,080h
        OUT0    Z182_MIMIC_IUS_IP,A
        ex      af,af'
        exx
        ei
        ret ;***************************************************************************
;                              DATA SECTION
;
;***************************************************************************
        .uninit_data Baud_Rate:      .ds     1

;Mark end of module
        .program
        .end
```

```
;*******************************************************************
***********;
; Module Name:   _z182.src
               ;
; Creation Date: 11/24/93
               ;
; Assembler:     2500AD Software Inc.  v4.05
               ;
;
               ;
; Functions:
               ;
;
               ;
; Global Variable Description(s):
               ;
;      Z182_TimerOExpire - uchar -
               ;
;          Used to denote when the desired time has expired.
               ;
;*******************************************************************
***********;

;****************************
; Assembler/Linker directives
;****************************
    .linklist
    .symbols
    .options    dnh program:       .section
uninit_data:   .section .include z182.inc
    .include z182mac.inc
    .include z85230.inc ;**********************
; External declarations
;**********************
    .external  _ILAN_TransmitStatus
    .external  _ModemStatus ;********************
; Global declarations
;********************
    .global  _Z182_TimerOExpire
    .global  Z182_ASCI_0_IH
```

```
        .global Z182_ASCI_1_IH
        .global Z182_CS_IO_IH
        .global Z182_DMA_0_IH
        .global Z182_DMA_1_IH
        .global Z182_INT_1_IH
        .global Z182_INT_2_IH
        .global Z182_Timer_0_IH
        .global Z182_Timer_1_IH .program
```

;***************************************************************
;
; Function:   Z182_ASCI_0_IH
            ;
; Prototype:  interrupt Z182_ASCI_0_IH(void)
            ;
; Programmer: Doug Kehn
            ;
;
            ;
; Purpose:
            ;
;      This function is the Z182 ASCI 0 ISR.  This ISR determines which Rx   ;
;            interrupt source caused the interrupt and takes the appropriate         ;
;      action.
            ;
;
            ;
; References:
            ;
;        Zilog Inc., "Z80182 Zilog Intelligent Peripheral (ZIP)", Preliminary   ;
;           Product Specification, Q2/92.
            ;
;
            ;
;        Zilog Inc., "Z80180/Z180 MPU Microprocessor Unit", Technical Manual,   ;
;           Q1/91.
            ;
;
            ;
; Special Notes:
            ;
;         The DCD change interrupt only occurs on a Low to High transition.         ;
;         Remember opposite polarity when updating the MIMIC & global modem         ;

```
;      status.
;           ;
;
;           ;
; Variable Description(s):
;           ;
;   Input:
;           ;
;   Return:
;           ;
;   Local:
;           ;
;
;           ;
; Revision History:
;           ;
;   Date      Programmer   Revision
;           ;
; --------   ----------   --------
;           ;
; 03/11/94   dk           v1.00    Initial release
;           ;
;*****************************************************************
***********;

Z182_ASCI_0_IH:    .equal $
    ex      af,af'
    exx ld      hl,0FA00h
    ld      a,(hl)
    inc     a
    ld      (hl),a
    inc     hl ;Read the MIMIC Line Status Register.
    IN0     C,Z182_MIMIC_LSR ;Determine cause of interrupt.
    IN0     A,Z182_STAT0
    IN0     D,Z182_STAT0                    ;Read twice for DCD reset.

ld      (hl),a ld      b,a
    and     70h
    jr      z,$Check_Receive_Data

;Check overrun error.
    bit     6,a
    jr      z,$Check_Parity_Error
```

```
;Overrun Error.
   set   3,c $Check_Parity_Error:
   bit   5,a
   jr    z,$Check_Framing_Error ;Parity Error.
   set   2,c $Check_Framing_Error:
   bit   4,a
   jr    z,$Update_MIMIC_LSR ;Framing Error:
   set   3,c $Update_MIMIC_LSR
   OUT0  Z182_MIMIC_LSR,C ;Reset ASCI Error condition.
   IN0   A,Z182_CNTLA0
   res   3,a
   OUT0  Z182_CNTLA0,A
   jp    $Get_Data $Check_Receive_Data:
   bit   7,b
   jr    z,$Check_DCD_Change $Get_Data:
   IN0   A,Z182_TSR0
   OUT0  Z182_MIMIC_RBR,A              ;Send data to MIMIC $Check_DCD_Change:
   bit   2,d
   jr    z,Exit_Z182_ASCI_0_IH ;DCD change.
   IN0   A,Z182_MIMIC_MSR
   res   7,a
   OUT0  Z182_MIMIC_MSR,A
   ld    a,(_ModemStatus)              ;Update the global Modem
Status
   res   7,a
   ld    (_ModemStatus),a Exit_Z182_ASCI_0_IH:
   ex    af,af'
   exx
   ei
   ret
```

```
;*******************************************************************
***********;
; Function:    Z182_DMA_1_IH
            ;
; Prototype:   interrupt Z182_DMA_1_IH(void)
            ;
; Programmer: Doug Kehn
            ;
;
            ;
; Purpose:
            ;
;     This function is the Z182 DMA Channel 1 ISR.
            ;
;
            ;
; References:
            ;
;       Zilog Inc., "Z80182 Zilog Intelligent Peripheral (ZIP)",
Preliminary ;
;          Product Specification, Q2/92.
            ;
;
            ;
;     Zilog Inc., "Z80180/Z180 MPU Microprocessor Unit", Technical
Manual,  ;
;          Q1/91.
            ;
;
            ;
; Special Notes:
            ;
;
            ;
; Variable Description(s):
            ;
;   Input:
            ;
;   Return:
            ;
;   Local:
            ;
;
            ;
; Revision History:
            ;
;    Date     Programmer   Revision
            ;
; --------   -----------   --------
            ;
```

```
; 03/03/94  dk              v1.00      Initial release
          ;
;*************************************************************
***********;

Z182_DMA_1_IH:   .equal $
    ex    af,af'
    exx

;Last data byte has been sent, allow CRC/Flag termination.
    ld    a,Z85230_R10
    OUT0  Z85230_CHA_CR,A
    ld    a,Z85230_TRANSMIT_CRC
    OUT0  Z85230_CHA_CR,A ;Turn off DMA interrupts.
    IN0   A,Z182_DSTAT
    res   3,a
    OUT0  Z182_DSTAT,A ;Notify process that all data has been sent & the CRC is now being
;transmitted.
    ld    a,1
    ld    (_ILAN_TransmitStatus),a ex    af,af'
    exx
    ei
    ret ;*************************************************************
***********;
; Function:   Z182_INT_1_IH
            ;
; Prototype:  interrupt Z182_INT_1_IH(void)
            ;
; Programmer: Doug Kehn
            ;
;
            ;
; Purpose:
            ;
;     This function is the Z182 External Interrupt 1 ISR.  This ISR
is the   ;
;     Data Set Ready modem status line for the MIMIC interface.
Remember     ;
;     the polarity is opposite.
            ;
;
            ;
```

```
; References:
        ;
;       Zilog Inc., "Z80182 Zilog Intelligent Peripheral (ZIP)",
Preliminary  ;
;       Product Specification, Q2/92.
        ;
;
        ;
;       Zilog Inc., "Z80180/Z180 MPU Microprocessor Unit", Technical
Manual,  ;
;       Q1/91.
        ;
;
        ;
; Special Notes:
        ;
;
        ;
; Variable Description(s):
        ;
;  Input:
        ;
;  Return:
        ;
;  Local:
        ;
;
        ;
; Revision History:
        ;
;   Date    Programmer  Revision
        ;
; --------  ----------  --------
        ;
; 03/10/94  dk          v1.00    Initial release
        ;
;****************************************************************
**********;

Z182_INT_1_IH:    .equal $
    ex    af,af'
    exx
;Read MIMIC Modem Status Register.
    IN0   B,Z182_MIMIC_MSR
;Read Global Modem Status.
    ld    hl,_ModemStatus
    ld    c,(hl)
;Read the DSR (INT 1) input.
    IN0   A,Z182_PORT_C_DR
    and   40h
    jr    nz,$Set_DSR_LOW
```

```
        set     5,b
        set     5,c
        jp      $Update_Modem_Status $Set_DSR_LOW:
        res     5,b
        res     5,c $Update_Modem_Status:
        OUT0    Z182_MIMIC_MSR,B
        ld      (hl),c Exit_Z182_INT_1_IH:
;       ld      a,40h
;       OUT0    Z182_PORT_C_DR,A
        ex      af,af'
        exx
        ei
        ret ;***************************************************************
***********;
; Function:     Z182_INT_2_IH
                ;
; Prototype:    interrupt Z182_INT_2_IH(void)
                ;
; Programmer: Doug Kehn
                ;
;
                ;
; Purpose:
                ;
;       This function is the Z182 External Interrupt 2 ISR.  This ISR is the  ;
;       Ring Indicator modem status line for the MIMIC interface.  Remember    ;
;       the polarity is opposite.
;
                ;
; References:
                ;
;       Zilog Inc., "Z80182 Zilog Intelligent Peripheral (ZIP)", Preliminary   ;
;            Product Specification, Q2/92.
                ;
;
                ;
;       Zilog Inc., "Z80180/Z180 MPU Microprocessor Unit", Technical Manual,   ;
;            Q1/91.
                ;
```

```
;                   ;
; Special Notes:
;                   ;
;                   ;
;                   ;
; Variable Description(s):
;                   ;
;   Input:
;                   ;
;   Return:
;                   ;
;   Local:
;                   ;
;                   ;
;                   ;
; Revision History:
;                   ;
;   Date      Programmer   Revision
;                   ;
; --------    ----------   --------
;                   ;
; 03/10/94    dk           v1.00      Initial release
;                   ;
;***************************************************************
**********;

Z182_INT_2_IH:      .equal $
   ex     af,af'
   exx
;Read MIMIC Modem Status Register.
   IN0    B,Z182_MIMIC_MSR
;Read Global Modem Status.
   ld     hl,_ModemStatus
   ld     c,(hl)
;Read the RI (INT 2) input.
   IN0    A,Z182_PORT_C_DR
   and    080h
   jr     nz,$Set_RI_LOW set    6,b
   set    6,c
   jp     $Update_Modem_Status $Set_RI_LOW:
   res    6,b
   res    6,c $Update_Modem_Status:
   OUT0   Z182_MIMIC_MSR,B
   ld     (hl),c
```

```
Exit_Z182_INT_2_IH:
;       ld      a,080h
;       OUT0    Z182_PORT_C_DR,A
        ex      af,af'
        exx
        ei
        ret ;***************************************************************
***********;
; Function:     Z182_Timer_0_IH
                                                ;
; Prototype:    interrupt Z182_Timer_0_IH(void)
                                                ;
; Programmer: Doug Kehn
                                                ;
;
                                                ;
; Purpose:
                                                ;
;       This function is the Z182 Timer 0 ISR.  When the timer expires, a    ;
;       flag is set to let the waiting task/process know the desired time has ;
;       elapsed.
                                                ;
;
                                                ;
; References:
                                                ;
;       Zilog Inc., "Z80182 Zilog Intelligent Peripheral (ZIP)", Preliminary   ;
;           Product Specification, Q2/92.
                                                ;
;
                                                ;
;       Zilog Inc., "Z80180/Z180 MPU Microprocessor Unit", Technical Manual,   ;
;           Q1/91.
                                                ;
;
                                                ;
; Special Notes:
                                                ;
;
                                                ;
; Variable Description(s):
                                                ;
;   Input:
                                                ;
```

```
;   Return:
;
;   Local:
;
;
;
; Revision History:
;
;   Date      Programmer   Revision
;
; --------   -----------   --------
;
; 01/06/94   dk            v1.00      Initial release
;
;***************************************************************
***********;

Z182_Timer_0_IH: .equal $
;Save register status.
    ex      af,af'
    exx

;Reset interrupt condition & stop timer.
    IN0     A,Z182_TCR
    IN0     C,Z182_TMDR0L                ;Completes the resetting of
interrupt.
    and     Z182_TMDR0_DISABLE
    OUT0    Z182_TCR,A ;Signify that timer has expired.
    ld      a,1
    ld      (_Z182_Timer0Expire),a ;Restore register status & exit.
    exx
    ex      af,af'
    ei
    ret ;**********************           Unimplemented     ISR's
;****************************;
Z182_ASCI_1_IH:     .equal $
Z182_CS_IO_IH:      .equal $
Z182_DMA_0_IH:      .equal $
Z182_Timer_1_IH:    .equal $
    ei
    ret ;***************************************************************
***********;
```

```
; Data Space
            :
;***************************************************************
***********;
    .uninit_data _Z182_Timer0Expire:   .ds   1

;Mark end of module
    .program
    .end

;***************************************************************
***********;
; Module:      _z182sr.src
            ;
; Programmer: 2500AD Software Inc.
            ;
;
            ;
; Purpose:
            ;
;       2500AD Z80 C Compiler Run-Time Startup Routine
            ;
;
            ;
; References:
            ;
;       "Z-80 C Compiler", 2500AD Software Inc.
            ;
;
            ;
; Revision History:
            ;
;    Date    Programmer  Revision
            ;
; --------   ----------  --------
            ;
; 10/28/93   dk          v1.00    Modified to initialize Z80182
internal    ;
;                                 registers.
            ;
;
            ;
; 11/29/93   dk          v1.01    Modified for use in the PCMCIA
ILAN        ;
;                                 project
            ;
;***************************************************************
***********;
```

```
;****************************************************************
***********;
;   2500 A.D. Z80 C COMPILER RUN-TIME STARTUP ROUTINE
            ;
;****************************************************************
***********;
    .linklist
    .symbols
    .options    dnh ;****************************************************************
***********;
;Run-time startup conditional assembly definitions.
            ;
;****************************************************************
***********;
equate_defintions:   .section offset 0, ref_only   ;all 'equates'
section NO:     .equal 0            ;Define NO
YES:    .equal .not.NO      ;Define YES ;****************************************************************
***********;
;If the startup routine is going to be used with the 2500 A.D.
simulator   ;
;then it is common to set a breakpoint at the label 'end'. If the
I/O         ;
;is the interrupt driven serial driver, the output buffer may not
be          ;
;empty when this breakpoint is reached, and since the simulator
generates    ;
;interrupts based on machine cycle counts, the final results may
not be       ;
;output.
            ;
;Set the following to YES to assemble the code that checks to see
if           ;
;the output buffer is empty before reaching the label 'end'. This
will         ;
;cause all of the results to be output before the simulator will
stop.        ;
;****************************************************************
***********;
SIMULATOR:   .equal NO ;****************************************************************
***********;
;Define sections that will be used.  Doing it here generates the
            ;
;proper linking order.
            ;
```

```
;*******************************************************************
**********;
restart:                        .section        ;reset/restart instructions
section
restart_addr:                   .equal $
Z85230_Vectors:                 .section        ;Z85230 interrupt vectors
section
Z85230_Vectors_Addr:            .equal $
MIMIC_Vectors:                  .section        ;MIMIC interrupt vectors
section
MIMIC_Vectors_Addr:             .equal $
Z182_Vectors:                   .section        ;Z182 interrupt vectors
section
Z182_Vectors_Addr:              .equal $
program:                        .section        ;program section
prog_addr:                      .equal $
lib_program:                    .section        ;library program section
lib_program_addr:               .equal $
const_data:                     .section        ;constant data section
const_data_addr:                .equal $
lib_const_data:                 .section        ;library constant data
lib_const_data_addr:            .equal $
const_data_end:                 .section        ;end of constant data
const_data_end_addr:            .equal $
init_data:                      .section        ;initialized data section
init_data_addr:                 .equal $
lib_init_data:                  .section        ;library init data section
lib_init_data_addr:             .equal $
init_data_end:                  .section        ;end of all initialized data
init_data_end_addr:             .equal $
uninit_data:                    .section        ;uninitialized data section
uninit_data_addr:               .equal $
uninit_data_end:                .section        ;end of all uninitialized
data
uninit_data_end_addr:           .equal $
lib_temp_constants:             .section offset 0, ref_only
lib_temp_constants_end:         .section stacked, ref_only
lib_temp_constants_size:        .equal $ .program .global     end
    .external   _main
    .include    pcmcia.inc
    .include    z182.inc
    .include    z182mac.inc _COMPILE_DTG:   .date
```

```
;****************************************************************
***********;
;                        RESTART SECTION
          ;
;
          ;
;.restart begins at address 0.  This is the default starting
address for  ;
;the Z80 CPU.
          ;
;****************************************************************
***********;
    .restart di
    jp      c80rt_startup           ;reset .org    0008h
    jp      unexpected_interrupt    ;rst 8
    .org    0010h
    jp      unexpected_interrupt    ;rst 16
    .org    0018h
    jp      unexpected_interrupt    ;rst 24
    .org    0020h
    jp      unexpected_interrupt    ;rst 32
    .org    0028h
    jp      unexpected_interrupt    ;rst 40
    .org    0030h
    jp      unexpected_interrupt    ;rst 48
    .org    0038h
    jp      unexpected_interrupt    ;rst 56
    .org    0066h
    jp      DPRAM_IH                ;nmi ;****************************************************************
***********;
; Function:   DPRAM_IH
          ;
; Prototype:  interrupt DPRAM_IH(void)
          ;
; Programmer: Doug Kehn
          ;
;
          ;
; Purpose:
          ;
;     This function is the Dual Port RAM ISR.  This function will
read the  ;
;          two uppermost bytes in DPRAM and perform the desired
operation.            ;
```

```
;                          ;
;       This function copies the function "Program_Flash" from DPRAM to RAM &  ;
;       then jumps to the "Program_Flash" function (located in RAM).
                           ;
;
                           ;
; References:
                           ;
;
                           ;
; Special Notes:
                           ;
;       The copy program assumes that the "Program_Flash" function is less   ;
;       than 1020 bytes.
                           ;
;
                           ;
; Variable Description(s):
                           ;
;   Input:
                           ;
;   Return:
                           ;
;   Local:
                           ;
;
                           ;
; Revision History:
                           ;
;    Date     Programmer   Revision
                           ;
; --------    ----------   --------
                           ;
; 02/25/94    dk           v1.00    Initial release
                           ;
;***************************************************************
***********;

DPRAM_IH:      .equal $
    ld     ix,DPR_INTERRUPT_BYTE
    ld     a,(ix+0)
    cp     'P'
    jr     z,$Check_Next_Byte ld     a,(ix+1)                          ;This clears interrupt
    jp     Exit_DPRAM_IH $Check_Next_Byte:
    ld     a,(ix+1)
```

```
        cp      'F'
        jr      nz,Exit_DPRAM_IH

;Let PC know it is ok to load flash program to DPRAM.
        ld      (ix-2),'O'
        ld      (ix-1),'K'

;Initialize pointers.The flash program goes at the base of RAM.
        ld      de,RAM_BASE                     ;Flash program goes at base
of RAM.
        ld      iy,DP_RAM                       ;Length of code block in
DPRAM.

$Wait_For_Program_Block:
;Wait for PC to load flash program block into DPRAM.
        ld      a,(ix-2)
        cp      'C'
        jr      nz,$Wait_For_Program_Block ld      a,(ix-1)
        cp      'R'
        jr      nz,$Wait_For_Program_Block ;Get program block length.  If 0, then no more code.
        ld      c,(iy+0)
        ld      b,(iy+1)
        ld      a,c
        or      b
        jr      z,$No_More_Code ;Copy flash program block from DPRAM to RAM.
        ld      hl,DP_RAM+2
        ldir ;Let PC know that flash program block has been moved from DPRAM to
RAM.
        ld      (ix-2),'O'
        ld      (ix-1),'K'
        jp      $Wait_For_Program_Block $No_More_Code:
        ld      (ix-2),'O'
        ld      (ix-1),'K'

;Jump to flash program (located in RAM).
        jp      RAM_BASE

Exit_DPRAM_IH:
        ei
        ret
```

```
;****************************************************************
***********;
;                        VECTORS SECTION
         ;
;
         ;
;The vectors sections contains the the pointers to the interrupt
handling   ;
;routines.
         ;
;****************************************************************
***********;

.Z85230_Vectors
    .external Z85230_ChB_TBE_IH
    .external Z85230_ChB_ESC_IH
    .external Z85230_ChB_RCA_IH
    .external Z85230_ChB_SRC_IH
    .external Z85230_ChA_TBE_IH
    .external Z85230_ChA_ESC_IH
    .external Z85230_ChA_RCA_IH
    .external Z85230_ChA_SRC_IH
    .global Z85230_Int_Vector_Table
Z85230_Int_Vector_Table:   .equal $
    .word Z85230_ChB_TBE_IH     ;Channel B Tx Buffer Empty
    .word Z85230_ChB_ESC_IH     ;          External/Status Change
    .word Z85230_ChB_RCA_IH     ;          Rx CHaracter Available
    .word Z85230_ChB_SRC_IH     ;          Special Rx Condition
    .word Z85230_ChA_TBE_IH     ;Channel A Tx Buffer Empty
    .word Z85230_ChA_ESC_IH     ;          External/Status Change
    .word Z85230_ChA_RCA_IH     ;          Rx Character Available
    .word Z85230_ChA_SRC_IH     ;          Special Rx Condition .MIMIC_Vectors
    .external MIMIC_NoINT_IH
    .external MIMIC_FCR_IH
    .external MIMIC_DLL_DLM_IH
    .external MIMIC_LCR_IH
    .external MIMIC_MCR_IH
    .external MIMIC_RBR_IH
    .external MIMIC_TTO_IH
    .external MIMIC_THR_IH
    .global MIMIC_Int_Vector_Table
MIMIC_Int_Vector_Table:   .equal $
    .word MIMIC_NoINT_IH       ;No interrupt handler
    .word MIMIC_FCR_IH          ;FIFO Control Register interrupt
handler
    .word  MIMIC_DLL_DLM_IH     ;Divisor Latch LS/MS interrupt
handler
    .word  MIMIC_LCR_IH         ;Line Control Register interrupt
handler
```

```
    .word MIMIC_MCR_IH              ;Modem Control Register interrupt
hanlder
    .word MIMIC_RBR_IH              ;Receive Buffer Read interrupt
handler
    .word MIMIC_TTO_IH              ;Transmitter Timeout interrupt
handler
    .word MIMIC_THR_IH              ;Transmit Holding Register Written
int. handler .Z182_Vectors
    .external Z182_INT_1_IH
    .external Z182_INT_2_IH
    .external Z182_Timer_0_IH
    .external Z182_Timer_1_IH
    .external Z182_DMA_0_IH
    .external Z182_DMA_1_IH
    .external Z182_CS_IO_IH
    .external Z182_ASCI_0_IH
    .external Z182_ASCI_1_IH
    .global   Z182_Int_Vector_Table
Z182_Int_Vector_Table:    .equal $
    .word Z182_INT_1_IH             ;External interrput 1 handler
    .word Z182_INT_2_IH             ;                   2
    .word Z182_Timer_0_IH           ;Timer 0 interrupt handler
    .word Z182_Timer_1_IH           ;      1
    .word Z182_DMA_0_IH             ;DMA channel 0 interrput handler
    .word Z182_DMA_1_IH             ;            1
    .word Z182_CS_IO_IH             ;Clock serial I/O interrupt handler
    .word Z182_ASCI_0_IH            ;Async. serial comm. interface ch. 0
int. hdlr
    .word Z182_ASCI_1_IH            ;Async. serial comm. interface ch. 1
int. hdlr .program ;***************************************************************
***********;
;Unexpected Interrupt Handler.
                    ;
;***************************************************************
***********;
unexpected_interrupt:    .equal $
    ret ctrl_c_reset:    .equal $
    di ;***************************************************************
***********;
```

```
;Normal startup routine.
        ;
;***************************************************************
***********;
c80rt_startup:     .equal $ ;***************************************************************
***********;
;Initialize Z80182 internal registers.  This will only initialize
the min-   ;
;imum number of registers required to setup the rest of the system.
        ;
;***************************************************************
***********;
;Initialize the Operation Mode Control Register.
        ;
;Note: Disabling the external I/O access must be done before
accessing the   ;
;       internal I/O.  REMEMBER to re-enable the external I/O access
after      ;
;       *ALL* the internal I/O has been initialized.
        ;
;***************************************************************
***********;
    ld    a,Z182_OMCR_INIT     ;Disable external I/O accesses.
    OUT0  Z182_OMCR,A ;Initialize the CPU Control Register.
    ld    a,Z182_CCR_INIT
    OUT0  Z182_CCR,A ;Initialize the Wait State Generator.
    ld    a,Z182_DCNTL_INIT
    OUT0  Z182_DCNTL,A ;Initialzie the DMA Status Register.
    ld    a,Z182_DSTAT_INIT
    OUT0  Z182_DSTAT,A ;Initialize MMU Registers.
    ld    a,Z182_CBAR_INIT
    OUT0  Z182_CBAR,A ;Initialize System Control Registers.
    IN0   A,Z182_RCR
    and   7Fh
    OUT0  Z182_RCR,A ;Initialize ROM/RAM Chip Select Registers.
    ld    a,Z182_ROMABR_INIT   ;ROM upper boundry
    OUT0  Z182_ROMABR,A
    ld    a,Z182_RAMLBR_INIT   ;RAM lower boundry
```

```
        OUT0    Z182_RAMLBR,A
        ld      a,Z182_RAMUBR_INIT      ;RAM upper boundry
        OUT0    Z182_RAMUBR,A ;Initialize the System Configuration Register.
        ld      a,Z182_SYS_CONFIG_REG_INIT
        OUT0    Z182_SYS_CONFIG_REG,A ;Initialize the Interrupt Edge/Pin MUX Register.
        ld      a,Z182_INT_MUX_CNTRL_INIT
        OUT0    Z182_INT_MUX_CNTRL,A ;Initialize the Interrupt Vector Low Register for use with all internal,
;int1, and int2 interrupts.
        ld      a,Z182_IL_INIT
        OUT0    Z182_IL,A ;***************************************************************************;
;Initialize CPU core interrupt registers.
        ;
;***************************************************************************;
        ld      a,.high.Z85230_Int_Vector_Table    ;Set high byte of vector table
        ld      i,a
        im      2                                  ;Select interrupt mode 2

;***************************************************************************;
;Move initialized data into ram.
        ;
;***************************************************************************;
        ld      hl,init_data_end_addr   ;Load addr of end of init data
        ld      de,init_data_addr       ;Load addr of start of init data
        and     a
        sbc     hl,de                   ;Check for size = 0
        jr      z,no_init_data          ;Skip move if size = 0
        ld      ix,const_data_end_addr  ;Load addr of init data in rom
        ld      iy,init_data_addr       ;Load addr init data will run at
init_loop:
        ld      a,(ix+0)                ;Load init data byte
        ld      (iy+0),a                ;Store init data byte
        inc     ix                      ;Inc source ptr
        inc     iy                      ;Inc destination ptr
        dec     hl                      ;Decrement byte counter
        ld      a,h                     ;Check for done
```

```
            or      a,1
            jr      nz,init_loop            ;Loop till init data is moved
;***************************************************************
;Zero uninitialized data area.
            ;
;***************************************************************
no_init_data:
            ld      hl,uninit_data_end_addr ;Load addr of end of uninit data
            ld      de,uninit_data_addr     ;Load addr of begin uninit data
            and     a
            sbc     hl,de                   ;Get size of uninit data
            jr      z,$no_uninit_data       ;Skip initialization if = 0
            ex      de,hl                   ;Xfer uninit data size -> de
            ld      hl,uninit_data_addr     ;Load addr of uninit data
$uninit_loop:
            ld      (hl),0                  ;Zero uninitialized data area
            inc     hl                      ;Increment pointer
            dec     de                      ;Decrement byte counter
            ld      a,e                     ;Check for end of uninit data
            or      a,d
            jr      nz,$uninit_loop
;***************************************************************
;Set up the system stack & cpu control registers.
            ;
;***************************************************************
$no_uninit_data:
            ld      hl,STACK                ;Load stack pointer
            ld      de,lib_temp_constants_size ;Load size of lib temps
            and     a
            sbc     hl,de                   ;Allocate library temp space
            ld      (__lib_temp_ptr),hl
            ld      sp,hl                   ;Xfer stack value -> sp
;***************************************************************
; Hand program control over to "main".
            ;
;***************************************************************
            call    _main                   ;Execute program
;***************************************************************
;Here to loop when using the simulator so that the output buffer
            ;
```

```
;can empty.
        ;
;***************************************************************
**********;
.iftrue SIMULATOR=YES .endif end:
    halt ;***************************************************************
**********;
;                      INTERRUPT FUNCTION ENTRY CODE
        ;
;***************************************************************
**********;
    .global __interrupt_entry __interrupt_entry:   .equal    $
    ex      (sp),ix                         ;Save ix, return addr -> ix
    push    iy                              ;Save registers
    push    af
    push    bc
    push    de
    push    hl
    ld      hl,(__lib_temp_ptr)             ;Save temporary pointer
    push    hl
    ld      hl,0
    add     hl,sp
    ld      de,lib_temp_constants_size      ;Allocate new lib temps
    and     a,a
    sbc     hl,de
    ld      (__lib_temp_ptr),hl             ;Store lib temp ptr
    ld      sp,hl                           ;Xfer new stack value -> sp
    jp      (ix)                            ;Return to interrupt routine ;***************************************************************
**********;
;                      INTERRUPT FUNCTION EXIT CODE
        ;
;***************************************************************
**********;
    .global __interrupt_exit __interrupt_exit:    .equal    $
    ld      hl,0
    add     hl,sp
    ld      de,lib_temp_constants_size      ;Deallocate lib temps
    add     hl,de
```

```
        ld      sp,hl
        pop     hl                              ;Restore temporary pointer
        ld      (__lib_temp_ptr),hl             ;Restore temporary pointer
        pop     hl                              ;Restore registers
        pop     de
        pop     bc
        pop     af
        pop     iy
        pop     ix
        ei
        reti                                    ;Return to interrupted routine
```

```
;***************************************************************************;
;                              I/O INPUT                                    ;
;                                                                           ;
;Input the data from the port in register l.  Return with the port data in  ;
;register a.                                                                ;
;                                                                           ;
;The call in C is as follows:                                               ;
;                                                                           ;
;   c = in (port);                                                          ;
;   char c, port;                                                           ;
;   char in (char);                                                         ;
;***************************************************************************;
        .global _in _in:    .equal  $
        ld      c,l     ;Xfer port address -> c
        ld      b,0     ;Clear high byte of address
        in      a,(c)
        ret
```

```
;***************************************************************************;
;                              I/O OUTPUT                                   ;
;                                                                           ;
```

```
;
;
;Output the data in register l to the port whose address is in
register e.   ;
;
;
;The call in C is as follows:
            ;
;
            ;
;   out (c, port);
            ;
;   char c, port;
            ;
;   void out (char, char);
            ;
;****************************************************************
***********;
    .global _out _out:  .equal $
    ld      c,e         ;Xfer port address -> c
    ld      b,0         ;Clear high byte of address
    out     (c),1
    ret ;****************************************************************
***********;
;                       STANDARD I/O
            ;
;
            ;
;The following routines perform all the functions necessary to
operate the  ;
;standard I/O device.
            ;
;    Standard In  -> Keyboard
            ;
;    Standard Out -> Monitor
            ;
;
            ;
;Additionally, it is assumed that ASCI 1 of the Z80182 is to be
used for    ;
;this function.
            ;
;****************************************************************
***********;

CR:                 .equal 0Dh                  ;Carriage return
LF:                 .equal 0Ah                  ;Line feed
```

```
BS:                .equal 08h              ;Backspace
XON:               .equal 'Q'-40h          ;Xon code
XOFF:              .equal 'S'-40h          ;Xoff code
CTRL_C:            .equal 'C'-40h          ;Control-C
INPUT_BUF_SIZE:    .equal 256              ;Size of input buffer
OUTPUT_BUF_SIZE:   .equal 256              ;Size of output buffer
INPUT_XON_COUNT:   .equal 30               ;Send Xon 30 bytes
before empty
INPUT_XOFF_COUNT:  .equal INPUT_BUF_SIZE-15   ;Send Xoff 15 bytes
before full .uninit_data input_buf:         .ds INPUT_BUF_SIZE      ;Allocate input buffer
output_buf:        .ds OUTPUT_BUF_SIZE     ;Allocate output buffer .init_data .global  __lib_temp_ptr
        .global  __standard_in
        .global  __standard_out
        .global  __output_table
        .global  __input_table
        .global  __unget_table
        .global  __raw_mode
        .global  _ctrl_c_signal __lib_temp_ptr:          .word              ;Pointer to library
temporary storage
__standard_in:           .word 0            ;Initialize to serial input
port
__standard_out:          .word 0            ;Initialize to serial output
port
__output_table:          .word serial_out   ;Address of serial port
output routine
__input_table:           .word serial_in    ;Address of serial port
input routine
end_of_input_table:      .equal $
__unget_table:                                               .blkb
((end_of_input_table-__input_table)/2)*2,0

;Serial data storage definitions.

__raw_mode:        .byte 0                 ;Enable all input character
processing
_ctrl_c_signal:    .word ctrl_c_reset      ;Control c interrupt signal
routine output_buf_empty:  .byte 1                 ;Initialize output buffer empty
flag
```

```
input_buf_ptr:      .word input_buf    ;Initialize input buffer
pointer
rxd_buf_ptr:        .word input_buf    ;Initialize receiver buffer
pointer
input_buf_count:    .word 0            ;Initialize # of characters in
buffer
rxd_buf_count:      .word 0            ;Initialize # of buffered
characters
output_buf_ptr:     .word output_buf   ;Initialize output buffer
pointer
txd_buf_ptr:        .word output_buf   ;Initialize xmitter buffer
pointer
output_buf_count:   .word 0            ;Initialize # of characters in
buffer
xoff_received:      .byte 0            ;Xon/Xoff transmit control flag
xoff_sent:          .byte 0            ;Xon/Xoff receive control flag .program .external _Term
    .global serial_out
    .global serial_in ;Return to the calling program with the character in register a.

serial_in:
    call    get_character
    ret get_character: .equal $
$empty_loop:
    di
    ld      hl,(input_buf_count)       ;Load character count
    ld      de,0
    and     a
    sbc     hl,de                      ;Check for input buffer
empty
    jr      nz,$not_empty ei
    jr      $empty_loop                ;Wait for character if empty $not_empty:
    ld      hl,(input_buf_count)       ;Load character count
    dec     hl                         ;Decrement character count
    ld      (input_buf_count),hl       ;Store new character count
    ld      hl,(input_buf_ptr)         ;Load input buffer ptr
    ld      a,(hl)                     ;Load character
    push    af                         ;Save character
    inc     hl                         ;Increment buffer ptr
    push    hl                         ;Save buffer ptr
    ld      de,input_buf+INPUT_BUF_SIZE ;Check for at end of buffer
```

```
        and     a
        sbc     hl,de
        pop     hl                          ;Restore buffer ptr
        jr      nz,$not_at_end              ;Not at end of buffer if not
= 0 ld      hl,input_buf                ;Init. buffer ptr. to start
of buffer
$not_at_end:
        ld      (input_buf_ptr),hl          ;Store new input buffer ptr
        ld      a,(xoff_sent)               ;Check to see if 'xoff' was
sent
        and     a,a
        jr      z,$xoff_not_sent            ;No if flag = 0 ld      hl,(input_buf_count)        ;Load # of characters in
lines
        ld      de,(rxd_buf_count)          ;Add # of characters being
        add     hl,de                       ; assembled into lines
        ld      de,INPUT_XON_COUNT          ;See if 'Xon' should be sent
        and     a,a
        sbc     hl,de
        jr      nc,$xoff_not_sent           ;No if total char count >
XON count ld      a,XON                       ;Else send 'xon' to sender
        call    store_character xor     a,a
        ld      (xoff_sent),a               ;Clear 'Xoff_sent' flag
$xoff_not_sent:
        pop     af                          ;Restore character
        ret ;Store the character in 'a' in the output buffer.
serial_out:
        cp      a,LF
        jr      nz,not_lf ld      a,CR
        call    store_character ld      a,LF
not_lf:
        call    store_character
        ret store_character:   .equal $
        push    af                          ;Save character to output
$full_loop:
        di
```

```
    ld      hl,(output_buf_count)       ;Load character count
    ld      de,OUTPUT_BUF_SIZE          ;Check for output buffer full
    and     a,a
    sbc     hl,de
    jr      nz,$not_full                ;Wait for buffer to empty 1
                                        ; character
    ei
    jr      $full_loop                  ;Loop till a char is transmitted $not_full:
    ld      hl,(output_buf_count)       ;Load character count
    inc     hl                          ;Increment character count
    ld      (output_buf_count),hl       ;Store new character count
    ld      hl,(output_buf_ptr)         ;Load output buffer ptr
    pop     af                          ;Return character to output
    ld      (hl),a                      ;Store character in output buffer
    ld      b,a                         ;Save character
    inc     hl                          ;Increment output buffer ptr
    push    hl                          ;Save buffer ptr
    ld      de,output_buf+OUTPUT_BUF_SIZE ;Check for at end of buffer
    and     a,a
    sbc     hl,de
    pop     hl                          ;Restore buffer ptr
    jr      nz,$not_at_end ld      hl,output_buf               ;Init ptr to start of buffer
$not_at_end:
    ld      (output_buf_ptr),hl         ;Store new output buffer ptr
    ld      a,(output_buf_empty)        ;Load the buffer empty flag
    and     a,a                         ;Check to see if xmitter was off
    jr      z,$done                     ;No if buffer wasn't empty xor     a,a
    ld      (output_buf_empty),a        ;Clear the buffer empty flag
    ld      a,0Dh                       ;Enable transmitter interrupts
    OUT0    Z182_STAT1,A
```

```
        call    transmit_interrupt              ;Start transmitter back
up $done:
    ld      a,b                                 ;Return character
    ei
    ret .page ;Serial port interrupt service routine.  Both transmitter &
receiver
;interrupts vector here.

serial_interrupt: .equal $
    push    af                                  ;Save registers that will be used
    push    de
    push    hl ;Input a character if the 'rdrf' bit is set.  Process backspace,
signal
;characters, character echoing, carriage returns and xon/xoff if
;__raw_mode = 0.

IN0     A,Z182_STAT1
    and     a,70h                               ;Check for Frame, Parity, or Overrun
errors
    jr      z,$no_rxd_err jp      $xmit_check $no_rxd_err:
    IN0     A,Z182_STAT1
    and     a,080h                              ;Check for character ready
    jp      z,$xmit_check ld      a,(__raw_mode)                      ;Check for raw mode
    and     a,a
    jr      z,$not__raw_mode                    ;Process characters if _raw_mode = 0

IN0     A,Z182_TSR1                         ;Load character
    jp      $raw_mode                           ;Skip character processing $not__raw_mode:
    IN0     A,Z182_TSR1                         ;Load character ;Process Xoff.
    cp      a,XOFF
    jr      nz,$not_xoff ld      a,1
    ld      (xoff_received),a                   ;Set 'xoff_received' flag
```

```
        jp      $xmit_check             ;Check transmitter

;Process Xon.
$not_xoff:
   cp      a,XON
   jr      nz,$not_xon ld      a,(xoff_received)            ;Check to see if 'xoff' was
received
   and     a,a
   jp      z,$xmit_check                ;Ignore 'Xon' if 'Xoff' was not
received xor     a,a
   ld      (xoff_received),a            ;Clear 'xoff_received' flag
   ld      a,(output_buf_empty)         ;Test buffer empty flag
   and     a,a
   jp      nz,$xmit_check               ;Don't enable transmitter if empty ld      (output_buf_empty),a         ;Clear buffer empty flag
   ld      a,0Dh                        ;Enable transmitter interrupts
   OUT0    Z182_STAT1,A
   jp      $xmit_check ;Process backspace.
$not_xon:
   cp      a,BS
   jr      nz,$not_bs ld      hl,(rxd_buf_count)           ;Load character per line count
   ld      a,1                          ;Check for no characters in this line
   or      a,h
   jr      nz,$not_empty                ;Delete last character if not empty jp      $xmit_check                  ;Else just ignore the backspace $not_empty:
   dec     hl                           ;Decrement character count
   ld      (rxd_buf_count),hl           ;Store new character per line count
   ld      hl,(rxd_buf_ptr)             ;Load receiver buffer ptr
   push    hl                           ;Save receiver buffer ptr
   ld      de,input_buf                 ;Check for at start of buffer
   and     a,a
   sbc     hl,de
   pop     hl                           ;Restore receiver buffer ptr
   jr      nz,$not_at_start ld      hl,input_buf+INPUT_BUF_SIZE  ;Load addr of end of buf
$not_at_start:
   dec     hl                           ;Decrement buffer pointer
   ld      (rxd_buf_ptr),hl             ;Store new receiver buffer ptr
   ld      a,(output_buf_empty)         ;Check for output buffer empty
```

```
        and     a,a
        jr      z,$bs_loop1             ;Wait for transmitter to empty xor     a,a
        ld      (output_buf_empty),a    ;Else clear flag & start transmit
        ld      a,0Dh                   ;Enable transmitter interrupts
        OUT0    Z182_STAT1,A
$bs_loop1:
        IN0     A,Z182_STAT1            ;Wait till transmitter is ready
        and     a,02h
        jr      z,$bs_loop1 ld      a,BS                    ;Echo backspace
        OUT0    Z182_TDR1,A
$bs_loop2:
        IN0     A,Z182_STAT1            ;Wait till transmitter is ready
        and     a,02h
        jr      z,$bs_loop2 ld      a,' '                   ;Echo space
        OUT0    Z182_TDR1,A
$bs_loop3:
        IN0     A,Z182_STAT1            ;Wait till transmitter is ready
        and     a,02h
        jr      z,$bs_loop3 ld      a,BS                    ;Echo backspace
        OUT0    Z182_TDR1,A
        jp      $xmit_check ;Process signal characters.
$not_bs:
        cp      a,CTRL_C                ;Check for Control-C
        jr      nz,$not_ctrl_c ld      hl,$signal_return       ;Load addr of instr after signal
                                        ; handler has been executed
        push    hl                      ;Push return address on stack
        ld      hl,(_ctrl_c_signal)     ;Load ptr to signal routine addr
        jp      (hl)                    ;Execute the signal handler. returns
                                        ; to the next instruction $not_ctrl_c:
        cp      a,14h                   ;Check for Control-T
        jr      nz,$not_signal ld      hl,$signal_return       ;Load addr of instr after signal
                                        ; handler has been executed
        push    hl                      ;Push return address on stack
        ld      hl,_Term                ;Load ptr to signal routine addr
        jp      (hl)                    ;Execute the signal handler. Returns
                                        ; to the next instruction
```

```
$signal_return:
    jp      $xmit_check

;Process carriage returns.
$not_signal:
    cp      a,CR                        ;Check for carriage return
    jr      nz,$not_cr ld      a,LF                        ;Replace return with line feed ;Store the character.
$raw_mode:      .equal  $
$not_cr:
    ld      hl,(rxd_buf_ptr)            ;Load receiver buffer ptr
    ld      (hl),a                      ;Store character in input buffer
    inc     hl                          ;Increment receiver buffer ptr
    push    af                          ;Save character
    push    hl                          ;Save buffer ptr
    ld      de,input_buf+INPUT_BUF_SIZE ;Check for end of buffer
    and     a,a
    sbc     hl,de
    pop     hl                          ;Restore buffer ptr
    jr      nz,$not_end_of_buf ld      hl,input_buf                ;Load addr of start of buffer
$not_end_of_buf:
    ld      (rxd_buf_ptr),hl            ;Store new buffer ptr ;If processing characters, store up an entire line before telling the
;routine that actually reads the characters from the buffer that
;anything is in the buffer.  This is done by keeping a separate
;character counter.
;The only reason to do this is to allow for character editing such
;as backspace.
    ld      a,(__raw_mode)              ;Check for raw mode
    and     a,a
    jr      z,$not_raw_mode_1

;Here to just store the character in raw mode.
    ld      hl,(input_buf_count)        ;Load character count
    inc     hl                          ;Increment character count
    ld      (input_buf_count),hl        ;Store new character count
    pop     af                          ;Clear character off stack
    ld      hl,0
    ld      (rxd_buf_count),hl          ;Zero character per line count
    jp      $xmit_check                 ; in case modes are switched ;Here to store the character when not in raw mode.
$not_raw_mode_1:    .equal  $
    ld      hl,(rxd_buf_count)          ;Load character per line count
```

```
        inc     hl                          ;Increment character per line count
        ld      (rxd_buf_count),hl          ;Store new character per line count ;Echo the character.
        ld      a,(output_buf_empty)        ;Check for output buffer empty
        and     a,a
        jr      z,$echo_loop1               ;Wait till transmitter is ready xor     a,a
        ld      (output_buf_empty),a        ;Else clr flag & start transmit
        ld      a,0Dh                       ;Enable transmitter interrupts
        OUT0    Z182_STAT1,A
$echo_loop1:
        IN0     A,Z182_STAT1                ;Wait till transmitter is ready
        and     a,02h
        jr      z,$echo_loop1 pop     af                          ;Return character
        cp      a,LF                        ;Check for line feed
        jr      nz,$not_lf ;Here when the character was a line feed.  Echo a carriage return
;line feed pair.
        ld      a,CR          ;Echo carriage return line feed pair
        OUT0    Z182_TDR1,A ;Since the character was a carriage return (which was converted to
;a line feed up above) set the input buffer character count equal to
;the character per line count + however many characters were in the
;input buffer previously.
        ld      hl,(rxd_buf_count)          ;Load ther char per line count
        ld      de,(input_buf_count)        ;Add the # of existing characters
        add     hl,de
        ld      (input_buf_count),hl        ;Let the input routine know that
                                            ; the line is ready
        ld      hl,0
        ld      (rxd_buf_count),hl          ;Clear char per line count ;Echo a line feed.
$echo_loop2:
        IN0     A,Z182_STAT1
        and     a,02h
        jr      z,$echo_loop2 ld      a,LF
$not_lf:
        OUT0    Z182_TDR1,A                 ;Echo character
```

```
;Check to see if the input buffer has reached the point where the
;sender should be sent an 'xoff' code.
;Note that if the interrupt routine is not running in 'raw' mode,
;characters are stored until a carriage return is received.  In this
;case if the line is larger than the point where 'xoff' should be sent
;the input routine will lock up.  If this case is detected, 'xoff' will
;not be sent.
    ld      a,(xoff_sent)           ;Check to see if xoff was sent
    and     a,a
    jr      nz,$xmit_check          ;Do nothing if already sent ld      hl,(rxd_buf_count)      ;Load the characters this line cnt
    ld      de,(input_buf_count)    ;Add the # of chars in prev lines
    add     hl,de
    ld      de,INPUT_XOFF_COUNT     ;Check to see if xoff should be sent
    and     a,a
    sbc     hl,de
    jr      c,$xmit_check           ;Not at limit if count < XOFF count ld      hl,(rxd_buf_count)      ;Check to see if the line is too long
    ld      de,INPUT_XOFF_COUNT
    and     a,a
    sbc     hl,de
    jr      nc,$xmit_check          ;Don't send xoff or the input will lock $xoff_loop:
    IN0     A,Z182_STAT1            ;Wait till transmitter becomes ready
    and     a,02h
    jr      z,$xoff_loop ld      a,XOFF                  ;Send 'xoff' to sender
    OUT0    Z182_TDR1,A
    ld      a,1
    ld      (xoff_sent),a           ;Set 'xoff_sent' flag ;Output a character if the transmitter is empty and there is a character
;to output.
$xmit_check:
    call    transmit_interrupt
$done:
    pop     hl      ;Restore registers
    pop     de
    pop     af
    ei              ;Enable interrupts
    reti
```

;Output a character if the transmitter is empty and there is a character
;to output.

```
transmit_interrupt:     .equal $
    IN0    A,Z182_STAT1              ;Check for transmitter empty
    and    a,02h
    jr     z,$done ld     a,(xoff_received)         ;Check for 'xoff' received
    and    a,a
    jr     nz,$turn_off_tie          ;Turn off transmitter interrupt if so ld     hl,(output_buf_count)     ;Load character count
    ld     a,1                       ;Check for character count = 0
    or     a,h
    jr     nz,$send_nxt_char         ;Send next character if not empty ld     a,1
    ld     (output_buf_empty),a      ;Set buffer empty flag, which allows
                                     ; the routine that stores a char to
                                     ; start transmission up again
$turn_off_tie:
    ld     a,08h                     ;Disable transmitter interrupts
    OUT0   Z182_STAT1,A
    jr     $done $send_nxt_char:
    dec    hl                        ;Decrement character count
    ld     (output_buf_count),hl     ;Store new character count
    ld     hl,(txd_buf_ptr)          ;Load output buffer ptr
    ld     a,(hl)                    ;Load character to output
    inc    hl                        ;Increment output buffer ptr
    OUT0   Z182_TDR1,A               ;Xmit character
    push   hl                        ;Save buffer ptr
    ld     de,output_buf+OUTPUT_BUF_SIZE    ;Check for end of buffer
    and    a,a
    sbc    hl,de
    pop    hl                        ;Restore buffer ptr
    jr     nz,$not_buf_end ld     hl,output_buf             ;Load addr of start of buffer
$not_buf_end:
    ld     (txd_buf_ptr),hl          ;Store new output buffer ptr
$done:
    ret
```

;Input buffer flush routine.

```
        .global __flush_input_buffer

__flush_input_buffer:       .equal $
    push    af                          ;Save registers that will be used
    push    bc
    push    hl
    di                                  ;Disable interrupts
    ld      hl,0
    ld      (input_buf_count),hl        ;Zero character count
    ld      (rxd_buf_count),hl          ;Zero receiver char count
    ld      hl,input_buf                ;Set buffer ptr's to start of
buffers
    ld      (rxd_buf_ptr),hl
    ld      (input_buf_ptr),hl
    xor     a,a
    ld      (xoff_received),a           ;Clear 'xoff_received' flag
    ld      a,(xoff_sent)               ;Check to see if 'xoff' was sent
    and     a,a
    jr      z,$1                        ;Do nothing if not ld      a,XON                       ;Else send 'xon' code
    call    store_character xor     a,a
    ld      (xoff_sent),a               ;Clear 'xoff_sent' flag
$1:
    ei                                  ;Enable interrupts
    pop     hl
    pop     bc
    pop     af
    ret .page ;This routine handles monitor calls from external routines.  The
;routine function is in 'hl'.  The following functions are implemented,
;with the corresponding 'hl' value.
;       0 - Input a character from the serial port.  Return the character
;           in register e.
;       1 - Output a character to the serial port.  The character to output
;           is in register a.

.init_data funct_table:    .word serial_in         ;Serial input routine
                .word serial_out        ;Serial output routine .program
```

```
c80rt_functions:    .equal $
    push    bc                      ;Save registers that will be used
    push    iy
    add     hl,hl                   ;Multiply function # by 2
    ld      bc,funct_table          ;Get index to table entry
    add     hl,bc
    push    hl                      ;Xfer function address ptr -> iy
    pop     iy
    ld      l,(iy+0)                ;Load low byte of function address
    ld      h,(iy+1)                ;Load high byte of function address
    pop     iy                      ;Restore used registers
    pop     bc
    jp      (hl)                    ;Execute routine, return directly
                                    ; to caller ;*****************************************************************************
**********;
;The following function determines if a line is ready for processing.       ;
;Prototype: char kbhit(void)
                    ;
;Return (register A):    0 = Line not ready
                    ;
;                        1 = Line ready
                    ;
;*****************************************************************************
**********;
    .global _kbhit _kbhit:     .equal $
    di
    ld      hl,(input_buf_count)    ;Load character count
    ld      de,0
    and     a
    sbc     hl,de
    jr      nz,Line_Ready xor     a                       ;Line not ready
    ei
    ret Line_Ready:
    ld      a,1
    ei
    ret .program
    .end ;*****************************************************************************
**********;
```

```
; Module Name:    _z85230.src
                ;
; Creation Date: 11/03/93
                ;
; Assembler:     2500AD Software Inc.  v4.05
                ;
;
                ;
; Functions:
                ;
;
                ;
; Global Variable Description(s):
                ;
;****************************************************************
***********;

;***************************
; Assembler/Linker directives
;***************************
    .linklist
    .symbols
    .options    dnh program: .section .include pcmcia.inc
    .include z182.inc
    .include z182mac.inc
    .include z85230.inc ;**********************
; External declarations
;**********************
    .external _ILAN_EOF_Status
    .external _ILAN_FrameLength
    .external _ILAN_ReceiveBuffer
    .external _ILAN_ReceiveBufferBase
    .external _ILAN_ReceiveStatus
    .external _ILAN_TransmitBuffer
    .external _ILAN_TransmitBufferBase
    .external _ILAN_TransmitStatus ;********************
; Global declarations
;********************
    .global Z85230_ChA_ESC_IH
    .global Z85230_ChA_RCA_IH
```

```
        .global Z85230_ChA_SRC_IH
        .global Z85230_ChA_TBE_IH
        .global Z85230_ChB_ESC_IH
        .global Z85230_ChB_RCA_IH
        .global Z85230_ChB_SRC_IH
        .global Z85230_ChB_TBE_IH .program ;***************************************************************
***********;
; Function:     Z85230_ChA_ESC_IH
                ;
; Prototype:    interrupt Z85230_ChA_ESC_IH(void)
                ;
; Programmer: Doug Kehn
                ;
;
                ;
; Purpose:
                ;
;       This function is the Z85230 Channel A External Status Change
ISR.            ;
;       When a Flag is received from ILAN this ISR is invoked.  No
action is       ;
;       required when this ISR is invoked.
                ;
;
                ;
; References:
                ;
;       Zilog Inc., Technical Manual, "Z85230/Z80230 ESCC Enhanced
Serial          ;
;             Communication Controller" - Q1/91
                ;
;
                ;
; Special Notes:
                ;
;
                ;
; Variable Description(s):
                ;
;   Input:
                ;
;   Return:
                ;
;   Local:
                ;
```

```
;
;
; Revision History:
;
;   Date      Programmer   Revision
;
; --------   ----------   --------
;
; 11/03/93   dk           v1.00    Initial release
;
;***************************************************************
***********;

Z85230_ChA_ESC_IH:   .equ   $
;Save register status
    ex    af,af'

;Terminate Z85230 interrupt status.
    ld    a,Z85230_RESI
    OUT0  Z85230_CHA_CR,A
    ld    a,Z85230_RHIUS
    OUT0  Z85230_CHA_CR,A ;Restore registers and exit.
    ex    af,af'
    ei
    ret ;***************************************************************
***********;
; Function:   Z85230_ChA_RCA_IH
;
; Prototype:  interrupt Z85230_ChA_RCA_IH(void)
;
; Programmer: Doug Kehn
;
;
; Purpose:
;
;       This function is the Z85230 Channel A Receive Character
Available ISR.;
;       This ISR places all received data into the ILAN Receive
Buffer & up-  ;
;       dates the data pointer.
;
;
;
; References:
;
```

```
;       Zilog Inc., Technical Manual, "Z85230/Z80230 ESCC Enhanced
Serial    ;
;           Communication Controller" - Q1/91
            ;
;
            ;
; Special Notes:
            ;
;
            ;
; Variable Description(s):
            ;
;  Input:
            ;
;  Return:
            ;
;  Local:
            ;
;       ILAN_ReceiveBuffer - struct Data * -
            ;
;            Pointer to the next available buffer location in local
RAM.         ;
;
            ;
; Revision History:
            ;
;    Date      Programmer   Revision
            ;
; --------    ----------   --------
            ;
; 11/03/93    dk           v1.00    Initial release.
            ;
;****************************************************************
**********;

Z85230_ChA_RCA_IH:  .equ  $
;Save register status
    ex    af,af'
    exx

;Initialize pointers.
    ld    hl,(_ILAN_ReceiveBuffer)    ;Access ILAN_ReceiveBuffer ;Get data from Z85230 FIFO & place in buffer (*ILAN_ReceiveBuffer)
    IN0   A,Z85230_CHA_DR
    ld    (hl),a ;Update buffer.
    inc   hl                          ;ILAN_ReceiveBuffer++
    ld    (_ILAN_ReceiveBuffer),hl    ;Update ILAN_ReceiveBuffer ;Reset ESCC interrupt status.
```

```
        ld      a,Z85230_RHIUS
        OUT0    Z85230_CHA_CR,A

;Restore register status and exit.
        ex      af,af'
        exx
        ei
        ret ;****************************************************************
***********;
; Function:    Z85230_ChA_SRC_IH
             ;
; Prototype:   intettupt Z85230_ChA_SRC_IH(void)
             ;
; Programmer: Doug Kehn
             ;
;
             ;
; Purpose:
             ;
;       This function is the Z85230 Channel A Special Receive
condition ISR.   ;
;       This ISR checks for valid EOF indication.  If a valid EOF is
detected,;
;       the ILAN End Of Frame Status bit is set & the data pointers
and DMA  ;
;       interface are reset to their initial values.
             ;
;
             ;
;       If a valid EOF is not detected, the ISR resets the data
pointers and ;
;       DMA interface to their initial values and terminates.
             ;
;
             ;
; References:
             ;
;       Zilog Inc., Technical Manual, "Z85230/Z80230 ESCC Enhanced
Serial      ;
;           Communication Controller" - Q1/91
             ;
;
             ;
;       Zilog Inc., "Z80182 Zilog Intelligent Peripheral (ZIP)",
Preliminary  ;
;           Product Specification, Q2/92.
             ;
;
             ;
```

```
;       Zilog Inc., "Z80180/Z180 MPU Microprocessor Unit", Technical
Manual, ;
;           Q1/91.
;
;
; Special Notes:
;
;
; Variable Description(s):
;
;   Input:
;
;   Return:
;
;   Local:
;
;       ILAN_EOF_Status - uchar -
;
;           Denotes when a valid frame has been received.
;
;               1 = valid frame received
;
;               0 = no valid frame recieved
;
;       ILAN_ReceiveBuffer - struct Data * -
;
;           Pointer to the next available buffer location in local
RAM.        ;
;       ILAN_ReceiveBufferBase - struct Data * -
;
;           Pointer to the base of the buffer area in local RAM.
;
;
;
; Revision History:
;
;   Date     Programmer   Revision
;
; --------  ----------   --------
;
; 03/03/94   dk           v1.0    Initial release.
;
;***************************************************************
***********;

Z85230_ChA_SRC_IH:   .equ   $
;Save register status.
    ex     af,af'
    exx
```

```
;Check "End of Frame" status.
;*** NOTE:  this must be done before the FIFO has been read. ***
    ld      a,Z85230_R1
    OUT0    Z85230_CHA_CR,A
    IN0     A,Z85230_CHA_CR
    bit     7,a
    jr      z,$Error ;Set EOF detection.
    ld      a,1
    ld      (_ILAN_EOF_Status),a $Error:
;Unlock ESCC FIFO.
    ld      a,Z85230_ER
    OUT0    Z85230_CHA_CR,A ;Let DMA clear the FIFO.
    nop
    nop
    nop ;;Clear the ESCC FIFO.
;   IN0     A,Z85230_CHA_DR ;;Reset the buffer pointer to the beginning of the buffer.
;   ld      hl,(_ILAN_ReceiveBufferBase)
;   ld      (_ILAN_ReceiveBuffer),hl ;Reset DMA Channel 1 interface.
    ld      a,0                             ;Reset Memory Address Registers
    ld      hl,(_ILAN_ReceiveBufferBase)
    OUT0    Z182_MAR1L,L
    OUT0    Z182_MAR1H,L
    OUT0    Z182_MAR1B,A
    ld      a,0FFh                          ;Reset Byte Count Registers
    OUT0    Z182_BCR1L,A
    OUT0    Z182_BCR1H,A Exit_ChASRC:
;Reset ESCC interrupt status.
    ld      a,Z85230_RHIUS
    OUT0    Z85230_CHA_CR,A ;Restore register status and exit.
    ex      af,af'
    exx
    ei
    ret
```

```
;*****************************************************************
***********;
; Function:   Z85230_ChA_RCA_IH
           ;
; Prototype:  interrupt Z85230_ChA_RCA_IH(void)
           ;
; Programmer: Doug Kehn
           ;
;
           ;
; Purpose:
           ;
;     This function is the Z85230 Channel A Transmit Buffer Empty
ISR.        ;
;     This ISR places 4 bytes of data (if available) into the
transmit FIFO ;
;     and updates the data pointer & counter. If no data remains
in the     ;
;     buffer, the ISR terminates.
           ;
;
           ;
; References:
           ;
;     Zilog Inc., Technical Manual, "Z85230/Z80230 ESCC Enhanced
Serial      ;
;           Communication Controller" - Q1/91
           ;
;
           ;
; Special Notes:
           ;
;
           ;
; Variable Description(s):
           ;
;   Input:
           ;
;   Return:
           ;
;   Local:
           ;
;       ILAN_FrameLength - uint -
           ;
;           Denotes the length of the ILAN frame being transmitted.
           ;
;       ILAN_TransmitBuffer - uchar * -
           ;
;           Pointer to the transmit buffer RAM location.
           ;
;       ILAN_TransmitBufferBase - uchar * -
           ;
```

```
;            Pointer to the base address of the transmit buffer RAM
location.    ;
;       ILAN_TransmitStatus - ucahr -
        ;
;       Denotes when the ILAN frame has been sent.
        ;
;             1 = frame sent
        ;
;             0 = frame not sent
        ;
;
        ;
; Revision History:
        ;
;   Date      Programmer   Revision
        ;
; --------    ----------   --------
        ;
; 11/27/93    dk           v1.00     Initial release
        ;
;*****************************************************************
***********;

Z85230_ChA_TBE_IH:    .equal $
;Save register status.
    ex    af,af'
    exx

;Check for transmitter underrun.
    IN0   A,Z85230_CHA_CR
    bit   6,a
    jp    z,$NoUnderrun ;Notify Z85230 of no more data to come.
    ld    a,Z85230_RTIP
    OUT0  Z85230_CHA_CR,A ;Notify process that all data has been sent & the CRC is now being
;transmitted.
    ld    a,1
    ld    (_ILAN_TransmitStatus),a ;Reset the transmit buffer pointer to the beginning of the buffer.
    ld    hl,(_ILAN_TransmitBufferBase)
    ld    (_ILAN_TransmitBuffer),hl jp    Exit_ChATBE $NoUnderrun:
;Send a maximum of 4 bytes of data.
    ld    b,4
```

```
;Initialize pointer & variable registers.
    ld      hl,(_ILAN_TransmitBuffer)
    ld      de,(_ILAN_FrameLength)

;Send data.
$Loop:
;Check for all data sent.
    ld      a,e
    or      d
    jr      z,$No_More_Data         ;No more data if de=0 ld      a,(hl)                  ;Get data, *ILAN_TransmitBuffer
    OUT0    Z85230_CHA_DR,A
    dec     de                      ;ILAN_FrameLength--
    inc     hl                      ;ILAN_TransmitBuffer++
    djnz    $Loop                   ;Send next byte of data jp      $Save_Pointer_Counter $No_More_Data:
;Last data byte has been sent, allow CRC/Flag termination.
    ld      a,Z85230_R10
    OUT0    Z85230_CHA_CR,A
    ld      a,Z85230_TRANSMIT_CRC
    OUT0    Z85230_CHA_CR,A $Save_Pointer_Counter:
;Save pointer & counter to data area.
    ld      (_ILAN_TransmitBuffer),hl
    ld      (_ILAN_FrameLength),de Exit_ChATBE:
;Reset ESCC interrupt status.
    ld      a,Z85230_RHIUS
    OUT0    Z85230_CHA_CR,A ;Restore register status and exit.
    ex      af,af'
    exx
    ei
    ret ;********************
;* Unimplemented ISRs
;********************
Z85230_ChB_ESC_IH:  .equal $
Z85230_ChB_RCA_IH:  .equal $
Z85230_ChB_SRC_IH:  .equal $
Z85230_ChB_TBE_IH:  .equal $
    ex      af,af'
    ld      a,Z85230_RHIUS
    OUT0    Z85230_CHB_CR,A
```

```
        ex      af,af'
        ei
        ret

;*********************
;* Mark end of module.
;*********************
        .end /******************************************************************
***********
* Module:     2500ad.h
               *
* Programmer: Doug Kehn
               *
*
               *
* Purpose: Header file for use with the 2500AD C Compiler.
               *
*
               *
* References:
               *
*
               *
* Notes:
               *
*******************************************************************
**********/ define DisableInterrupts     .asm \
                                di \
                              .endasm define EnableInterrupts      .asm \
                                ei \
                              .endasm /******************************************************************
***********
* Module Name:   mimic.c
               *
* Creation Date: 12/02/93
               *
*
               *
* Functions:
               *
*       MIMIC_Init
               *
```

```
*
         *
* Global Variable Description(s):
         *
*****************************************************************
***********/

/******************
 Linker directives
*****************/
    .asm
      .linklist       ;Update listing after the link.
      .symbols        ;Include all symbols.
    .endasm include "2500ad.h"
include "pcmcia.h"
#include "z182.h"

typedef unsigned char uchar;
typedef unsigned int  uint;

/***************************
 External Function References
***************************/
uchar in(uchar);
void  out(uchar, uchar);

/*******************
 Function Prototypes
*******************/
void MIMIC_Init(void);

/*****************************************************************
************
* Function:   MIMIC_Init
         *
* Prototype:  void MIMIC_Init(void)
         *
* Programmer: Doug Kehn
         *
*
         *
* Purpose:
         *
*     Initialize the Z80182 16550 MIMIC interface.
         *
```

```
 *
         *
 * References:
         *
 *     Zilog Inc., "Z80182 Zilog Intelligent Peripheral (ZIP)",
Preliminary  *
 *       Product Specification, Q2/92.
         *
 *
         *
 * Special Notes:
         *
 *
         *
 * Variable Description(s):
         *
 *  Input:
         *
 *  Return:
         *
 *  Local:
         *
 *     Accumulator - uchar -
         *
 *        Used for temporary data storage and logical functions.
         *
 *
         *
 * Revision History:
         *
 *   Date     Programmer   Revision
         *
 * --------   ----------   --------
         *
 * 02/14/94   dk           v1.0      Initial release.
         *
 ****************************************************************
 **********/ void MIMIC_Init(void)
{
   uchar Accumulator;
   extern uchar ModemStatus;

/* Initialize MIMIC. */
   out(Z182_MIMIC_RTCR_INIT, Z182_MIMIC_RTCR);
   out(Z182_MIMIC_RTTC_INIT, Z182_MIMIC_RTTC);
   out(Z182_MIMIC_TTCR_INIT, Z182_MIMIC_TTCR);
   out(Z182_MIMIC_TTTC_INIT, Z182_MIMIC_TTTC);
   out(Z182_MIMIC_MCC_INIT, Z182_MIMIC_MCC);
   out(Z182_MIMIC_FSCR_INIT, Z182_MIMIC_FSCR);
   out(Z182_MIMIC_IVEC_INIT, Z182_MIMIC_IVEC);
```

```
         out(Z182_MIMIC_IE_INIT, Z182_MIMIC_IE);
         out(Z182_MIMIC_IUS_IP_INIT, Z182_MIMIC_IUS_IP);
         out(Z182_MIMIC_IUS_IP_INIT, Z182_MIMIC_IUS_IP);

/* Initialize Modem Status. */
         ModemStatus = 0;
         Accumulator = in(Z182_CNTLB0);
         Accumulator &= 0x20;                    /* CTS */
         ModemStatus |= (Accumulator >> 1);
         Accumulator = in(Z182_STAT0);
         Accumulator &= 0x04;                    /* DCD */
         ModemStatus |= (Accumulator << 5);
         Accumulator = in(Z182_PORT_C_DR);
         Accumulator &= 0xC0;                    /* RI, DSR */
         ModemStatus |= (Accumulator >> 1);
         out(Z182_MIMIC_MSR, ModemStatus);
}

/***************************************************************
***********
* Module Name:    pcmcia.c
*
* Creation Date:  11/02/93
*
* Compiler:       2500AD Software Inc., v4.03
*
*
*
* Functions:
*
*       Clear_DPRAM
*
*       Handshake
*
*       main
*
*       Move_ILAN_Frame_To_DPRAM
*
*       Transmit_ILAN_Frame
*
*       Term
*
*
*
* Global Variable Description(s):
*
*       ILAN_EOF_Status - uchar -
*
*          Denotes when a valid frame has been received.
*
*                 1 = valid frame received
*
```

```
*                 0 = no valid frame recieved
        *
*       ILAN_FrameLength - uint -
        *
*         Denotes the length of the ILAN frame being transmitted.
        *
*       ILAN_ReceiveBuffer - struct Data * -
        *
*         Pointer to the next available buffer location in local
RAM.      *
*       ILAN_ReceiveBufferBase - struct Data * -
        *
*         Pointer to the base of the buffer area in local RAM.
        *
*       ILAN_ReceiveFrame - struct Data -
        *
*         ILAN receive frame structure.
        *
*       ILAN_TransmitBuffer - uchar * -
        *
*         Pointer to the transmit buffer RAM location.
        *
*       ILAN_TransmitBufferBase - uchar * -
        *
*         Pointer to the base address of the transmit buffer RAM
location. *
*       ILAN_TransmitFrame - struct Data -
        *
*         ILAN transmit frame structure.
        *
*       ILAN_TransmitStatus - ucahr -
        *
*         Denotes when the ILAN frame has been sent.
        *
*             1 = frame sent
        *
*             0 = frame not sent
        *
*       ModemStatus - uchar -
        *
*         Contains the state of the modem status lines for the MIMIC
        *
*         interface.
        *
***************************************************************
**********/

/******************
 Linker directives
*****************/
    .asm
        .linklist       ;Update listing after the link.
```

```c
        .symbols          ;Include all symbols.
    .endasm include "2500ad.h"
include "pcmcia.h"
#include "z182.h"
#include "z85230.h"

typedef unsigned char uchar;
typedef unsigned int  uint;

/***************************
 External Function References
***************************/
uchar in(uchar);
void  out(uchar, uchar);
void  MIMIC_Init(void);
void  Z182_Enable_DMA_1(void);
void  Z182_Init_ASCI_0(void);
void  Z182_Init_DMA_1(long  MemoryAddress,
                      uint  IOAddress,
                      uint  ByteCount,
                      uchar Mode);
void  Z182_Init_Port_B(void);
void  Z182_Init_Timer_0(void);
void  Z182_Init_Timer_Control(void);
void  Z85230_Init_Channel_A(void);
void  Z85230_Init_Channel_B(void);

/******************
 Function Prototypes
******************/
void Clear_DPRAM(void);
void Handshake(void);
void main(void);
void Modem_Status(void);
void Move_ILAN_Frame_To_DPRAM(void);
void Transmit_ILAN_Frame(void);
void Term(void);

/****************
 Global Variables
****************/
struct Data
{
    uchar Address;
    uchar Control;
```

```c
    uchar Length;
    uchar Command;
    uchar ID;
    uchar Event;
    uchar Data[255];
};
struct Data ILAN_ReceiveFrame;
uchar *ILAN_ReceiveBuffer;
uchar *ILAN_ReceiveBufferBase;

struct Data ILAN_TransmitFrame;
uchar *ILAN_TransmitBuffer;
uchar *ILAN_TransmitBufferBase;

uchar ILAN_EOF_Status;
uint  ILAN_FrameLength;
uchar ILAN_TransmitStatus;
uchar ModemStatus;

/***************************************************************
************
* Function:   main
            *
* Prototype:  void main(void)
            *
* Programmer: Doug Kehn
            *
*
            *
* Purpose:
            *
*     Initializes system hardware and system parameters.  Performs
main        *
*     program loop for ILAN functions.
            *
*
            *
* References:
            *
*
            *
* Special Notes:
            *
*
            *
* Variable Description(s):
            *
*   Input:
            *
*   Return:
            *
```

```
*  Local:
*
*      ILAN_FrameReceived - uchar -
*
*          Used to determine if a ILAN frame has been received and is
ready   *
*          to be moved to DPRAM for the host application use.
*
*              1 = Frame received
*
*              0 = No frame received.
*
*      TransmitStatusWord - uchar -
*
*          This is a copy of the DPR_TX_STATUS_WORD used by the local
        *
*          processor to determine when the host application has
incremented    *
*          the DPR_TX_STATUS_WORD.
*
*
        *
* Revision History:
        *
*   Date       Programmer   Revision
        *
* --------    -----------   --------
        *
* 03/17/94    dk            v1.0      Initial release
        *
****************************************************************
**********/ void main(void)
{
   uchar TransmitStatusWord;
   uchar ILAN_FrameReceived;

/* Initialize pointers. */
   ILAN_ReceiveBuffer      = (uchar *) &ILAN_ReceiveFrame;
   ILAN_ReceiveBufferBase  = (uchar *) &ILAN_ReceiveFrame;
   ILAN_TransmitBuffer     = (uchar *) &ILAN_TransmitFrame;
   ILAN_TransmitBufferBase = (uchar *) &ILAN_TransmitFrame;

/* Initialize variables. */
   TransmitStatusWord = (uchar) 0;

/* Initialize 16650 MIMIC interface. */
   Z182_Init_ASCI_0();
   Z182_Init_Port_B();
   Z85230_Init_Channel_B();
   MIMIC_Init();
```

```c
/* Enable interrupts here so RS-232 will work. */
EnableInterrupts;

/* Initialize ILAN interface. */
Clear_DPRAM();
Z182_Init_Timer_0();
Z182_Init_Timer_Control();
Z85230_Init_Channel_A();
Z182_Init_DMA_1((long) ILAN_ReceiveBufferBase,
                (uint) Z85230_CHA_DR,
                (uint) 0xFFFF,
                (uchar) 0);
Z182_Enable_DMA_1();
Handshake();

/* Enable external IO */
Z182_Enable_External_IO();

/* Enable RS-485 drivers for Rx */
out(Z85230_R5, Z85230_CHA_CR);
out(Z85230_DISABLE_TRANSMITTER, Z85230_CHA_CR);

/* Main program loop. */
while (1)
{
   DisableInterrupts;
   ILAN_FrameReceived = ILAN_EOF_Status;
   EnableInterrupts;
   if (ILAN_FrameReceived)
   {
      Move_ILAN_Frame_To_DPRAM();
      DisableInterrupts;
      ILAN_EOF_Status = (uchar) 0;
      EnableInterrupts;
   }
   if (TransmitStatusWord != *DPR_TX_STATUS_WORD)
   {
      /* Update transmit status word. */
      do
      {
         TransmitStatusWord = *DPR_TX_STATUS_WORD;
      }
      while (TransmitStatusWord != *DPR_TX_STATUS_WORD);

Transmit_ILAN_Frame();
   }

Modem_Status();
}
}
```

```
/****************************************************************
***********
* Function:    Clear_DPRAM
*
* Prototype:   void Clear_DPRAM(void)
*
* Programmer: Doug Kehn
*
*
*
* Purpose:
*
*      Clears (zeros) Dual-Port RAM.  Allows Dual-Port RAM to be in
a known  *
*      state.
*
*
*
* References:
*
*
*
* Special Notes:
*
*       The last two memory locations in Dual-Port RAM are not
cleared.  This *
*      avoids sending a spurious interrupt to the PC.
*
*
*
* Variable Descriptions(s):
*
*   Input:
*
*   Return:
*
*   Local:
*
*       DPR_Pointer - uchar * -
*
*           Used to point to the Dual-Port RAM location to clear
(zero).       *
*       x - uint -
*
*           "for" loop counter.
*
*
*
* Revision History:
*
*    Date      Programmer   Revision
*
```

```
 * --------    ----------    ---------
 *
 * 02/21/94   dk            v1.0        Initial release
 *
 ****************************************************************
 ***********/ void Clear_DPRAM(void)
{
   uchar *DPR_Pointer;
   uint x;

/* Initialize pointer. */
   DPR_Pointer = DP_RAM;

/* Clear Dual-Port RAM. */
   for( x = (uint)0; x < ((uint) DP_RAM_SIZE - (uint) 2); x++ )
   {
      *DPR_Pointer++ = (uchar) 0;
   }
}

/****************************************************************
 ***********
 * Function:   Handshake
 *
 * Prototype:  void Handshake(void)
 *
 * Programmer: Doug Kehn
 *
 *
 *
 * Purpose:
 *
 *      This function handshakes (lets each other know they are running) with *
 *      the host application by sending AA / 55 (hex) to the appropriate DP-  *
 *      RAM locations.
 *
 *
 *
 * References:
 *
 *
 *
 * Special Notes:
 *
 *
 *
```

```
* Variable Descriptions(s):
        *
* Input:
        *
* Return:
        *
* Local:
        *
*
        *
* Revision History:
        *
*   Date     Programmer  Revision
        *
* --------  ----------  --------
        *
* 03/17/93   dk          v1.0      Initial release
        *
***************************************************************
***********/ void Handshake(void)
{
   /* Wait for the host to send the first handshake character.  The modem */
   /* status is updated while waiting.  This is done so non-ACQUIRE apps. */
   /* will be able to use the serial port.
       */
   while (*DPR_HANDSHAKE_RX != (uchar) 0xAA)
      {
      Modem_Status();
      }
   *DPR_HANDSHAKE_TX = (uchar) 0xAA;             /* Repeat back to host. */

/* Wait for the host to send the second handshake character.  The modem */
   /* status is updated while waiting.  This is done so non-ACQUIRE apps. */
   /* will be able to use the serial port.
       */
   while (*DPR_HANDSHAKE_RX != (uchar) 0x55)
      {
      Modem_Status();
      }
   *DPR_HANDSHAKE_TX = (uchar) 0x55;             /* Repeat back to host. */
}
```

```
/******************************************************************
***********
* Function:    Modem_Status
*
* Prototype:   void Modem_Status(void)
*
* Programmer: Doug Kehn
*
*
*
* Purpose:
*
*     This function checks all modem status lines and notifies the
MIMIC    *
*     interface of any changes.
*
*
*
* References:
*
*
*
* Special Notes:
*
*        Zilog Inc., "Z80182 Zilog Intelligent Peripheral (ZIP)",
Preliminary  *
*        Product Specification, Q2/92.
*
*
*
*        Any 16550 databook.
*
*
*
* Variable Descriptions(s):
*
*   Input:
*
*   Return:
*
*   Local:
*
*        Accumulator - uchar -
*
*           Used for temporary data storage and logical functions.
*
*        _Accumulator - uchar -
*
*           Used for temporary data storage and logical functions.
*
*        DeltaModemStatus - uchar -
*
```

```
*        Used to determine if any changes to the modem status have been        *
*        made.
                *
*
                *
* Revision History:
                *
*    Date      Programmer   Revision
                *
* --------     ----------   --------
                *
* 03/10/94     dk           v1.0      Initial release
                *
*********************************************************************
**********/ void Modem_Status(void)
{
    uchar Accumulator;
    uchar _Accumulator;
    uchar DeltaModemStatus;
    uchar *TestPtr;

DeltaModemStatus = 0;

/* Determine state of CTS. */
    Accumulator = in(Z182_CNTLB0);
    Accumulator &= 0x20;
    DeltaModemStatus |= ( Accumulator ) ? 0x00 : 0x10;

/* Determine state of DCD. */
    Accumulator = in(Z182_STAT0);
    Accumulator = in(Z182_STAT0);              /* Must read twice. */
    Accumulator &= 0x04;
    DeltaModemStatus |= ( Accumulator ) ? 0x00 : 0x80;

/* Determine state of RI and DSR. */
    Accumulator = in(Z182_PORT_C_DR);
    _Accumulator = Accumulator;
    Accumulator &= 0x40;                                                /* DSR */
    DeltaModemStatus |= ( Accumulator ) ? 0x00 : 0x20;
    _Accumulator &= 0x80;                                               /* RI */
    DeltaModemStatus |= ( _Accumulator ) ? 0x00 : 0x40;

if( ModemStatus != DeltaModemStatus )
    {
        DisableInterrupts;
        ModemStatus = DeltaModemStatus;
        EnableInterrupts;
        out(ModemStatus, Z182_MIMIC_MSR);
        TestPtr = (uchar *) 0xFA0C;
```

```
       *TestPtr = DeltaModemStatus;
   }
}

/****************************************************************
************
* Function:    Move_ILAN_Frame_To_DPRAM
            *
* Prototype:   void Move_ILAN_Frame_To_DPRAM(void)
            *
* Programmer: Doug Kehn
            *
*
            *
* Purpose:
            *
*      Moves the received ILAN frame from local RAM to Dual-Port
RAM.  The   *
*      host application is then notified of the avialable frame.
            *
*
            *
* References:
            *
*
            *
* Special Notes:
            *
*
            *
* Variable Description(s):
            *
*   Input:
            *
*   Return:
            *
*   Local:
            *
*      ReceiveStatusWord - uchar -
            *
*          This location is incremented by the local processor and
copied to   *
*          DPR_RX_STATUS_WORD to let the host application know that
an ILAN    *
*          frame has been placed into DP RAM.
            *
*
            *
* Revision History:
            *
```

```
*   Date      Programmer   Revision
         *
* --------   ----------   --------
         *
* 11/30/93   dk           v1.0        Initial release
         *
***************************************************************
**********/ void Move_ILAN_Frame_To_DPRAM(void)
{
    static uchar ReceiveStatusWord;

/* Move ILAN frame from local RAM to DP RAM. */
    movmem(DPR_LAN_RX_BUFFER, (char *) ILAN_ReceiveBufferBase,
           ((int) ILAN_ReceiveFrame.Length + (int) 6));

/* Inform host application of ILAN frame in DP RAM. */
    do
    {
       *DPR_RX_STATUS_WORD = ++ReceiveStatusWord;
    }
    while (*DPR_RX_STATUS_WORD != ReceiveStatusWord);
}

/***************************************************************
************
* Function:   Transmit_ILAN_Frame
         *
* Prototype:  void Transmit_ILAN_Frame(void)
         *
* Programmer: Doug Kehn
         *
*
         *
* Purpose:
         *
*     This function moves the ILAN frame to be transmitted from
Dual-Port   *
*     RAM to local RAM.  The ILAN frame is then transmitted.
         *
*
         *
* References:
         *
*
         *
* Special Notes:
         *
*
         *
```

```
* Variable Description(s):
          *
*  Input:
          *
*  Return:
          *
*  Local:
          *
*      Temp - uchar -
          *
*          Used as a temporary data storage location.
          *
*      TransmitFinished - uchar -
          *
*          Used to signify that all ILAN data has been transmitted.
          *
*
          *
* Revision History:
          *
*   Date      Programmer   Revision
          *
* --------   ----------   --------
          *
* 03/03/93   dk           v1.0      Initial release
          *
*******************************************************************
**********/ void Transmit_ILAN_Frame(void)
{
   uchar Temp;
   extern uchar Z182_Timer0Expire;
   uchar TransmitFinished;

/* Move frame from Dual-Port RAM to local RAM. */
   movmem((char *) ILAN_TransmitBufferBase, DPR_LAN_TX_BUFFER,
           ((int) (*(DPR_LAN_TX_BUFFER + 2) + (int) 6)));

/* Disable Z85230 receiver & enable transmitter. */
   DisableInterrupts;
   out(Z85230_R1, Z85230_CHA_CR);
   out(Z85230_DMA_TX_MODE, Z85230_CHA_CR);
   out(Z85230_R3, Z85230_CHA_CR);
   out(Z85230_DISABLE_RECEIVER, Z85230_CHA_CR);
   out(Z85230_R5, Z85230_CHA_CR);
   out(Z85230_ENABLE_TRANSMITTER, Z85230_CHA_CR);
   out(Z85230_RESET_TX_CRC_GEN, Z85230_CHA_CR);

/* Reset transmit status. */
   ILAN_TransmitStatus = (uchar) 0;
   EnableInterrupts;
```

```
/* Guarantee at least 16 opening flags get sent. */
Z182_Timer0Expire = (uchar)0;
out(ILAN_SOF_DELAY_L, Z182_TMDR0L);
out(ILAN_SOF_DELAY_H, Z182_TMDR0H);
Temp = in(Z182_TCR);
Temp |= (uchar) Z182_TMDR0_ENABLE;
out(Temp, Z182_TCR);

/* Enable DMA for transmit. */
Z182_Init_DMA_1((long)   ILAN_TransmitBufferBase,
                (uint)   Z85230_CHA_DR,
                (uint)   (*(DPR_LAN_TX_BUFFER + 2) + (uint) 6),
                (uchar)  1);
Z182_Enable_DMA_1();

/* Wait for Flags to be sent. */
while (Z182_Timer0Expire == (uchar) 0);

/* Start DMA process. */
DisableInterrupts;
out(Z85230_R1, Z85230_CHA_CR);
out(Z85230_DMA_TX_MODE_ENABLE, Z85230_CHA_CR);
EnableInterrupts;
#if 0
    /* Let TX ISR know how much data to send & get first byte of
data. */
    /* Since first byte will be sent, only add 5 (vice 6) and
increment */
    /* pointer.
     */
    DisableInterrupts;
    ILAN_FrameLength = ((uint) ILAN_TransmitFrame.Length + (uint)
5);
    Temp = *ILAN_TransmitBuffer++;
    EnableInterrupts;

/* Send first byte to the Z85230 TX FIFO. */
    out(Temp, Z85230_CHA_DR);
endif /* Wait for transmission to complete. */
    do
    {
       DisableInterrupts;
       TransmitFinished = ILAN_TransmitStatus;
       EnableInterrupts;
    }
    while (!TransmitFinished);

/* Allow 5*shift register + 5*delay, CRC + delay, & 3 closing
flags to */
```

```
    /* be sent.
        */
    Z182_Timer0Expire = (uchar) 0;
    out(ILAN_EOF_DELAY_L, Z182_TMDR0L);
    out(ILAN_EOF_DELAY_H, Z182_TMDR0H);
    Temp = in(Z182_TCR);
    Temp |= (uchar) Z182_TMDR0_ENABLE;
    out(Temp, Z182_TCR);
    while (Z182_Timer0Expire == (uchar)0);

/* Disable Z85230 transmitter & enable receiver. */
    DisableInterrupts;
    out(Z85230_R1, Z85230_CHA_CR);
    out(Z85230_DMA_RX_MODE, Z85230_CHA_CR);
    out(Z85230_R5, Z85230_CHA_CR);
    out(Z85230_DISABLE_TRANSMITTER, Z85230_CHA_CR);
    out(Z85230_R10, Z85230_CHA_CR);
    out(Z85230_R10A_MODES, Z85230_CHA_CR);
    out(Z85230_R3, Z85230_CHA_CR);
    out(Z85230_ENABLE_RECEIVER, Z85230_CHA_CR);
    out(Z85230_R1, Z85230_CHA_CR);
    out(Z85230_DMA_RX_MODE_ENABLE, Z85230_CHA_CR);
    EnableInterrupts;

/* Enable DMA for receive. */
    Z182_Init_DMA_1((long) ILAN_ReceiveBufferBase,
                    (uint) Z85230_CHA_DR,
                    (uint) 0xFFFF,
                    (uchar) 0);
    Z182_Enable_DMA_1();
}

/***************
 Null Functions
***************/ void Term(void)
{
}

/***************************************************************
***********
* Module:     pcmcia.h
        *
* Programmer: Doug Kehn
        *
*
        *
* Purpose:
        *
```

```
*       Header file for use with the PCMCIA ILAN firmware.
                *
*
                *
* References:
                *
*
                *
* Notes:
                *
****************************************************************
***********/ typedef unsigned char uchar;
typedef unsigned int  uint;

/****************************************************************
 CPU Clock
       If C12 = 1 then CPU clock speed is assumed to be 12.288MHz.

If C12 is not defined then CPU clock speed is assumed to be
       18.432MHz.
****************************************************************/
#define CPU_CLOCK      1

/********
 RAM/ROM
********/
#define RAM_BASE    0xC000
#define RAM_END     0xDFFF
#define RAM_SIZE    RAM_END-RAM_BASE
define STACK       0xDFFF define ROM_BASE    0x0000
define ROM_END     0xBFFF
define ROM_SIZE    ROM_END-ROM_BASE /**************
 Dual-Port RAM
**************/
#define DP_RAM              ((uchar *) 0xF800)   /* Base address.
       */
#define DPR_LAN_TX_BUFFER   ((uchar *) 0xF800)   /* LAN transmit
buffer. */
#define DPR_LAN_RX_BUFFER   ((uchar *) 0xF880)   /* LAN receive
buffer. */
#define DPR_TX_STATUS_WORD  ((uchar *) 0xF900)   /* Transmit
status word.*/
#define DPR_HANDSHAKE_RX    ((uchar *) 0xF902)   /* App.
handshake.     */
```

```c
#define DPR_RX_STATUS_WORD    ((uchar *) 0xF980)    /* Receive status word. */
#define DPR_LAN_ADDRESS       ((uchar *) 0xF981)    /* SDLC LAN address. */
#define DPR_HANDSHAKE_TX      ((uchar *) 0xF982)    /* App. handshake. */
#define DPR_INTERRUPT_BYTE    ((uchar *) 0xFBFE)    /* Interrupt byte. */
#define DPR_END               ((uchar *) 0xFBFF)

#define DP_RAM_SIZE           0x400                 /* Size of DPRAM */

/***********
 ILAN Delays
***********/
#ifdef CPU_CLOCK
    #define ILAN_EOF_DELAY_L   0xF0
    #define ILAN_EOF_DELAY_H   0x01
    #define ILAN_SOF_DELAY_L   0x75
    #define ILAN_SOF_DELAY_H   0x02
endif ifndef CPU_CLOCK
    #define ILAN_EOF_DELAY_L   0xE9
    #define ILAN_EOF_DELAY_H   0x02
    #define ILAN_SOF_DELAY_L   0xB0
    #define ILAN_SOF_DELAY_H   0x03
endif /*************
 Miscellaneous
*************/
#define DISABLE   0
#define ENABLE    1
```

```
;***************************************************************************;
; Module:    pcmcia.inc
            ;
; Programmer: Doug Kehn
            ;
;
            ;
; Purpose:
            ;
;       Header file for use with the PCMCIA ILAN firmware.
            ;
;
            ;
```

```
; References:
;           ;
;           ;
;           ;
; Notes:
;           ;
;*******************************************************************
**********;

;*******************************************************************
; CPU Clock
;     If C12 = 1 then CPU clock speed is assumed to be 12.288MHz.
;
;     If C12 is not defined then CPU clock speed is assumed to be
;     18.432MHz.
;*******************************************************************
CPU_CLOCK:    .equal 1

;*********
; RAM/ROM
;*********
RAM_BASE:     .equal 0C000h               ;Base address.
RAM_END:      .equal 0DFFFh               ;End address.
RAM_SIZE:     .equal RAM_END-RAM_BASE
STACK:        .equal 0DFFFh ROM_BASE:     .equal 0                    ;Base address.
ROM_END:      .equal 0BFFFh               ;End address.
ROM_SIZE:     .equal ROM_END-ROM_BASE ;***************
; Dual-Port RAM
;***************
DP_RAM:                .equal 0F800h      ;Base address.
DPR_LAN_TX_BUFFER:     .equal 0F800h      ;LAN transmit buffer.
DPR_LAN_RX_BUFFER:     .equal 0F880h      ;LAN receive buffer.
DPR_TX_STATUS_WORD:    .equal 0F900h      ;Transmit status word.
DPR_HANDSHAKE_RX:      .equal 0F902h      ;App. handshake.
DPR_RX_STATUS_WORD:    .equal 0F980h      ;Receive status word.
DPR_LAN_ADDRESS:       .equal 0F981h      ;SDLC LAN address.
DPR_HANDSHAKE_TX:      .equal 0F982h      ;App. handshake.
DPR_INTERRUPT_BYTE:    .equal 0FBEh       ;Interrupt byte.
DPR_END:               .equal 0FBFFh      ;End of DPRAM
DP_RAM_SIZE:           .equal DPR_END-DP_RAM ;*************
; ILAN Delays
;*************
.IFDEF CPU_CLOCK
   ILAN_EOF_DELAY_L:   .equal 0F0h
```

```
    ILAN_EOF_DELAY_H:     .equal 01h
    ILAN_SOF_DELAY_L:     .equal 75h
    ILAN_SOF_DELAY_H:     .equal 02h BR_300:               .equal 0Eh
    TTO_300:              .equal 20478
    BR_600:               .equal 13h
    TTO_600:              .equal 10238
    BR_1200:              .equal 06h
    TTO_1200:             .equal 5118
    BR_2400:              .equal 05h
    TTO_2400:             .equal 2558
    BR_4800:              .equal 04h
    TTO_4800:             .equal 1278
    BR_9600:              .equal 03h
    TTO_9600:             .equal 638
    BR_19200:             .equal 02h
    TTO_19200:            .equal 318
    BR_38400:             .equal 01h
    TTO_38400:            .equal 158
.ENDIF .IFNDEF CPU_CLOCK
    ILAN_EOF_DELAY_L:     .equal 0E9h
    ILAN_EOF_DELAY_H:     .equal 02h
    ILAN_SOF_DELAY_L:     .equal 0B0h
    ILAN_SOF_DELAY_H:     .equal 03h BR_150:               .equal 2Eh
    TTO_150:              .equal 61438
    BR_300:               .equal 2Dh
    TTO_300:              .equal 30718
    BR_600:               .equal 2Ch
    TTO_600:              .equal 15358
    BR_1200:              .equal 2Bh
    TTO_1200:             .equal 7678
    BR_2400:              .equal 2Ah
    TTO_2400:             .equal 3838
    BR_4800:              .equal 29h
    TTO_4800:             .equal 1918
    BR_9600:              .equal 28h
    TTO_9600:             .equal 958
    BR_19200:             .equal 21h
    TTO_19200:            .equal 478
    BR_38400:             .equal 20h
    TTO_38400:            .equal 238
    BR_57600:             .equal 01h
    TTO_57600:            .equal 158
    BR_115200:            .equal 00h
    TTO_115200:           .equal 78
.ENDIF
```

```
DISABLE     .equal  0
ENABLE      .equal  1

.end

/***************************************************************
************
* Module Name:   z182.c
            *
* Creation Date: 11/02/93
            *
* Compiler:      2500AD Software Inc., v4.03
            *
*
            *
* Functions:
            *
*       Z182_Disable_External_IO
            *
*       Z182_Enable_DMA_1
            *
*       Z182_Enable_External_IO
            *
*       Z182_Init_ASCI_0
            *
*       Z182_Init_DMA_1
            *
*       Z182_Init_Timer_0
            *
*       Z182_Init_Timer_Control
            *
*
            *
* Global Variable Description(s):
            *
****************************************************************
***********/

/******************
 Linker directives
******************/
    .asm
        .linklist       ;Update listing after the link.
        .symbols        ;Include all symbols.
    .endasm include "2500ad.h"
include "pcmcia.h"
#include "z182.h"
#include "z85230.h"
```

```
typedef unsigned char uchar;
typedef unsigned int  uint;

/***************************
 External Function References
 ***************************/
uchar in(uchar);
void  out(uchar, uchar);

/*******************
 Function Prototypes
 *******************/
void Z182_Disable_External_IO(void);
void Z182_Enable_DMA_1(void);
void Z182_Enable_External_IO(void);
void Z182_Init_ASCI_0(void);
void Z182_Init_DMA_1(long  MemoryAddress,
                     uint  IOAddress,
                     uint  ByteCount,
                     uchar Mode);
void Z182_Init_Port_B(void);
void Z182_Init_Timer_0(void);
void Z182_Init_Timer_Control(void);

/***************************************************************
 ***********
 * Function:   Z182_Disable_External_IO
           *
 * Prototype:  void Z182_Disable_External_IO(void)
           *
 * Programmer: Doug Kehn
           *
 *
           *
 * Purpose:
           *
 *     Disables access to external (off chip) I/O peripherals.
           *
 *
           *
 * References:
           *
 *      Zilog Inc., "Z80182 Zilog Intelligent Peripheral (ZIP)",
 Preliminary  *
 *         Product Specification, Q2/92.
           *
 *
           *
```

```
*       Zilog Inc., "Z80180/Z180 MPU Microprocessor Unit", Technical
Manual,  *
*       Q1/91.
            *
*
            *
* Special Notes:
            *
*
            *
* Variable Description(s):
            *
*  Input:
            *
*  Return:
            *
*  Local:
            *
*       Accumulator - uchar -
            *
*       This variable is used to store intermediate results for
arithmetic *
*       and decision making functions.
            *
*
            *
* Revision History:
            *
*   Date      Programmer  Revision
            *
* --------    ----------  --------
            *
* 11/02/93    dk          v1.0     Initial release.
            *
***************************************************************
***********/ void Z182_Disable_External_IO(void)
{
   uchar Accumulator;

Accumulator = in(Z182_OMCR);
   Accumulator &= (uchar)0x5F;        /* Reset bits 5 and 7. */
   out(Accumulator, Z182_OMCR);
}

/****************************************************************
************
* Function:   Z182_Enable_DMA_1
            *
```

```
* Prototype:   void Z182_Enable_DMA_1(void)
            *
* Programmer: Doug Kehn
            *
*
            *
* Purpose:
            *
*       Enables DMA Channel 1 for operation.
            *
*
            *
* References:
            *
*       Zilog Inc., "Z80182 Zilog Intelligent Peripheral (ZIP)",
Preliminary  *
*         Product Specification, Q2/92.
            *
*
            *
*       Zilog Inc., "Z80180/Z180 MPU Microprocessor Unit", Technical
Manual,  *
*         Q1/91.
            *
*
            *
* Special Notes:
            *
*
            *
* Variable Description(s):
            *
*  Input:
            *
*  Return:
            *
*  Local:
            *
*      Accumulator - uchar -
            *
*        This variable is used to store intermediate results for
arithmetic *
*        and decision making functions.
            *
*
            *
* Revision History:
            *
*   Date     Programmer   Revision
            *
* --------   ----------   --------
            *
```

```
* 03/02/94   dk            v1.0      Initial release.
         *
***************************************************************
***********/ void Z182_Enable_DMA_1(void)
{
   uchar Accumulator;

Accumulator = in(Z182_DSTAT);
   Accumulator &= 0xDF;
   Accumulator |= 0x80;
   out(Accumulator, Z182_DSTAT);
}

/***************************************************************
***********
* Function:   Z182_Enable_External_IO
         *
* Prototype:  void Z182_Enable_External_IO(void)
         *
* Programmer: Doug Kehn
         *
*
         *
* Purpose:
         *
*     Enables access to external (off chip) I/O peripherals.
*
         *
* References:
         *
*     Zilog Inc., "Z80182 Zilog Intelligent Peripheral (ZIP)",
Preliminary *
*         Product Specification, Q2/92.
         *
*
         *
*     Zilog Inc., "Z80180/Z180 MPU Microprocessor Unit", Technical
Manual,  *
*         Q1/91.
         *
*
         *
* Special Notes:
         *
*
         *
* Variable Description(s):
         *
```

```
*   Input:
         *
*   Return:
         *
*   Local:
         *
*      Accumulator - uchar -
         *
*         This variable is used to store intermediate results for arithmetic *
*         and decision making functions.
         *
*
         *
* Revision History:
         *
*    Date     Programmer   Revision
         *
* --------   ----------   --------
         *
* 11/02/93   dk           v1.0        Initial release.
         *
****************************************************************
**********/ void Z182_Enable_External_IO(void)
{
   uchar Accumulator;

Accumulator = in(Z182_OMCR);
   Accumulator |= (uchar)0xA0;        /* Set bits 5 and 7. */
   out(Accumulator, Z182_OMCR);
}

/****************************************************************
************
* Function:    Z182_Init_ASCI_0
         *
* Prototype:   void Z182_Init_ASCI_0(void)
         *
* Programmer: Doug Kehn
         *
*
         *
* Purpose: *
         *
*     Initializes Channel 0 of the Z182 Asynchronous Serial Control Inter-   *
*     face
         *
```

```
 *
        *
 * References:
        *
 *      Zilog Inc., "Z80182 Zilog Intelligent Peripheral (ZIP)",
Preliminary  *
 *         Product Specification, Q2/92.
        *
 *
        *
 *      Zilog Inc., "Z80180/Z180 MPU Microprocessor Unit", Technical
Manual,  *
 *         Q1/91.
        *
 *
        *
 * Special Notes:
        *
 *
        *
 * Variable Description(s):
        *
 *  Input:
        *
 *  Return:
        *
 *  Local:
        *
 *     Accumulator - uchar -
        *
 *         Used for temporary data storage and/or logic functions.
        *
 *
        *
 * Revision History:
        *
 *   Date     Programmer   Revision
        *
 * --------   ----------   --------
        *
 * 02/17/94   dk           v1.0      Initial release.
        *
 ***************************************************************
**********/ void Z182_Init_ASCI_0(void)
{
   uchar Accumulator;
   out(Z182_CNTLA0_INIT, Z182_CNTLA0);
   out(Z182_CNTLB0_INIT, Z182_CNTLB0);
   out(Z182_STAT0_INIT, Z182_STAT0);
```

```
    /* Get the DCD bit working. */
    Accumulator = in(Z182_STAT0);
    Accumulator = in(Z182_STAT0);
}

/***************************************************************
***********
* Function:    Z182_Init_DMA_1
             *
* Prototype:   void Z182_Init_DAM_1(long, uint, uint, uchar)
             *
* Programmer: Doug Kehn
             *
*
             *
* Purpose:
             *
*       Initializes DMA Channel 1 to perform Memory <--> I/O
transfers.        *
*
             *
* References:
             *
*       Zilog Inc., "Z80182 Zilog Intelligent Peripheral (ZIP)",
Preliminary  *
*       Product Specification, Q2/92.
             *
*
             *
*       Zilog Inc., "Z80180/Z180 MPU Microprocessor Unit", Technical
Manual,   *
*       Q1/91.
             *
*
             *
* Special Notes:
             *
*
             *
* Variable Description(s):
             *
*   Input:
             *
*      MemoryAddress - long -
             *
*         Memory address for DMA transfer.
             *
*      IOAddress - uint -
             *
*         IO address for DMA transfer.
             *
```

```
*       ByteCount - uint -
*
*           Number of bytes to transfer.
*
*       Mode - uchar -
*
*           0 = Memory to I/O
*
*           1 = I/O to Memory
*
*   Return:
*
*   Local:
*
*       Accumulator - uchar -
*
*           This variable is used to store intermediate results for
arithmetic *
*           and decision making functions.
*
*
*
* Revision History:
*
*    Date      Programmer  Revision
*
*---------    -----------  --------
*
* 03/02/94    dk           v1.0      Initial release.
*
*****************************************************************
**********/ void Z182_Init_DMA_1(long  MemoryAddress,
                     uint  IOAddress,
                     uint  ByteCount,
                     uchar Mode)
{
   uchar Accumulator;
   uint  Temp;

/* Initialize Memory Address Registers. */
   Accumulator = (uchar) (MemoryAddress & 0x000000FF);
   out(Accumulator, Z182_MAR1L);
   Accumulator = (uchar) ((MemoryAddress & 0x0000FF00) >> 8);
   out(Accumulator, Z182_MAR1H);
   Accumulator = (uchar) ((MemoryAddress & 0x00FF0000) >> 16);
   out(Accumulator, Z182_MAR1B);

/* Initialize I/O Address Registers. */
   Accumulator = (uchar) (IOAddress & 0x00FF);
   out(Accumulator, Z182_IAR1L);
```

```c
    Accumulator = (uchar) ((IOAddress & 0xFF00) >> 8);
    out(Accumulator, Z182_IAR1H);

/* Initialize Byte Count Registers. */
    Accumulator = (uchar) (ByteCount & 0x00FF);
    out(Accumulator, Z182_BCR1L);
    Accumulator = (uchar) ((ByteCount & 0xFF00) >> 8);
    out(Accumulator, Z182_BCR1H);

if( Mode )                              /* Set up as Memory to I/O. */
    {
       /* Initialize Mode. */
       Accumulator = in(Z182_DCNTL);
       Accumulator &= 0xFC;
       out(Accumulator, Z182_DCNTL);

/* Initialize Status. */
       Accumulator = in(Z182_DSTAT);
       Accumulator &= 0xD7;
       Accumulator |= 0x0B;
       out(Accumulator, Z182_DSTAT);
    }
    else                                    /* Set up as I/O to Memory. */
    {
       /* Initialize Mode. */
       Accumulator = in(Z182_DCNTL);
       Accumulator &= 0xFC;
       Accumulator |= 0x02;
       out(Accumulator, Z182_DCNTL);

/* Initialize Status. */
       Accumulator = in(Z182_DSTAT);
       Accumulator &= 0xD7;
       Accumulator |= 0x01;
       out(Accumulator, Z182_DSTAT);
    }
}

/***************************************************************************
***********
* Function:    Z182_Init_Port_B
             *
* Prototype:   void Z182_Init_Port_B(void)
             *
* Programmer: Doug Kehn
             *
*
             *
```

```
 * Purpose:
 *
 *     Initializes Port B (bits 5-7) of the Z182 as output pins.
 *
 *
 *
 * References:
 *
 *     Zilog Inc., "Z80182 Zilog Intelligent Peripheral (ZIP)",
Preliminary  *
 *        Product Specification, Q2/92.
 *
 *
 *     Zilog Inc., "Z80180/Z180 MPU Microprocessor Unit", Technical
Manual,   *
 *        Q1/91.
 *
 *
 * Special Notes:
 *
 *
 *
 * Variable Description(s):
 *
 *   Input:
 *
 *   Return:
 *
 *   Local:
 *
 *
 *
 * Revision History:
 *
 *   Date     Programmer  Revision
 *
 * --------   ----------  --------
 *
 * 02/14/94   dk          v1.0      Initial release.
 *
 ****************************************************************
 **********/ void Z182_Init_Port_B(void)
{
    out(Z182_PORT_B_DDR_INIT, Z182_PORT_B_DDR);
    out(Z182_PORT_B_DR_INIT, Z182_PORT_B_DR);
}
```

```
/*******************************************************************
************
* Function:    Z182_Init_Timer_0
*
* Prototype:   void Z182_Init_Timer_0(void)
*
* Programmer: Doug Kehn
*
*
*
* Purpose:
*
*     Enables timer 0 for use as a general purpose timer.
*
*
*
* References:
*
*     Zilog Inc., "Z80182 Zilog Intelligent Peripheral (ZIP)",
Preliminary  *
*         Product Specification, Q2/92.
*
*
*
*     Zilog Inc., "Z80180/Z180 MPU Microprocessor Unit", Technical
Manual,  *
*         Q1/91.
*
*
*
* Special Notes:
*
*
*
* Variable Description(s):
*
*  Input:
*
*  Return:
*
*  Local:
*
*
*
* Revision History:
*
*   Date     Programmer  Revision
*
* --------   ----------  --------
*
* 11/02/93   dk          v1.0      Initial release.
*
```

```
/*****************************************************************
***********/ void Z182_Init_Timer_0(void)
{
    /* Initialize Timer Data Registers. */
    out(Z182_TMDR0L_INIT, Z182_TMDR0L);
    out(Z182_TMDR0H_INIT, Z182_TMDR0H);

/* Initialize Timer Reload Registers. */
    out(Z182_RLDR0L_INIT, Z182_RLDR0L);
    out(Z182_RLDR0H_INIT, Z182_RLDR0H);
}

/*****************************************************************
************
* Function:    Z182_Init_Timer_Control
             *
* Prototype:   void Z182_Init_Timer_Control(void)
             *
* Programmer:  Doug Kehn
             *
*
             *
* Purpose:
             *
*     Enables timer control register.
             *
*
             *
* References:
             *
*        Zilog Inc., "Z80182 Zilog Intelligent Peripheral (ZIP)",
Preliminary *
*        Product Specification, Q2/92.
             *
*
             *
*        Zilog Inc., "Z80180/Z180 MPU Microprocessor Unit", Technical
Manual,  *
*        Qa/91.
             *
*
             *
*Special Notes:
             *
*     The Timer Control Register is initially setup to only start
Timer 1.  *
*     Since Timer 0 is a general purpose register, it will be setup
only     *
```

```
*      when needed.  Also, A18/Tout is set to Tout.
       *
*
       *
* Variable Description(s):
       *
*  Input:
       *
*  Return:
       *
*  Local:
       *
*
       *
* Revision History:
       *
*   Date     Programmer  Revision
       *
* --------  ----------- --------
       *
* 11/02/93  dk           v1.0    Initial release.
       *
***************************************************************
**********/
void Z182_Init_Timer_Control(void)
{
   out(Z182_TCR_INIT, Z182_TCR);
}

/***************************************************************
***********
* Module:   z182.h
          *
* Programmer: Doug Kehn
          *
*
          *
* Purpose:
          *
*      Header file for use with the Zilog Z80182 ZIP.
          *
*
          *
* References:
          *
*      Zilog Inc., "Z80182 Zilog Intelligent Peripheral (ZIP)",
Preliminary  *
*        Product Specification, Q2/92.
          *
*
          *
```

*       Zilog Inc., "Z80180/Z180 MPU Microprocessor Unit", Technical Manual,   *
*              Q1/91.
              *
*
              *
* Special Notes:
              *
*       IL_Data is a code position dependent label.  This lable must be set   *
*       to correspond with the Linker setup.
              *
***************************************************************************/ include "pcmcia.h"

/*************         ASCI    CHANNELS    CONTROL    REGISTERS *******************/

```
#define Z182_CNTLA0        0x00   /* ASCI Control Register A (Ch. 0)     */
#define Z182_CNTLA1        0x01   /* ASCI Control Register A (Ch. 1)     */
#define Z182_CNTLB0        0x02   /* ASCI Control Register B (Ch. 0)     */
#define Z182_CNTLB1        0x03   /* ASCI Control Register B (Ch. 1)     */
#define Z182_STAT0         0x04   /* ASCI Status Register (Ch. 0)  */
#define Z182_STAT1         0x05   /* ASCI Status Register (Ch. 1)  */
#define Z182_TDR0          0x06   /* ASCI Transmit Data Register (Ch. 0) */
#define Z182_TDR1          0x07   /* ASCI Transmit Data Register (Ch. 1) */
#define Z182_TSR0          0x08   /* ASCI Receive Data Register (Ch. 0)  */
define Z182_TSR1          0x09   /* ASCI Receive Data Register (Ch. 1)  */ define Z182_CNTLA0_INIT   0x74 ifdef CPU_CLOCK
   #define Z182_CNTLB0_INIT   0x03
endif ifndef CPU_CLOCK
   #define Z182_CNTLB0_INIT   0x28
endif define Z182_STAT0_INIT    0x08
```

```c
/*********************        CSI/O    REGISTERS
*****************************/ define Z182_CNTR           0x0A  /* CSI/O Control Register
        */
#define Z182_TRDR           0x0B  /* CSI/O Transmit/Receive data
register*/
                                  /* Read  - Received data
        */
                                  /* Write - Transmit data
        */

/********************        TIMER    DATA    REGISTERS
***************************/
/* NOTE:
        */
/*      When reading, always read Data Register L before reading
Data    */
/*      Register H.
        */
/********************************************************************
**********/
#define Z182_TMDR0L         0x0C  /* Timer 0 Data Register L
        */
#define Z182_TMDR0H         0x0D  /* Timer 0 Data Register H
        */
#define Z182_TMDR1L         0x14  /* Timer 1 Data Register L
        */
#define Z182_TMDR1H         0x15  /* Timer 1 Data Register H
        */ define Z182_TMDR0L_INIT    0x00
define Z182_TMDR0H_INIT    0x00

/********************        TIMER    RELOAD    REGISTERS
**************************/ define Z182_RLDR0L         0x0E  /* Timer 0 Reload Register L
        */
#define Z182_RLDR0H         0x0F  /* Timer 0 Reload Register H
        */
#define Z182_RLDR1L         0x16  /* Timer 1 Reload Register L
        */
#define Z182_RLDR1H         0x17  /* Timer 1 Reload Register H
        */ define Z182_RLDR0L_INIT    0x00
define Z182_RLDR0H_INIT    0x00

/********************        TIMER    CONTROL    REGISTER
************************/
```

```c
define Z182_TCR              0x10  /* Timer Control Register */ define Z182_TCR_INIT         0x08 define Z182_TMDR0_DISABLE    0xEE  /* This is an "and" operation. */ define Z182_TMDR0_ENABLE     0x11  /* This is an "or" operation. */

/*********************         FREE    RUNNING    COUNTER
***************************/ define Z182_FRC              0x18  /* Free Running Counter */

/*********************         CPU    CONTROL    REGISTER
***************************/ define Z182_CCR              0x1F  /* CPU Control Register */ define Z182_CCR_INIT         0x97

/*****************************         DMA    REGISTERS
*******************************/

/*
    DMA 0 Source Address Registers
*/
#define Z182_SAR0L            0x20  /* Address bits  0 -  7 */
#define Z182_SAR0H            0x21  /* Address bits  8 - 15 */
#define Z182_SAR0B            0x22  /* Address bits 16 - 19 */

/*
    DMA 0 Destination Address Registers
*/
#define Z182_DAR0L            0x23  /* Address bits  0 -  7 */
#define Z182_DAR0H            0x24  /* Address bits  8 - 15 */
#define Z182_DAR0B            0x25  /* Address bits 16 - 19 */

/*
    DMA 0 Byte Count Registers
*/
#define Z182_BCR0L            0x26  /* DMA 0 Byte Counter Registers L */
```

```
#define Z182_BCR0H          0x27  /* DMA 0 Byte Counter Registers
H       */

/*
   DMA 1 Memory Address Registers
*/
#define Z182_MAR1L          0x28  /* Address bits  0 -  7
        */
#define Z182_MAR1H          0x29  /* Address bits  8 - 15
        */
#define Z182_MAR1B          0x2A  /* Address bits 16 - 19
        */

/*
   DMA 1 I/O Address Registers
*/
#define Z182_IAR1L          0x2B  /* Address bits  0 -  7
        */
#define Z182_IAR1H          0x2C  /* Address bits  8 - 15
        */

/*
   DMA 1 Byte Count Registers
*/
#define Z182_BCR1L          0x2E  /* DMA 1 Byte Count Registers
L       */
#define Z182_BCR1H          0x2F  /* DMA 1 Byte Count Registers
H       */

/*
   Misc. DMA Registers
*/
#define Z182_DSTAT          0x30  /* DMA Status Register
        */
#define Z182_DMODE          0x31  /* DMA Mode Registers
        */
#define Z182_DCNTL          0x32  /* DMA/Wait Control Register
        */ define Z182_DSTAT_INIT     0x33
define Z182_DCNTL_INIT     0x40

/*************************       M M U    R E G I S T E R S
*******************************/ define Z182_CBR            0x38  /* MMU Common Base Register
        */
#define Z182_BBR            0x39  /* MMU Bank Base Register
        */
#define Z182_CBAR                 0x3A   /* MMU Common/Bank Area
Register        */
```

```c
#define Z182_CBAR_INIT          0

/********************        SYSTEM    CONTROL    REGISTERS
*************************/ define Z182_IL                 0x33   /* Interrupt Vector Low
Register        */
#define Z182_ITC                0x34   /* INT/Trap Control Register
        */
#define Z182_RCR                0x36   /* Refresh Control Register
        */ define Z182_IL_INIT            0x20
define Z182_RCR_INIT           0x7C

/*
   The Operation Mode Control Register has to be programmed to
0x0xxxxx
   as a part of initialization.
*/
#define Z182_OMCR               0x3E   /* Operation Mode Control
Register        */
#define Z182_ICR                0x3F   /* I/O Control Register
        */ define Z182_OMCR_INIT          0x5F
define Z182_OMCR_NORM          0x5F

/**************       Z80182   ESCC,    PIA    and    MISC   REGISTERS
*******************/ define Z182_PORT_C_DDR         0xDD   /* Port C Data Direction
Register        */
#define Z182_PORT_C_DR          0xDE   /* Port C Data Register
        */
#define Z182_INT_MUX_CNTRL      0xDF   /* Interrupt Edge/Pin MUX
Control         */
#define Z182_ESCC_CHA_CR        0xE0   /* ESCC Channel A Control
Register        */
#define Z182_ESCC_CHA_DR        0xE1   /* ESCC Channel A Data Register
        */
#define Z182_ESCC_CHB_CR        0xE2   /* ESCC Channel B Control
Register        */
#define Z182_ESCC_CHB_DR        0xE3   /* ESCC Channel B Data Register
        */
#define Z182_PORT_B_DDR         0xE4   /* Port B Data Direction
Register        */
#define Z182_PORT_B_DR          0xE5   /* Port B Data Register
        */
#define Z182_RAMUBR             0xE6   /* RAM Upper Boundry Register
        */
```

```c
#define Z182_RAMLBR         0xE7    /* RAM Lower Boundry Register */
#define Z182_ROMABR         0xE8    /* ROM Address Boundry Register */
#define Z182_PORT_A_DDR     0xED    /* Port A Data Direction Register */
#define Z182_PORT_A_DR      0xEE    /* Port A Data Register */
define Z182_SYS_CONFIG_REG 0xEF    /* System Configuration Register */ define Z182_INT_MUX_CNTRL_INIT   0x00
define Z182_PORT_B_DDR_INIT      0x1F
#define Z182_PORT_B_DR_INIT       0xE0
#define Z182_RAMUBR_INIT          0x0D
#define Z182_RAMLBR_INIT          0x0B
#define Z182_ROMABR_INIT          0x0B
#define Z182_SYS_CONFIG_REG_INIT  0x46

/***************** Z80182 MIMIC REGISTER MAP ********************/ define Z182_MIMIC_MCC      0xFF    /* MIMIC Master Control Register (MMC) */
define Z182_MIMIC_IUS_IP   0xFE    /* Int. Under Service/Pending (R/W b7) */
#define Z182_MIMIC_IE       0xFD    /* Interrupt Enable */
#define Z182_MIMIC_IVEC     0xFC    /* Interrupt Vector */
#define Z182_MIMIC_RTCR     0xFB    /* Receiver Time Constant */
#define Z182_MIMIC_TTCR     0xFA    /* Transmit Time Constant */
#define Z182_MIMIC_DLM      0xF9    /* DLM Divisor Latch (MSByte) (R only) */
#define Z182_MIMIC_DLL      0xF8    /* DLL Divisor Latch (LSByte) (R only) */
#define Z182_MIMIC_SCR      0xF7    /* Scratch Register (R only) */
#define Z182_MIMIC_MSR      0xF6    /* Modem Status Register (R/W b7-4) */
#define Z182_MIMIC_LSR      0xF5    /* Line Status Register (R/W b6432) */
#define Z182_MIMIC_MCR      0xF4    /* Modem Control Register (R only) */
#define Z182_MIMIC_LCR      0xF3    /* Line Control Register (R only) */
#define Z182_MIMIC_FCR      0xF2    /* FIFO Control Register (R only) */
#define Z182_MIMIC_IER      0xF1    /* Interrupt Enable Register (R only) */
```

```
#define Z182_MIMIC_RBR          0xF0   /* Receive Buffer Register (W
only)   */
#define Z182_MIMIC_THR          0xF0   /* Transmit Holding Register (R
only) */
#define Z182_MIMIC_FSCR         0xEC   /* FIFO Status and Control (R/W
b7-4) */
#define Z182_MIMIC_TTTC         0xEB   /* Transmit Timeout Time
Constant    */
#define Z182_MIMIC_RTTC         0xEA   /* Receive Timeout Time
Constnat    */ define Z182_MIMIC_IUS_IP_INIT  0x80
define Z182_MIMIC_IE_INIT      0xCF
#define Z182_MIMIC_IVEC_INIT    0x10
#define Z182_MIMIC_FSCR_INIT    0x20
#define Z182_MIMIC_MCC_INIT     0x81
#define Z182_MIMIC_RTCR_INIT    0x00
#define Z182_MIMIC_RTTC_INIT    0x00
#define Z182_MIMIC_TTCR_INIT    0x00
#define Z182_MIMIC_TTTC_INIT    0x00
```

```
;***************************************************************
**********;
; Module:     z182.inc
            ;
; Programmer: Doug Kehn
            ;
;
            ;
; Purpose:
            ;
;      Header file for use with the Zilog Z80182 ZIP.
            ;
;
            ;
; References:
            ;
;      Zilog Inc., "Z80182 Zilog Intelligent Peripheral (ZIP)",
Preliminary ;
;           Product Specification, Q2/92.
            ;
;
            ;
;      Zilog Inc., "Z80180/Z180 MPU Microprocessor Unit", Technical
Manual,  ;
;           Q1/91.
            ;
;
            ;
; Special Notes:
            ;
```

```
;       IL_Data is a code position dependent label.  This lable must be set  ;
;       to correspond with the Linker setup.
        ;
;***************************************************************************;

; Z80182 MPU CONTROL REGISTERS

;*****************           ASCI    CHANNELS    CONTROL    REGISTERS
**********************;

Z182_CNTLA0:            .equal 00h      ;ASCI Control Register A (Ch. 0)
Z182_CNTLA1:            .equal 01h      ;ASCI Control Register A (Ch. 1)
Z182_CNTLB0:            .equal 02h      ;ASCI Control Register B (Ch. 0)
Z182_CNTLB1:            .equal 03h      ;ASCI Control Register B (Ch. 1)
Z182_STAT0:             .equal 04h      ;ASCI Status Register (Ch. 0)
Z182_STAT1:             .equal 05h      ;ASCI Status Register (Ch. 1)
Z182_TDR0:              .equal 06h      ;ASCI Transmit Data Register (Ch. 0)
Z182_TDR1:              .equal 07h      ;ASCI Transmit Data Register (Ch. 1)
Z182_TSR0:              .equal 08h      ;ASCI Receive Data Register (Ch. 0)
Z182_TSR1:              .equal 09h      ;ASCI Receive Data Register (Ch. 1)

Z182_CNTLA0_INIT        .equal 74h
Z182_CNTLB0_INIT        .equal 28h
Z182_STAT0_INIT         .equal 08h ;************************           CSI/O    REGISTERS
******************************;

Z182_CNTR:              .equal 0Ah      ;CSI/O Control Register
Z182_TRDR:              .equal 0Bh      ;CSI/O Transmit/Receive data register
                                        ;   Read  - Received data
                                        ;   Write - Transmit data ;*********************           TIMER    DATA    REGISTERS
**************************;
;NOTE:
        ;
;       When reading, always read Data Register L before reading Data
        ;
```

```
;       Register H.
        ;
;****************************************************************
***********;
Z182_TMDR0L:            .equal 0Ch      ;Timer 0 Data Register L
Z182_TMDR0H:            .equal 0Dh      ;Timer 0 Data Register H
Z182_TMDR1L:            .equal 14h      ;Timer 1 Data Register L
Z182_TMDR1H:            .equal 15h      ;Timer 1 Data Register H Z182_TMDR0L_INIT:       .equal 00h
Z182_TMDR0H_INIT:       .equal 00h ;*********************          TIMER     RELOAD     REGISTERS
**************************;

Z182_RLDR0L:            .equal 0Eh      ;Timer 0 Reload Register L
Z182_RLDR0H:            .equal 0Fh      ;Timer 0 Reload Register H
Z182_RLDR1L:            .equal 16h      ;Timer 1 Reload Register L
Z182_RLDR1H:            .equal 17h      ;Timer 1 Reload Register H Z182_RLDR0L_INIT:       .equal 00h
Z182_RLDR0H_INIT:       .equal 00h ;*********************          TIMER     CONTROL     REGISTER
**************************;

Z182_TCR:               .equal 10h      ;Timer Control Register

Z182_TCR_INIT:          .equal 08h

Z182_TMDR0_DISABLE:     .equal 0EEh     ;This is an "and" operation.
Z182_TMDR0_ENABLE:      .equal 11h      ;This is an "or" operation.

;**********************         FREE     RUNNING     COUNTER
***************************;

Z182_FRC:               .equal 18h      ;Free Running Counter

;**********************         CPU      CONTROL     REGISTER
**************************;

Z182_CCR:               .equal 1Fh      ;CPU Control Register

Z182_CCR_INIT:          .equal 097h

;************************       DMA      REGISTERS
*******************************;

;DMA 0 Source Address Registers
Z182_SAR0L:             .equal 20h      ;Address bits  0 -  7
Z182_SAR0H:             .equal 21h      ;Address bits  8 - 15
Z182_SAR0B:             .equal 22h      ;Address bits 16 - 19
```

```
;DMA 0 Destination Address Registers
Z182_DAR0L:             .equal 23h      ;Address bits  0 -  7
Z182_DAR0H:             .equal 24h      ;Address bits  8 - 15
Z182_DAR0B:             .equal 25h      ;Address bits 16 - 19

;DMA 0 Byte Count Registers
Z182_BCR0L:                 .equal 26h      ;DMA 0 Byte Counter
Registers L
Z182_BCR0H:                 .equal 27h      ;DMA 0 Byte Counter
Registers H ;DMA 1 Memory Address Registers
Z182_MAR1L:             .equal 28h      ;Address bits  0 -  7
Z182_MAR1H:             .equal 29h      ;Address bits  8 - 15
Z182_MAR1B:             .equal 2Ah      ;Address bits 16 - 19

;DMA 1 I/O Address Registers
Z182_IAR1L:             .equal 2Bh      ;Address bits  0 -  7
Z182_IAR1H:             .equal 2Ch      ;Address bits  8 - 15

;DMA 1 Byte Count Registers
Z182_BCR1L:             .equal 2Eh      ;DMA 1 Byte Count Registers
L
Z182_BCR1H:             .equal 2Fh      ;DMA 1 Byte Count Registers
H ;Misc. DMA Registers
Z182_DSTAT:             .equal 30h      ;DMA Status Register
Z182_DMODE:             .equal 31h      ;DMA Mode Registers
Z182_DCNTL:             .equal 32h      ;DMA/Wait Control Register Z182_DSTAT_INIT:        .equal 33h
Z182_DCNTL_INIT:        .equal 40h ;*************************       MMU    REGISTERS
*********************************;

Z182_CBR:               .equal 38h      ;MMU Common Base Register
Z182_BBR:               .equal 39h      ;MMU Bank Base Register
Z182_CBAR:                  .equal 3Ah      ;MMU Common/Bank Area
Register Z182_CBAR_INIT:         .equal 00h ;*********************       SYSTEM   CONTROL   REGISTERS
************************;

Z182_IL:                    .equal 33h      ;Interrupt Vector Low
Register
Z182_ITC:               .equal 34h      ;INT/Trap Control Register
Z182_RCR:               .equal 36h      ;Refresh Control Register
```

```
Z182_IL_INIT:            .equal 20h
Z182_RCR_INIT:           .equal 7Ch

;The Operation Mode Control Register has to be programmed to 0x0xxxxx as
;a part of initialization.
Z182_OMCR:               .equal 3Eh       ;Operation Mode Control Register
Z182_ICR:                .equal 3Fh       ;I/O Control Register Z182_OMCR_INIT:          .equal 5Fh
Z182_OMCR_NORM:          .equal 5Fh ;************* Z80182 ESCC, PIA and MISC REGISTERS ****************;

Z182_PORT_C_DDR:         .equal 0DDh      ;Port C Data Direction Register
Z182_PORT_C_DR:          .equal 0DEh      ;Port C Data Register
Z182_INT_MUX_CNTRL:      .equal 0DFh      ;Interrupt Edge/Pin MUX Control
Z182_ESCC_CHA_CR:        .equal 0E0h      ;ESCC Chan A Control Register
Z182_ESCC_CHA_DR:        .equal 0E1h      ;ESCC Chan A Data Register
Z182_ESCC_CHB_CR:        .equal 0E2h      ;ESCC Chan B Control Register
Z182_ESCC_CHB_DR:        .equal 0E3h      ;ESCC Chan B Data Register
Z182_PORT_B_DDR:         .equal 0E4h      ;Port B Data Direction Register
Z182_PORT_B_DR:          .equal 0E5h      ;Port B Data Register
Z182_RAMUBR:             .equal 0E6h      ;RAM Upper Boundry Register
Z182_RAMLBR:             .equal 0E7h      ;RAM Lower Boundry Register
Z182_ROMABR:             .equal 0E8h      ;ROM Address Boundry Register
Z182_PORT_A_DDR:         .equal 0EDh      ;Port A Data Direction Register
Z182_PORT_A_DR:          .equal 0EEh      ;Port A Data Register
Z182_SYS_CONFIG_REG:     .equal 0EFh      ;System Configuration Register Z182_INT_MUX_CNTRL_INIT: .equal 00h
Z182_PORT_B_DDR_INIT:    .equal 1Fh
Z182_PORT_B_DR_INIT:     .equal 0E0h
Z182_RAMUBR_INIT:        .equal 0Dh
Z182_RAMLBR_INIT:        .equal 0Bh
Z182_ROMABR_INIT:        .equal 0Bh
Z182_SYS_CONFIG_REG_INIT: .equal 46h

;******************* Z80182 MIMIC REGISTER MAP ************************;
```

```
Z182_MIMIC_MCC:              .equal 0FFh      ;MIMIC Master Control
Register (MMC)
Z182_MIMIC_IUS_IP:           .equal 0FEh      ;Int. Under Service/Pending
(R/W b7)
Z182_MIMIC_IE:               .equal 0FDh      ;Interrupt Enable
Z182_MIMIC_IVEC:             .equal 0FCh      ;Interrupt Vector
Z182_MIMIC_RTCR:             .equal 0FBh      ;Receiver Time Constant
Z182_MIMIC_TTCR:             .equal 0FAh      ;Transmit Time Constant
Z182_MIMIC_DLM:              .equal 0F9h      ;DLM Divisor Latch (MSByte)
(R only)
Z182_MIMIC_DLL:              .equal 0F8h      ;DLL Divisor Latch (LSByte)
(R only)
Z182_MIMIC_SCR:              .equal 0F7h      ;Scratch Register (R only)
Z182_MIMIC_MSR:              .equal 0F6h      ;Modem Status Register (R/W
b7-4)
Z182_MIMIC_LSR:              .equal 0F5h      ;Line Status Register (R/W
b6432)
Z182_MIMIC_MCR:              .equal 0F4h      ;Modem Control Register (R
only)
Z182_MIMIC_LCR:              .equal 0F3h      ;Line Control Register (R
only)
Z182_MIMIC_FCR:              .equal 0F2h      ;FIFO Control Register (R
only)
Z182_MIMIC_IER:              .equal 0F1h      ;Interrupt Enable Register
(R only)
Z182_MIMIC_RBR:              .equal 0F0h      ;Receive Buffer Register (W
only)
Z182_MIMIC_THR:              .equal 0F0h      ;Transmit Holding Register
(R only)
Z182_MIMIC_FSCR:             .equal 0ECh      ;FIFO Status and Control
(R/W b7-4)
Z182_MIMIC_TTTC:             .equal 0EBh      ;Transmit Timeout Time
Constant
Z182_MIMIC_RTTC:             .equal 0EAh      ;Receive Timeout Time
Constnat Z182_MIMIC_IUS_IP_INIT:      .equal 080h
Z182_MIMIC_IE_INIT:          .equal 0CFh
Z182_MIMIC_IVEC_INIT:        .equal 10h
Z182_MIMIC_FSCR_INIT:        .equal 20h
Z182_MIMIC_MCC_INIT:         .equal 081h
Z182_MIMIC_RTCR_INIT:        .equal 00h
Z182_MIMIC_RTTC_INIT:        .equal 00h
Z182_MIMIC_TTCR_INIT:        .equal 00h
Z182_MIMIC_TTTC_INIT:        .equal 00h ;****************
; Mark module end
;****************
       .end
```

```
;****************************************************************
***********;
; Module:    z182mac.inc
           ;
; Programmer: Doug Kehn
           ;
; Compiler:
           ;
;
           ;
; Purpose: Macro definitions for Z80182 extended instructions.
           ;
;
           ;
; Referneces: Zilog Inc., "Z80182 Zilog Intelligent Peripheral
(ZIP)"      ;
;            Preliminary Product Specification, Q2/92.
           ;
;            Zilog Inc., "Z80180/Z180 MPU Microprocessor Unit",
Technical   ;
;            Manual, Q1/91.
           ;
;
           ;
; Notes:
           ;
; ------
           ;
; To use the macros, follow the following conventions:
           ;
;    1. All nemonics are in upper case.
           ;
;    2. Use upper case when referencing a register.
           ;
;
           ;
; Using upper case makes the use of macros standout when used
amongst the ;
; reset of the source code (if using lower case).
           ;
;
           ;
;****************************************************************
***********;

IN0:    .macro   Register,Port           ;IN0   g,(m)
        .maclist on
        .defb 11101101b
        .maclist off
        .ifsame  A,Register
            .maclist on
```

```
          .defb 00111000b
          .maclist off
          .endif
     .ifsame   B,Register
          .maclist on
          .defb 00000000b
          .maclist off
          .endif
     .ifsame   C,Register
          .maclist on
          .defb 00001000b
          .maclist off
          .endif
     .ifsame   D,Register
          .maclist on
          .defb 00010000b
          .maclist off
          .endif
     .ifsame   E,Register
          .maclist on
          .defb 00011000b
          .maclist off
          .endif
     .ifsame   H,Register
          .maclist on
          .defb 00100000b
          .maclist off
          .endif
     .ifsame   L,Register
          .maclist on
          .defb 00101000b
          .maclist off
          .endif
     .maclist on
     .defb Port
     .macend OUT0:   .macro    Port, Register          ;OUT0   (m),g
        .maclist on
        .defb 11101101b
        .maclist off
        .ifsame   A,Register
          .maclist on
          .defb 00111001b
          .maclist off
          .endif
        .ifsame   B,Register
          .maclist on
          .defb 00000001b
          .maclist off
          .endif
```

```
        .ifsame  C,Register
           .maclist on
           .defb 00001001b
           .maclist off
           .endif
        .ifsame  D,Register
           .maclist on
           .defb 00010001b
           .maclist off
           .endif
        .ifsame  E,Register
           .maclist on
           .defb 00011001b
           .maclist off
           .endif
        .ifsame  H,Register
           .maclist on
           .defb 00100001b
           .maclist off
           .endif
        .ifsame  L,Register
           .maclist on
           .defb 00101001b
           .maclist off
           .endif
        .maclist on
        .defb Port
        .macend .end
```

```
/****************************************************************
************
* Module Name:   z85230.c
            *
* Creation Date: 11/24/93
            *
* Compiler:      2500AD Software Inc., v4.03
            *
*
            *
* Functions:
            *
*     Z85230_Change_Int_Mode
            *
*     Z85230_Init_Channel_A
            *
*     Z85230_Init_Channel_B
            *
*     Z85230_Read_Registers
            *
```

```
 *
         *
 * Global Variable Description(s):
         *
 ***************************************************************
 ***********/

/******************
 Linker directives
 ******************/
    .asm
       .linklist
       .symbols
    .endasm include "2500ad.h"
include "z85230.h"

typedef unsigned char  uchar;
typedef unsigned int   uint;

/******************************************
 Function Prototypes for Module z85230.c
 ******************************************/
uchar  in(uchar);
void   out(uchar, uchar);
void   Z85230_Change_Master_Int_Mode(uchar);
void   Z85230_Init_Channel_A(void);
void   Z85230_Init_Channel_B(void);
void   Z85230_Read_Registers(uchar);

/****************************************************************
 ************
 * Function:    Z85230_Change_Master_Int_Mode
             *
 * Prototype:   void Z85230_Change_Master_Int_Mode(uchar)
             *
 * Programmer: Doug Kehn
             *
 *
             *
 * Purpose:
             *
 *     This functions changes the Master Interrupt mode of WR9.
             *
 *
             *
```

```
 * References:
 *
 *      Zilog Inc., Technical Manual, "Z85230/Z80230 ESCC Enhanced
Serial    *
 *         Communication Controller" - Q1/91.
 *
 *
 *
 * Special Notes:
 *
 *
 *
 * Variable Descriptions(s):
 *
 *   Input:
 *
 *      Mode - uchar -
 *
 *         0 = Disable ESCC interrupts
 *
 *         1 = Enable ESCC interrupts
 *
 *   Return:
 *
 *   Local:
 *
 *      Accumulator - uchar -
 *
 *         This variable is used to store intermediate results for
arithmetic *
 *         and decision making functions.
 *
 *
 *
 * Revision History:
 *
 *   Date      Programmer   Revision
 *
 * --------   ----------   --------
 *
 * 03/02/94   dk           v1.0       Initial release
 *
 ***************************************************************
***********/ void Z85230_Change_Master_Int_Mode(uchar Mode)
{
   uchar Accumulator;

out(Z85230_R9, Z85230_CHA_CR);
   Accumulator = in(Z85230_CHA_CR);
   Accumulator &= 0x3F;                  /* Ensure "no reset". */
```

```
    if( Mode )
    {
        Accumulator |= Z85230_ENABLE;    /* Turn on ESCC interrupts.
*/
    }
    else
    {
        Accumulator &= Z85230_DISABLE;   /* Turn off ESCC interrupts.
*/
    } out(Z85230_R9, Z85230_CHA_CR);
    out(Accumulator, Z85230_CHA_CR);
}

/*******************************************************************
***********
* Function:    Z85230_Init_Channel_A
            *
* Prototype:   void Z85230_Init_Channel_A(void)
            *
* Programmer: Doug Kehn
            *
*
            *
* Purpose:
            *
*         Initializes  Channel  A  of  the  Z182  ESCC  for  ILAN
communications'         *
*       purposes.
            *
*
            *
* References:
            *
*     Zilog Inc., Technical Manual, "Z85230/Z80230 ESCC Enhanced
Serial      *
*         Communication Controller" - Q1/91.
            *
*
            *
* Special Notes:
            *
*     (1) The RS-485 receiver is disabled upon termination of this
function.*
*     (2) Z85230 interrupts should be disabled before calling this
function.*
*
            *
* Variable Descriptions(s):
            *
```

```
*   Input:
        *
*   Return:
        *
*   Local:
        *
*       Z85230_InitTableA - const uchar array -
            *
*           This array holds the initialization parameters for Channel
A.          *
*       x - uchar -
            *
*           "for" loop counter.
            *
*
            *
*   Revision History:
            *
*   Date        Programmer  Revision
            *
*   --------    ----------  --------
            *
*   01/04/94    dk          v1.0        Initial release
            *
***************************************************************
**********/ const uchar Z85230_InitTableA[] =
    {
        Z85230_R9,      Z85230_RESET_CHA,
        Z85230_R4,      Z85230_R4A_MODES,
        Z85230_R1,      Z85230_R1A_MODES,
        Z85230_R2,      Z85230_R2A_MODES,
        Z85230_R3,      Z85230_R3A_MODES,
        Z85230_R5,      Z85230_R5A_MODES,
        Z85230_R7,      Z85230_R7A_MODES,
        Z85230_R15,     Z85230_R7P_ENABLE,
        Z85230_R7,      Z85230_R7PA_MODES,
        Z85230_R15,     Z85230_R7P_DISABLE,
        Z85230_R9,      Z85230_R9A_MODES,
        Z85230_R10,     Z85230_R10A_MODES,
        Z85230_R11,     Z85230_R11A_MODES,
        Z85230_R12,     Z85230_R12A_MODES,
        Z85230_R13,     Z85230_R13A_MODES,
        Z85230_R14,     Z85230_R14A_MODES1,
        Z85230_R14,     Z85230_R14A_MODES2,
        Z85230_R14,     Z85230_R14A_ENABLES,
        Z85230_R3,      Z85230_R3A_ENABLES,
        Z85230_R1,      Z85230_R1A_ENABLES,
        Z85230_R15,     Z85230_R15A_INTERRUPT,
        Z85230_R0,      Z85230_R0A_INTERRUPT,
        Z85230_R0,      Z85230_R0A_INTERRUPT,
```

```
        Z85230_R1,    Z85230_R1A_INTERRUPT,
        Z85230_R9,    Z85230_R9A_INTERRUPT
    };

void Z85230_Init_Channel_A(void)
{
    uchar x;

for (x = (uchar)0; x < sizeof(Z85230_InitTableA) / sizeof(uchar); x++)
    {
        out(Z85230_InitTableA[x], Z85230_CHA_CR);
    }
}

/***************************************************************
************
* Function:    Z85230_Init_Channel_B
            *
* Prototype:   void Z85230_Init_Channel_B(void)
            *
* Programmer: Doug Kehn
            *
*
            *
* Purpose:
            *
*       Initializes Channel B of the Z182 ESCC for MIMIC timing
operations.    *
*
            *
* References:
            *
*     Zilog Inc., Technical Manual, "Z85230/Z80230 ESCC Enhanced
Serial     *
*        Communication Controller" - Q1/91.
            *
*
            *
* Special Notes:
            *
*
            *
* Variable Descriptions(s):
            *
*   Input:
            *
*   Return:
            *
*   Local:
            *
```

```
*      Z85230_InitTableA - const uchar array -
          *
*         This array holds the initialization parameters for Channel
A.        *
*      x - uchar -
          *
*         "for" loop counter.
          *
*
          *
* Revision History:
          *
*   Date      Programmer  Revision
          *
* --------   ----------   --------
          *
* 02/15/94   dk           v1.0       Initial release
          *
***************************************************************
**********/ const uchar Z85230_InitTableB[] =
    {
       Z85230_R9,    Z85230_RESET_CHB,
       Z85230_R4,    Z85230_R4B_MODES,
       Z85230_R11,   Z85230_R11B_MODES,
       Z85230_R12,   Z85230_R12B_MODES,
       Z85230_R13,   Z85230_R13B_MODES,
       Z85230_R14,   Z85230_R14B_MODES1,
       Z85230_R14,   Z85230_R14B_MODES2,
       Z85230_R14,   Z85230_R14B_ENABLES
    };

void Z85230_Init_Channel_B(void)
{
   uchar x;

for  (x  =  (uchar)0;  x  <  sizeof(Z85230_InitTableB)  /
sizeof(uchar); x++)
   {
       out(Z85230_InitTableB[x], Z85230_CHB_CR);
   }
}

/***************************************************************
***********
* Function:   Z85230_Read_Registers
          *
* Prototype:  void Z85230_Read_Registers(uchar)
          *
```

```
* Programmer: Doug Kehn
         *
* Compiler:   2500AD Software Inc.  v4.03
         *
*
         *
* Purpose:
         *
*       This function reads all Z182 ESCC Read Registers for a particular    *
*       channel.
         *
*
         *
* References:
         *
*      Zilog Inc., Technical Manual, "Z85230/Z80230 ESCC Enhanced Serial    *
*            Communication Controller" - Q1/91.
         *
*
         *
* Special Notes:
         *
*
         *
* Variable Descriptions(s):
         *
*   Input:
         *
*      Channel - uchar -
         *
*       This variable equates to the particular Z182 ESCC channel to read. *
*   Return:
         *
*   Local:
         *
*      Register - uchar -
         *
*         "for" loop variable.  Equates to the register being read.
         *
*      RegisterValue - uchar -
         *
*       This variable equates to the value read from a particular register.*
*
         *
* Revision History:
         *
*    Date     Programmer   Revision
         *
```

```
*   --------    ----------    --------
         *
* 11/24/93   dk            v1.0       Initial release
         *
***************************************************************
**********/ void Z85230_Read_Registers(uchar Channel)
{
   uchar Register;
   uchar RegisterValue;

/* Read the values of Read Registers 0 through 15. */
   for (Register = (uchar)0; Register <= (uchar)15; Register++)
   {
      out(Register, Channel);
      RegisterValue = in(Channel);
   }
}

/***************************************************************
***********
* Module:    z85230.h
         *
* Programmer: Doug Kehn
         *
*
         *
* Purpose:
         *
*     Header file for use with the Zilog 85230 ESCC.
         *
*
         *
* References: Zilog Inc., Technical Manual, "Z85230/Z80230 ESCC
Enhanced    *
*            Serial Communication Controller" - Q1/91
         *
*
         *
***************************************************************
**********/ include "pcmcia.h"

/*
   Z85230 I/O address space.
*/
#define Z85230_CHA_CR    0xE0
#define Z85230_CHA_DR    0xE1
#define Z85230_CHB_CR    0xE2
#define Z85230_CHB_DR    0xE3
```

```c
/*
    WRITE REGISTER 0 (Command Register)
*/
#define Z85230_R0                       0x00    /* Register 0 */
#define Z85230_R1                       0x01    /* Register 1 */
#define Z85230_R2                       0x02    /* Register 2 */
#define Z85230_R3                       0x03    /* Register 3 */
#define Z85230_R4                       0x04    /* Register 4 */
#define Z85230_R5                       0x05    /* Register 5 */
#define Z85230_R6                       0x06    /* Register 6 */
#define Z85230_R7                       0x07    /* Register 7 */
#define Z85230_R8                       0x08    /* Register 8 */
#define Z85230_R9                       0x09    /* Register 9 */
#define Z85230_R10                      0x0A    /* Register 10 */
#define Z85230_R11                      0x0B    /* Register 11 */
#define Z85230_R12                      0x0C    /* Register 12 */
#define Z85230_R13                      0x0D    /* Register 13 */
#define Z85230_R14                      0x0E    /* Register 14 */
define Z85230_R15                      0x0F    /* Register 15 */ define Z85230_R0A_INTERRUPT            0x10
define Z85230_RESI                     0x10    /* Reset Ext/Status Interrupt */
#define Z80230_RTIP                     0x28    /* Reset Tx Int Pending */
#define Z85230_ER                       0x30    /* Error Reset */
#define Z85230_RHIUS                    0x38    /* Reset Highest IUS */
#define Z85230_RESET_TX_CRC_GEN         0x80    /* Reset Tx CRC Generator */

/*
    WRITE REGISTER 1 (Transmit/Receive Interrupt and Data Transfer Mode
                      Definition)
*/
#define Z85230_R1A_MODES                0x60
#define Z85230_R1A_ENABLES              0xE0
#define Z85230_R1A_INTERRUPT            0xF9
#define Z85230_DMA_RX_MODE              0x79
#define Z85230_DMA_RX_MODE_ENABLE       0xF9
#define Z85230_DMA_TX_MODE              0x59
#define Z85230_DMA_TX_MODE_ENABLE       0xD9

/*
    WRITE REGISTER 2 (Interrupt Vector)
*/
#define Z85230_R2A_MODES                0

/*
    WRITE REGISTER 3 (Receive Parameters and Control)
```

```
*/
#define Z85230_R3A_MODES              0xD8
define Z85230_R3A_ENABLES            0xD9 define Z85230_DISABLE_RECEIVER       0xD8
define Z85230_ENABLE_RECEIVER        0xD9

/*
   WRITE REGISTER 4 (Transmit/Receive Miscellaneous Parameters and
Modes)
*/
#define Z85230_R4A_MODES              0x20
#define Z85230_R4B_MODES              0

/*
   WRITE REGISTER 5 (Transmit Parameters and Controls)
*/
#define Z85230_R5A_MODES              0x61
define Z85230_R5A_ENABLES            0xE1 define Z85230_DISABLE_TRANSMITTER    0xE1
define Z85230_ENABLE_TRANSMITTER     0x6B /*
   WRITE REGISTER 6 (Sync Characters or SDLC Address Field)
*/

/*
   WRITE REGISTER 7 (Sync Character or SDLC Flag)
*/
define Z85230_R7A_MODES              0x7E /*
   WRITE REGISTER 7 PRIME
*/
#define Z85230_R7PA_MODES             0x42

/*
   WRITE REGISTER 8 (Transmit/Receive Buffer)
*/

/*
   WRITE REGISTER 9 (Master Interrupt Control)
*/
#define Z85230_R9A_MODES              0x01
define Z85230_R9A_INTERRUPT          0x09 define Z85230_DISABLE                0xF7
define Z85230_ENABLE                 0x08
#define Z85230_RESET                  0xC0
#define Z85230_RESET_CHA              0x80
#define Z85230_RESET_CHB              0x40
```

```
/*
    WRITE REGISTER 10 (Miscellaneous Transmitter/Receiver Control
Bits)
*/
define Z85230_R10A_MODES            0x84 define Z85230_TRANSMIT_CRC          0x80

/*
    WRITE REGISTER 11 (Clock Mode Control)
*/
#define Z85230_R11A_MODES            0x16
#define Z85230_R11B_MODES            0x16

/*
    WRITE REGISTER 12 (Low Byte of Baud Rage Generator Time
Constant)
*/
#ifdef CPU_CLOCK
    #define Z85230_R12A_MODES        0x2F
    #define Z85230_R12B_MODES        0x7E
endif ifndef CPU_CLOCK
    #define Z85230_R12A_MODES        0x48
    #define Z85230_R12B_MODES        0xBE
endif /*
    WRITE REGISTER 13 (Upper Byte of Baud Rate Generator Time
Constant)
*/
#ifdef CPU_CLOCK
    #define Z85230_R13A_MODES        0
    #define Z85230_R13B_MODES        0x02
endif ifndef CPU_CLOCK
    #define Z85230_R13A_MODES        0
    #define Z85230_R13B_MODES        0x03
endif /*
    WRITE REGISTER 14 (Miscellaneous Control Bits)
*/
#define Z85230_R14A_MODES1           0x02
#define Z85230_R14A_MODES2           0x62
define Z85230_R14A_ENABLES          0x03 define Z85230_R14B_MODES1           0x02
define Z85230_R14B_MODES2           0x62
#define Z85230_R14B_ENABLES          0x03
```

```c
/*
   WRITE REGISTER 15 (External/Status Interrupt Control)
*/
define Z85230_R15A_INTERRUPT        0x10 define Z85230_R7P_ENABLE            0x01
define Z85230_R7P_DISABLE           0
```

```
;***************************************************************
;***********;
; Module:    z85230.inc
           ;
; Programmer: Doug Kehn
           ;
;
           ;
; Purpose: Header file for use with the Zilog Z85230 ESCC.
           ;
;
           ;
; References: Zilog Inc., Technical Manual, "Z85230/Z80230 ESCC
Enhanced    ;
;            Serial Communication Controller" - Q1/91
           ;
;***************************************************************
;***********;

;***************************************************************
;***********;
;Z85230 ESCC I/O address space.
           ;
;***************************************************************
;***********;
Z85230_CHA_CR               .equal 0E0h
Z85230_CHA_DR               .equal 0E1h
Z85230_CHB_CR               .equal 0E2h
Z85230_CHB_DR               .equal 0E3h ;***************************************************************
;***********;
;WRITE REGISTER 0 (Command Register)
           ;
;***************************************************************
;***********;
Z85230_R0                   .equal 00h      ;Register 0
Z85230_R1                   .equal 01h      ;Register 1
Z85230_R2                   .equal 02h      ;Register 2
Z85230_R3                   .equal 03h      ;Register 3
Z85230_R4                   .equal 04h      ;Register 4
Z85230_R5                   .equal 05h      ;Register 5
Z85230_R6                   .equal 06h      ;Register 6
Z85230_R7                   .equal 07h      ;Register 7
```

```
Z85230_R8                      .equal 08h       ;Register 8
Z85230_R9                      .equal 09h       ;Register 9
Z85230_R10                     .equal 0Ah       ;Register 10
Z85230_R11                     .equal 0Bh       ;Register 11
Z85230_R12                     .equal 0Ch       ;Register 12
Z85230_R13                     .equal 0Dh       ;Register 13
Z85230_R14                     .equal 0Eh       ;Register 14
Z85230_R15                     .equal 0Fh       ;Register 15

Z85230_R0A_INTERRUPT           .equal 10h
Z85230_RESI                    .equal 10h       ;Reset Ext/Status Interrupt
Z85230_RTIP                    .equal 28h       ;Reset Tx Int Pending
Z85230_ER                      .equal 30h       ;Error Reset
Z85230_RHIUS                   .equal 38h       ;Reset Highest IUS
Z85230_RESET_TX_CRC_GEN        .equal 080h      ;Reset Tx CRC Generator ;*******************************************************************
;***********;
;WRITE REGISTER 1 (Transmit/Receive Interrupt and Data Transfer Mode   ;
;                  Definition)
;
;*******************************************************************
;***********;
Z85230_R1A_MODES               .equal 60h
Z85230_R1A_ENABLES             .equal 0E0h
Z85230_R1A_INTERRUPT           .equal 0FBh
Z85230_DMA_RX_MODE             .equal 79h
Z85230_DMA_RX_MODE_ENABLE      .equal 0F9h
Z85230_DMA_TX_MODE             .equal 59h
Z85230_DMA_TX_MODE_ENABLE      .equal 0D9h ;*******************************************************************
;***********;
;WRITE REGISTER 2 (Interrupt Vector)
;
;*******************************************************************
;***********;
Z85230_R2A_MODES               .equal 00h ;*******************************************************************
;***********;
;WRITE REGISTER 3 (Receive Parameters and Control)
;
;*******************************************************************
;***********;
Z85230_R3A_MODES               .equal 0D8h
Z85230_R3A_ENABLES             .equal 0D9h Z85230_DISABLE_RECEIVER        .equal 0D8h
Z85230_ENABLE_RECEIVER         .equal 0D9h
```

```
;***************************************************************
;***********;
;WRITE REGISTER 4 (Transmit/Receive Miscellaneous Parameters and
Modes)       ;
;***************************************************************
;***********;
Z85230_R4A_MODES            .equal 20h
Z85230_R4B_MODES            .equal 00h ;***************************************************************
;***********;
;WRITE REGISTER 5 (Transmit Parameters and Controls)
            ;
;***************************************************************
;***********;
Z85230_R5A_MODES            .equal 61h
Z85230_R5A_ENABLES          .equal 0E1h Z85230_DISABLE_TRANSMITTER  .equal 0E1h
Z85230_ENABLE_TRANSMITTER   .equal 6Bh ;***************************************************************
;***********;
;WRITE REGISTER 6 (Sync Characters or SDLC Address Field)
            ;
;***************************************************************
;***********;

;***************************************************************
;***********;
;WRITE REGISTER 7 (Sync Character or SDLC Flag)
            ;
;***************************************************************
;***********;
Z85230_R7A_MODES            .equal 7Eh ;***************************************************************
;***********;
;WRITE REGISTER 7 PRIME
            ;
;***************************************************************
;***********;
Z85230_R7PA_MODES           .equal 42h ;***************************************************************
;***********;
;WRITE REGISTER 8 (Transmit/Receive Buffer)
            ;
;***************************************************************
;***********;
```

```
;****************************************************************
***********;
;WRITE REGISTER 9 (Master Interrupt Control)
        ;
;****************************************************************
***********;
Z85230_R9A_MODES            .equal 01h
Z85230_R9A_INTERRUPT        .equal 09h Z85230_DISABLE              .equal 0F7h
Z85230_ENABLE               .equal 08h
Z85230_RESET                .equal 0C0h
Z85230_RESET_CHA            .equal 080h
Z85230_RESET_CHB            .equal 40h ;****************************************************************
***********;
;WRITE REGISTER 10 (Miscellaneous Transmitter/Receiver Control
Bits)        ;
;****************************************************************
***********;
Z85230_R10A_MODES           .equal 084h Z85230_TRANSMIT_CRC         .equal 080h ;****************************************************************
***********;
;WRITE REGISTER 11 (Clock Mode Control)
        ;
;****************************************************************
***********;
Z85230_R11A_MODES           .equal 16h
Z85230_R11B_MODES           .equal 16h ;****************************************************************
***********;
;WRITE REGISTER 12 (Low Byte of Baud Rage Generator Time Constant)
        ;
;****************************************************************
***********;
Z85230_R12A_MODES:          .equal 48h
Z85230_R12B_MODES:          .equal 7Eh ;****************************************************************
***********;
;WRITE REGISTER 13 (Upper Byte of Baud Rate Generator Time
Constant)        ;
;****************************************************************
***********;
Z85230_R13A_MODES:          .equal 00h
Z85230_R13B_MODES:          .equal 02h
```

```
;***************************************************************
;***********;
;WRITE REGISTER 14 (Miscellaneous Control Bits)
        ;
;***************************************************************
;***********;
Z85230_R14A_MODES1          .equal 02h
Z85230_R14A_MODES2          .equal 62h
Z85230_R14A_ENABLES         .equal 03h Z85230_R14B_MODES1          .equal 02h
Z85230_R14B_MODES2          .equal 62h
Z85230_R14B_ENABLES         .equal 03h ;***************************************************************
;***********;
;WRITE REGISTER 15 (External/Status Interrupt Control)
        ;
;***************************************************************
;***********;
Z85230_R15A_INTERRUPT       .equal 10h Z85230_R7P_ENABLE           .equal 01h
Z85230_R7P_DISABLE          .equal 00h .end
```

Program for Serial EEPROM Memory 64

© 1994 Halliburton Company

```
;*****************************
; Z86017 Register Configuration
;*****************************
;
;                          Register Description
Address (hex)
;                          ------------------------------------
-------------
    .dw 3Ah               ;ATA Configuration Register 0
        00
    .dw 080h              ;ATA Interrupt Enable Register
        01
    .dw 00h               ;ATA Configuration Register 1
        02
    .dw 07h               ;ATA Configuration Register 2
        03
    .dw 00h               ;ATA Configuration Register 3
        04
    .dw 20h               ;PCMCIA Configuration Address
        05
    .dw 00h               ;Reserved
        06
    .dw 00h               ;Reserved
        07
    .dw 00h               ;Attribute RAM Data Address (Set to 00h)
        08
    .dw 00h               ;Attribute RAM Data
        09
    .dw 01h               ;PCMCIA Configuration Option Register
        0A
    .dw 00h               ;PCMCIA Card Status Register
        0B
    .dw 0Ch               ;PCMCIA Pin Replacement Register
        0C
    .dw 00h               ;PCMCIA Socket & Copy Register
        0D
    .dw 00h               ;Reserved
        0E
    .dw 00h               ;PCMCIA Target Configuration
        0F
    .dw 12h               ;Address Port 1 Control Register
        10
    .dw 00h               ;Address Port 1 Address Register A
        11
    .dw 70h               ;Address Port 1 Address Register B
        12
    .dw 0FFh              ;Address Port 1 Address Register C
        13
    .dw 30h               ;Address Port 2 Control Register
        14
    .dw 00h               ;Address Port 2 Address Register A
        15
```

```
.dw 70h          ;Address Port 2 Address Register B
    16
.dw 0FFh         ;Address Port 2 Address Register C
    17
.dw 01h          ;Address Port 3 Control Register
    18
.dw 00h          ;Address Port 3 Address Register A
    19
.dw 00h          ;Address Port 3 Address Register B
    1A
.dw 00h          ;Address Port 3 Address Register C
    1B
.dw 00h          ;Reserved
    1C
.dw 00h          ;Reserved
    1D
.dw 1Ch          ;Valid EEPROM Flag Byte (Set to 1Ch)
    1E
.dw 00h          ;Reserved
    1F
.dw 00h          ;CCR4 (Set to 00h)
    20
.dw 00h          ;CCR5 (Set to 00h)
    21
.dw 00h          ;CCR6 (Set to 00h)
    22
.dw 00h          ;Reserved
    23
.dw 00h          ;Reserved
    24
.dw 00h          ;Reserved
    25
.dw 00h          ;Reserved
    26
.dw 00h          ;Reserved
    27
.dw 00h          ;Reserved
    28
.dw 00h          ;Reserved
    29
.dw 00h          ;Reserved
    2A
.dw 00h          ;Reserved
    2B
.dw 00h          ;Reserved
    2C
.dw 00h          ;Reserved
    2D
.dw 00h          ;Reserved
    2E
.dw 00h          ;Reserved
    2F
```

```
;
;
;*******************************
; Attribute Memory Configuration
;*******************************
;
;                   Tuple Description
;
---------------------------------------------------------------
    .dw 01h             ;TPL Code - Device Information Tuple (Common
Memory)
    .dw 03h             ;TPL Link
    .dw 0DCh            ;Device Information 1
    .dw 08h
    .dw 0FFh            ;End Device Information Tuple
;
    .dw 1Ah             ;TPL Code - Configuration Tuple
    .dw 05h             ;TPL Link
    .dw 01h             ;TPL SZ
    .dw 01h             ;TPCC Last
    .dw 00h             ;TPCC RADR
    .dw 02h
    .dw 0Fh             ;TPCC RMSK
;
    .dw 1Bh             ;TPL Code - Configuration Table Entry Tuple
    .dw 0Dh             ;TPL Link
    .dw 0C1h            ;TPCE Indx
    .dw 081h            ;TPCE Interface Description Field
    .dw 39h             ;TPCE Feature Selection
    .dw 31h              ;TPCE Power Description Structure Parameter
Selection Byte
    .dw 55h             ;   Nom V
    .dw 36h             ;   Avg I
    .dw 46h             ;   Peak I
    .dw 23h             ;I/O Space Descriptor
    .dw 30h             ;IRQ Description
    .dw 0FFh            ;   IRQ 0-7 supported
    .dw 0FFh            ;   IRQ 8-15 supported
    .dw 04h             ;TPCE Memory Space Description Structure
    .dw 00h
;
    .dw 15h                 ;TPL Code - Level 1 Version / Product
Information Tuple
    .dw 2Fh             ;TPL Link
    .dw 04h             ;TPLLV1 Major
    .dw 01h             ;TPLLV1 Minor
    .dw 'H'             ;TPLLV1 Info
    .dw 'a'
    .dw 'l'
    .dw 'l'
    .dw 'i'
    .dw 'b'
```

```
.dw 'u'
.dw 'r'
.dw 't'
.dw 'o'
.dw 'n'
.dw 20h
.dw 00h
.dw 'I'
.dw 'L'
.dw 'A'
.dw 'N'
.dw 20h
.dw '/'
.dw 20h
.dw 'R'
.dw 'S'
.dw '-'
.dw '2'
.dw '3'
.dw '2'
.dw 20h
.dw 00h
.dw 'T'
.dw 'v'
.dw '1'
.dw '.'
.dw '0'
.dw '0'
.dw 20h
.dw 00h
.dw 'F'
.dw 'v'
.dw '1'
.dw '.'
.dw '0'
.dw '0'
.dw 20h
.dw 00h
.dw 0FFh
;
.dw 14h                 ;TPL Code - No Link Tuple
.dw 00h                 ;TPL Link
;
.dw 0FFh                ;TPL Code - End of Tuple Chain
```

Program for re-programming Flash EEPROM Memory 50

© 1994 Halliburton Company

```
;***************************************************************
***********;
; Module Name:   pf.src
            ;
; Creation Date: 02/17/94
            ;
; Assembler:     2500AD Software Inc.   v4.05
            ;
;
            ;
; Functions:
            ;
;       Program_Flash
            ;
;
            ;
; Global Variable Description(s):
            ;
;***************************************************************
***********;

;****************************
; Assembler/Linker directives
;****************************
    .linklist
    .symbols
    .options    dnh program:       .section .include pcmcia.inc
    .include z182.inc
    .include z182mac.inc ;**********************
; External declarations
;**********************

;********************
; Global declarations
;********************
    .global Program_Flash .program
```

```
;***************************************************************
***********;
; Function:   Program_Flash
            ;
; Prototype:  void Program_Flash(void)
            ;
; Programmer: Doug Kehn
            ;
;
            ;
; Purpose:
            ;
;     This function programs the local Flash EEPROM.  The code is read from ;
;     Dual Port RAM and copied to the Flash starting at address 0.
            ;
;
            ;
; References:
            ;
;         Advanced Micro Devices Inc., "Flash Memory Products", 1992/1993 Data ;
;         Book/Handbook.
;
            ;
; Special Notes:
            ;
;
            ;
; Variable Description(s):
            ;
;  Input:
            ;
;  Return:
            ;
;  Local:
            ;
;
            ;
; Revision History:
            ;
;   Date      Programmer  Revision
            ;
; --------    ----------  --------
            ;
; 02/25/94    dk          v1.00    Initial release
            ;
;***************************************************************
***********;

Program_Flash:    .equal $
;Add additional wait states to ensure Flash program timing is met.
```

```
        IN0     A,Z182_DCNTL
        or      E0h                             ;Insert 3 wait states.
        OUT0    Z182_DCNTL,A ;Initialize index registers for programming.
        ld      ix,DP_RAM                       ;Code length & PC-Card to PC
status.
        ld      iy,DPR_INTERRUPT_BYTE           ;PC to PC-Card status.

;Let things settle before erasing flash.
        ld      b,0FFh
$Loop:
    nop
    djnz    $Loop ;Let PC know of erasing process.
        ld      (iy-2),'E'
        ld      (iy-1),'F'

;Erase sectors 1 and 2 of the flash.
        ld      a,0AAh                          ;Unlock command #1
        ld      (5555h),a
        ld      a,55h                           ;Unlock command #2
        ld      (2AAAh),a
        ld      a,080h                          ;Set-up command
        ld      (5555h),a
        ld      a,0AAh                          ;Unlock command #1
        ld      (5555h),a
        ld      a,55h                           ;Unlock command #2
        ld      (2AAAh),a
        ld      a,30h                           ;Sector erase command
        ld      (4000h),a                       ;    Sector #1
        ld      (8000h),a                       ;    Sector #2

;Let things settle after sending erase command.
        ld      b,0FFh
$Loop2:
    nop
    djnz    $Loop2

$Erasing_Sector_1:
;Wait for erase to complete.
;Check for sector #1 erasing complete.
        ld      hl,7FFFh
        ld      a,(hl)
        bit     7,a
        jr      nz,$Erasing_Sector_2 bit     5,a
        jr      z,$Erasing_Sector_1 ld      a,(hl)
```

```
        bit     7,a
        jr      z,$Erase_Fail $Erasing_Sector_2:
;Check for sector #2 erasing complete.
        ld      hl,0BFFFh
        ld      a,(hl)
        bit     7,a
        jr      nz,$Erase_Finished bit     5,a
        jr      z,$Erasing_Sector_2 ld      a,(hl)
        bit     7,a
        jr      z,$Erase_Fail $Erase_Finished:
;Base address of Flash, where to put code.
        ld      de,ROM_BASE+4000h $Program_Loop:
;Let PC know, ready for block of code.
        ld      (iy-2),'O'
        ld      (iy-1),'K'

;Wait for PC to load code into DPRAM.
$Wait_For_Data:
        ld      a,(iy-2)
        cp      'C'
        jr      nz,$Wait_For_Data ld      a,(iy-1)
        cp      'R'
        jr      nz,$Wait_For_Data ;Get code block length.  A length of 0 indicates no more code.
        ld      c,(ix+0)
        ld      b,(ix+1)
        ld      a,b
        or      c
        jr      z,$Finished_Programming ;Starting address of code block in DPRAM.
        ld      hl,DP_RAM+2

$Program_Block:
;Send Byte Program Sequence to Flash.
        ld      a,0AAh                          ;Unlock command #1
        ld      (5555h),a
        ld      a,55h                           ;Unlock command #2
        ld      (2AAAh),a
```

```
    ld    a,0A0h                          ;Program set-up command
    ld    (5555h),a
    ld    a,(hl)                          ;Data write
    ld    (de),a ;Verify that code byte was programmed.
$Verify_Code_Byte:
    nop
    ld    a,(de)
    cp    (hl)
    jr    nz,$Verify_Code_Byte ;Update pointers & counter.
    inc   hl
    inc   de
    dec   bc
    ld    a,c
    or    b
    jr    nz,$Program_Block              ;bc != 0
    jr    $Program_Loop $Erase_Fail:
    ld    (iy-2),'e'
    ld    (iy-1),'f'
    halt $Finished_Programming:
;Let PC know that program has been loaded into flash.
    ld    (ix-2),'O'
    ld    (ix-1),'K'

End_Program_Flash:    .equal $
    rst   0

;******************
;Mark end of module
;******************
    .end
```

What is claimed is:

1. An apparatus for communicating multiple devices with a personal computer through only one PCMCIA interface of the computer, said apparatus comprising:

computer connector means for connecting to a PCMCIA connector of one PCMCIA interface of a personal computer;

first device connector means for connecting to a first device;

second device connector means for connecting to a second device;

first communication channel means, connected to said first device connector means, for communicating first device data within said apparatus;

second communication channel means, connected to said second device connector means, for communicating second device data within said apparatus; and adapter means, connected to said first and second communication channel means and said computer connector means, for transferring first device data between said first communication channel means and said computer connector means and for transferring second device data between said second communication channel means and said computer connector means.

2. An apparatus as defined in claim 1, wherein said computer connector means has a single interrupt line which connects to a corresponding single interrupt request line of the PCMCIA connector in response to connecting said computer connector means to the PCMCIA connector.

3. An apparatus as defined in claim 2, wherein:

said first communication channel means includes means for generating an interrupt in response to a communication received from the first device;

said adapter means includes means for sending an interrupt over said single interrupt line in response to an interrupt from said first communication channel means; and said adapter means further includes means for sending an address to said first communication channel means and for retrieving data from said first communication channel at said address.

4. An apparatus as defined in claim 3, wherein said adapter means still further includes means for retrieving data from said second communication channel at an address provided to said second communication channel from the personal computer through the PCMCIA connector and said computer connector.

5. An apparatus as defined in claim 1, wherein said second communication channel means includes a microprocessor and a dual port random access memory, said dual port random access memory including:

first port address lines connected to said computer connector means;

first port data lines connected to said adapter means;

second port address lines connected to address lines of said microprocessor; and second port data lines connected to data lines of said microprocessor.

6. An apparatus as defined in claim 5, wherein said first communication channel means includes a universal asynchronous receiver transmitter connected to said microprocessor, said adapter means and said first device connector means.

7. An apparatus as defined in claim 6, wherein said second communication channel means further includes a serial communications controller connected to said microprocessor and said second device connector means.

8. An apparatus as defined in claim 1, wherein:

said computer connector means includes a 68-pin connector;

said apparatus further comprises a PC card having said 68-pin connector and said first and second device connector means mounted thereon;

said first communication channel means includes a universal asynchronous receiver transmitter connected to said first device connector means and mounted on said PC card;

said second communication channel means includes: a serial communications controller connected to said second device connector means and mounted on said PC card, and a dual port random access memory connected to said serial communications controller and to said 68-pin connector and mounted on said PC card; and said adapter means includes a PCMCIA adapter connected to said universal asynchronous receiver transmitter, said dual port random access memory and said 68-pin connector and mounted on said PC card.

9. An apparatus for communicating a local area network and an RS-232 device with a personal computer through one PCMCIA interface of the computer, said apparatus comprising a PC card and further comprising the following mounted thereon:

a PCMCIA connector having a plurality of pins designated in conformance with a PCMCIA input/output and memory card interface standard, said PCMCIA connector defining means for connecting at any one time to only one PCMCIA interface of a personal computer;

a PCMCIA adapter circuit connected to said PCMCIA connector;

first program storage memory, said first program storage memory connected to said PCMCIA adapter circuit;

dual port random access memory connected to said PCMCIA connector and said PCMCIA adapter circuit;

an intelligent peripheral device connected to said PCMCIA adapter circuit, said intelligent peripheral device including a microprocessor, a serial communications controller and a universal asynchronous receiver transmitter;

second program storage memory;

a microprocessor bus connected to said dual port random access memory, said intelligent peripheral device and said second program storage memory;

means for connecting said serial communications controller to a local area network; and means for connecting said universal asynchronous receiver transmitter to an RS-232 device.

10. An apparatus as defined in claim 9, wherein:

said intelligent peripheral device is connected to said PCMCIA adapter circuit so that data communications with a connected RS-232 device pass through said universal asynchronous receiver transmitter and said PCMCIA adapter circuit; and said intelligent peripheral device, said dual port random access memory and said PCMCIA adapter circuit are connected so that data communications with a connected local area network pass through said serial communications controller, said dual port random access memory and said PCMCIA adapter circuit.

11. A method of transferring data from multiple devices to a personal computer through a single interface of the personal computer, said method comprising the steps of:

受信 an interrupt from a first device;

communicating the received interrupt through a single interrupt line of a PCMCIA interface of a personal computer;

transferring data from the first device through data lines of the PCMCIA interface to the personal computer in response to the personal computer processing the communicated interrupt;

receiving data from a second device;

storing the received data in a memory; and transferring stored data from the memory through the data lines of the PCMCIA interface to the personal computer.

12. A method as defined in claim 11, further comprising performing said steps on a single PC card connected to the PCMCIA interface of the personal computer and connected to the first and second devices.

13. A method as defined in claim 11, wherein transferring stored data from the memory through the data lines of the PCMCIA interface to the personal computer is performed in response to polling the memory from the personal computer.

14. A method as defined in claim 11, wherein each of the steps of transferring data includes transferring the respective data through a PCMCIA adapter circuit connected to the PCMCIA interface.

15. A method as defined in claim 14, wherein the data from the first device is received through a universal asynchronous receiver transmitter and the data from the second device is received through a serial communications controller.

16. A method as defined in claim 15, wherein the data received through the serial communications controller is stored in a dual port random access memory connected to the PCMCIA adapter circuit and the PCMCIA interface.

17. A method as defined in claim 16, wherein the data is stored in the dual port random access memory in response to a microprocessor controlling transfers of data from the serial communications controller to the dual port random access memory through a direct memory access controller and intervening random access memory.

18. A method as defined in claim 17, further comprising performing said steps on a single PC card connected to the PCMCIA interface of the personal computer and connected to the first and second devices.

* * * * *